(12) United States Patent
Iwasaki

(10) Patent No.: US 7,826,703 B2
(45) Date of Patent: Nov. 2, 2010

(54) PLANAR ILLUMINATING DEVICE

(75) Inventor: Osamu Iwasaki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 256 days.

(21) Appl. No.: 12/063,973

(22) PCT Filed: Aug. 17, 2006

(86) PCT No.: PCT/JP2006/316151

§ 371 (c)(1),
(2), (4) Date: Feb. 15, 2008

(87) PCT Pub. No.: WO2007/020966

PCT Pub. Date: Feb. 22, 2007

(65) Prior Publication Data

US 2009/0092366 A1   Apr. 9, 2009

(30) Foreign Application Priority Data

Aug. 17, 2005 (JP) ............... 2005-236594
Jan. 23, 2006 (JP) ............... 2006-014143
Jun. 20, 2006 (JP) ............... 2006-170684
Jul. 4, 2006 (JP) ............... 2006-184562

(51) Int. Cl.
*G02B 6/10* (2006.01)

(52) U.S. Cl. ............ 385/129; 385/901; 362/613; 362/616; 362/628

(58) Field of Classification Search ............ 385/146, 385/129, 123; 362/554–556, 97.1, 97.2
See application file for complete search history.

(56) References Cited

U.S. PATENT DOCUMENTS 5,542,017 A    7/1996 Koike
5,654,779 A    8/1997 Nakayama et al.
6,241,358 B1   6/2001 Higuchi et al.

(Continued)

FOREIGN PATENT DOCUMENTS

JP    2-208631 A    8/1990

(Continued)

OTHER PUBLICATIONS

International Search Report in PCT/JP2006/316151, dated Nov. 21, 2006.

(Continued)

*Primary Examiner*—Sarah Song
(74) *Attorney, Agent, or Firm*—Sughrue Mion, PLLC

(57) ABSTRACT

Provided is a planar lighting device having a thin shape and capable of emitting uniform illumination light with less brightness unevenness. The planar lighting device includes a first and a second light sources arranged at a given distance apart from each other and a light guide plate arranged between the first and second light sources. The light guide plate includes a light exit plane, a first light entrance plane facing the first light source and containing one side of the light exit plane, and a second light entrance plane facing the second light source and containing the opposite side to the one side, and has a shape growing thicker from the first and second light entrance planes toward the center. The light guide plate contains scattering particles for scattering light entering through the first and second light entrance planes and propagating inside by a ratio satisfying $1.1 \leq \Phi \cdot N_p \cdot L_G \cdot K_C \leq 8.2$.

21 Claims, 22 Drawing Sheets

U.S. PATENT DOCUMENTS

| | | |
|---|---|---|
| 2001/0017774 A1 | 8/2001 | Ito et al. |
| 2003/0099118 A1 | 5/2003 | Saitoh et al. |
| 2004/0124764 A1 | 7/2004 | Suzuki et al. |
| 2004/0202436 A1* | 10/2004 | Cho et al. .................. 385/123 |
| 2005/0100282 A1* | 5/2005 | Okada et al. .................. 385/46 |
| 2005/0201706 A1 | 9/2005 | Iwasaki |
| 2007/0290622 A1 | 12/2007 | Furukawa |

FOREIGN PATENT DOCUMENTS

| | | |
|---|---|---|
| JP | 5-4133 U | 1/1993 |
| JP | 05-249319 | 9/1993 |
| JP | 06-102414 | 4/1994 |
| JP | 07-311380 | 11/1995 |
| JP | 08-094851 | 4/1996 |
| JP | 09-293406 | 11/1997 |
| JP | 11-288611 A | 10/1999 |
| JP | 2001-266626 A | 9/2001 |
| JP | 2001-281655 A | 10/2001 |
| JP | 2001-312916 A | 11/2001 |
| JP | 2001-345007 A | 12/2001 |
| JP | 2002-031798 A | 1/2002 |
| JP | 2002-133932 A | 5/2002 |
| JP | 2003-167130 A | 6/2003 |
| JP | 2004-038108 A | 2/2004 |
| JP | 2004-146268 A | 5/2004 |
| JP | 2004-171948 A | 6/2004 |
| JP | 2004-241237 A | 8/2004 |
| JP | 2004-265635 A | 9/2004 |
| JP | 2005-215171 A | 8/2005 |

OTHER PUBLICATIONS

Notification of Reasons for Refusal, dispatched Nov. 18, 2008, from the Japanese Patent Office in corresponding JP application No. 2007-531018, 4 pages including 1 page partial translation.

* cited by examiner

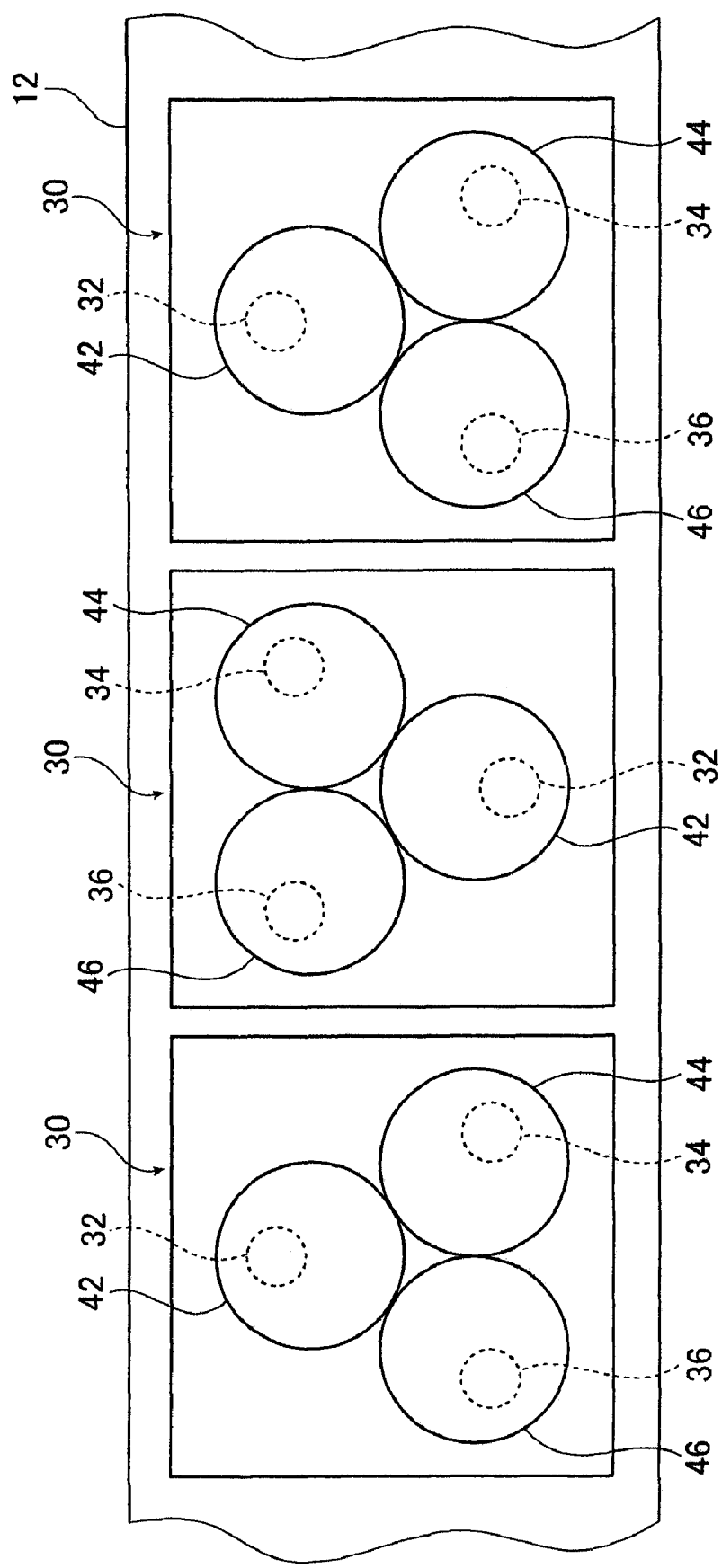

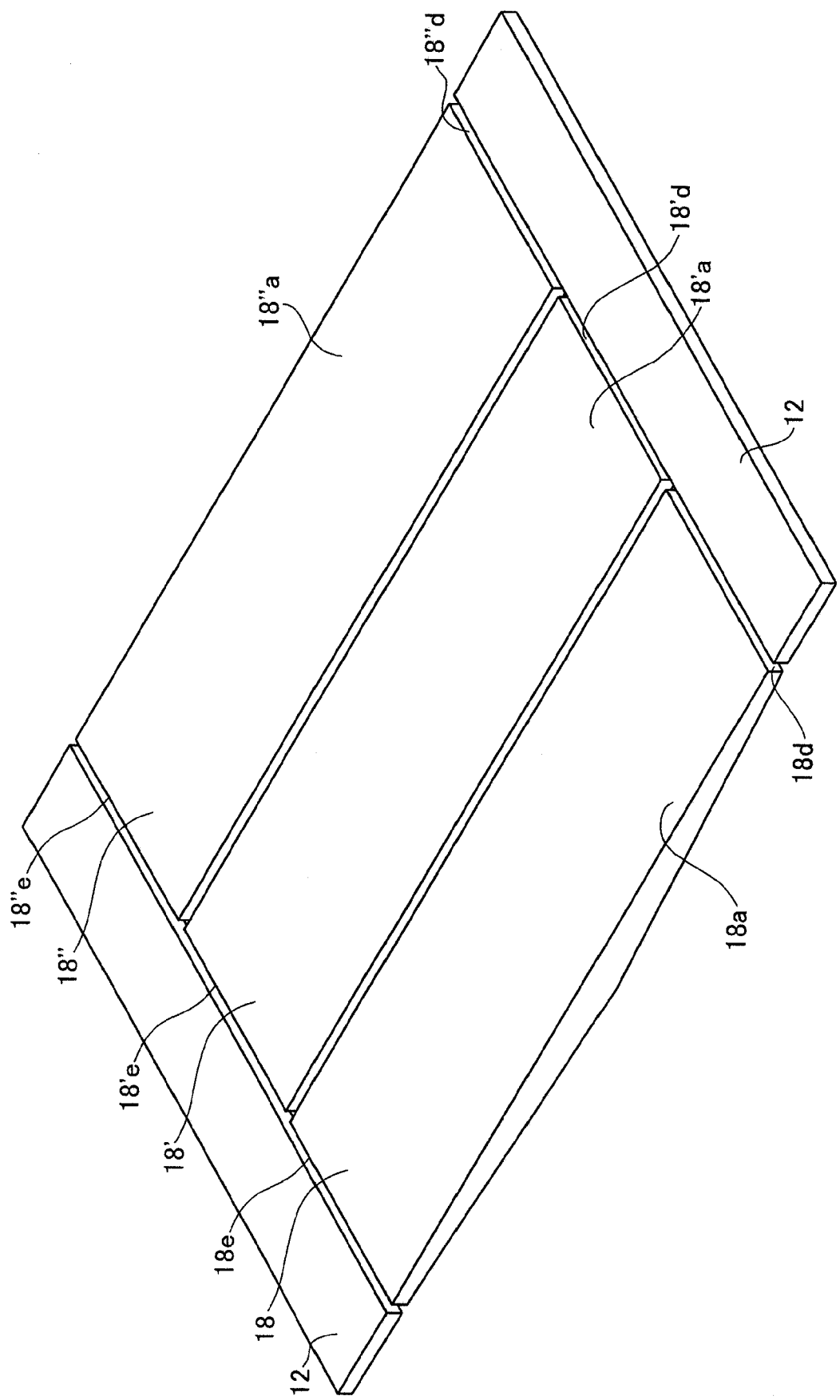

PLANAR ILLUMINATING DEVICE

TECHNICAL FIELD

The present invention relates to a planar lighting device used in liquid crystal display devices and the like.

BACKGROUND ART

Liquid crystal display devices use a backlight unit for radiating light from behind the liquid crystal display panel to illuminate the liquid crystal display panel. A backlight unit is configured using a light guide plate for diffusing light emitted by an illuminating light source to irradiate the liquid crystal display panel and parts such as a prism sheet and a diffusion sheet for rendering the light emitted from the light guide plate uniform.

Currently, large liquid crystal televisions predominantly use a so-called direct illumination type backlight unit comprising a light guide plate disposed immediately above the illuminating light source (see, for example, JP 05-4133 U). This type of backlight unit comprises a plurality of cold cathode tubes serving as a light source provided behind the liquid crystal display panel whereas the inside of the backlight unit provides white reflection surfaces to ensure uniform light amount distribution and necessary brightness.

To achieve a uniform light amount distribution with a direct illumination type backlight unit, however, a thickness of about 30 mm in a direction perpendicular to the liquid crystal display panel is required. While demands of still thinner backlight units are expected to grow in the future, achieving a thickness of 10 mm or less with a direct illumination type backlight unit is deemed difficult in view of uneven light amount distribution expected to accompany that type.

Against such background, there is provided a tandem type as a thin backlight unit (see, for example, JP 02-208631 A, JP 11-288611 A, and JP 2001-312916 A).

[PATENT DOCUMENT 1]: JP 05-4133 U
[PATENT DOCUMENT 2]: JP 02-208631 A
[PATENT DOCUMENT 3]: JP 11-288611 A
[PATENT DOCUMENT 4]: JP 2001-312916 A

DISCLOSURE OF THE INVENTION

Problems to be Solved by the Invention

While a thin design may be achieved with the tandem type backlight, however, the tandem type only achieves lower light use efficiency than the direct illumination type because of the relative dimensions of the cold cathode tube to the reflector. Further, where the light guide plate used is shaped to have grooves for receiving cold cathode tubes, if the light guide plate is thin, brightness at locations immediately above the cold cathode tubes disposed in the grooves increases, thus causing brightness unevenness on the light exit plane to stand out.

Thus, there was a limit to how thin the tandem type backlight could be made.

The present invention was made under the circumstances described above and has as an object to provide a planar lighting device that is thin and capable of emitting uniform illumination light with a reduced degree of brightness unevenness.

Means to Solve the Problems

To solve the above problems, a first aspect of the present invention provides a planar lighting (illuminating) device comprising a first light source and a second light source disposed a given distance apart from each other and a light guide plate disposed between the first light source and the second light source, wherein the light guide plate comprises a light exit plane, a first light entrance plane facing the first light source and containing one side of the light exit plane and a second light entrance plane facing the second light source and containing an opposite side to the one side, and grows thicker from the first light entrance plane and the second light entrance plane toward a center and wherein the light guide plate contains scattering particles for scattering light entering through the first and the second light entrance planes of the light guide plate and propagating inside thereof, the scattering particles satisfying an expression (1) below:

$$1.1 \leq \Phi \cdot N_p \cdot L_G \cdot K_C \leq 8.2 \tag{1}$$

(where $\Phi$ denotes a scattering cross section of the scattering particles, $L_G$ denotes a half of a length of the light guide plate in a direction in which light is admitted, $N_p$ denotes a density of the scattering particles, and $K_C$ denotes a compensation coefficient, which is not smaller than 0.005 and not greater than 0.1).

According to the first aspect of the inventive planar lighting device, the light exit plane of the light guide plate has a rectangular contour.

Preferably, according to the first aspect of the inventive planar lighting device, the light exit plane of the light guide plate is formed to have a flat shape, the light guide plate has a first inclined plane and a second inclined plane on an opposite side thereof from the light exit plane formed in such a manner as to be inclined symmetrically to each other with respect to a bisector of the light exit plane parallel to the one side of the light exit plane, and a polarization separator film for selectively transmitting a given polarized component of light and reflecting other polarized components of the light is formed integrally with the light guide plate on the light exit plane of the light guide plate.

Preferably, according to the first aspect of the inventive planar lighting device, the light exit plane of the light guide plate is formed of a first inclined plane and a second inclined plane inclined in such a manner as to be symmetrical to each other with respect to the bisector of the light exit plane parallel to the one side of the light exit plane, and a plane located on an opposite side from the light exit plane is formed of a third inclined plane and a fourth inclined plane inclined in such a manner as to be symmetrical to each other with respect to the bisector of the light exit plane parallel to the one side of the light exit plane.

Preferably, according to the first aspect of the inventive planar lighting device, the light exit plane of the light guide plate is formed of a first inclined plane and a second inclined plane inclined in such a manner as to be symmetrical to each other with respect to the bisector of the light exit plane parallel to the one side of the light exit plane, and a plane located on an opposite side from the light exit plane is formed to have a flat shape.

Preferably, both the first light source and the second light source are each formed of one or more LED arrays, each having RGB-LEDs provided with red light emitting diodes, green light emitting diodes, and blue light emitting diodes arranged in a row, and of lenses disposed for the red light emitting diodes, the green light emitting diodes, and the blue light emitting diodes on a light emitting side of the diodes, and the lenses are transparent ball lenses each having a spherical shape.

Preferably, both the first light source and the second light source are LED arrays each comprising LED chips and a support member carrying the LED chips arranged in a row, and wherein a relationship p>b>a holds where "a" denotes a length of each of the LED chips perpendicular to the light exit plane of the light guide plate, "b" denotes a length of the LED chips in a direction in which the LED chips are arranged, and "p" denotes a distance by which the LED chips are spaced apart from one another.

It is also preferable that the first light source and the second light source each comprise two or more of the LED arrays, and that the first and second light sources each have a configuration such that the LED arrays are stacked by using at least one of a mechanical joining method and a chemical bonding method in such a way that LED chips of one of the LED arrays and LED chips of another of the LED arrays are spaced a given distance apart from each other.

Further, it is preferable that the planar lighting device comprises two or more light guide plates, each being the light guide plate, and that the two or more light guide plates are arranged such that a plane of the light guide plate containing one side of the light exit plane and one side of the light entrance plane and a plane of another light guide plate containing one side of the light exit plane and one side of the light entrance plane are adjacent each other.

The light guide plate is preferably provided with diffusion reflectors on at least one plane of the light guide plate excluding the first light entrance plane and the second light entrance plane.

Further, the diffusion reflectors are preferably provided in an increasing density with an increasing distance from the first light entrance plane and the second light entrance plane.

Further, the diffusion reflectors are preferably provided on the first inclined plane and the second inclined plane.

Preferably, part of the light guide plate closer to a side thereof on which the first light entrance plane is located and part of the light guide plate closer to a side thereof on which the second light entrance plane is located are formed of a different material than other parts of the light guide plate such that a relationship Nm>Ni holds, where Nm denotes a refractive index of the part closer to the side on which the first light entrance plane is located and the part closer to the side on which the second light entrance plane is located, and Ni denotes a refractive index of the other parts.

Further, the planar lighting device preferably comprises reflection material members provided on the light exit plane close to the first light entrance plane, the first inclined plane close to the first light entrance plane, the light exit plane close to the second light entrance plane, and the second inclined plane close to the second light entrance plane of the light guide plate.

To solve the above problems, a second aspect of the present invention provides a planar lighting device comprising a first light source and a second light source disposed a given distance apart from each other and a light guide member configured using plastic optical fibers disposed between the first light source and the second light source and closely piled on one another in layers, wherein the first light source is disposed opposite one end face of the plastic optical fibers and the second light source is disposed opposite the other end face of the plastic optical fibers, and wherein the plastic optical fibers contain scattering particles for scattering light entering through both end faces thereof and propagating inside thereof, the scattering particles satisfying an expression (1) below:

$$1.1 \leq \Phi \cdot N_P \cdot L_G \cdot K_C \leq 8.2 \quad (1)$$

(where $\Phi$ denotes a scattering cross section of the scattering particles, $L_G$ denotes a half of a length of the plastic optical fiber, $N_P$ denotes a density of the scattering particles, and $K_C$ denotes a compensation coefficient, which is not smaller than 0.005 and not greater than 0.1).

Preferably, the light guide member preferably comprises a transparent case and the plastic optical fibers are piled on one another in layers in that case.

Still further, both the first light source and the second light source are each formed of an LED array having red light emitting diodes, green light emitting diodes, and blue light emitting diodes juxtaposed in such a manner as to be allotted respectively to the plastic optical fibers and of lenses disposed for the red light emitting diodes, the green light emitting diodes, and the blue light emitting diodes respectively on a light emitting side of the diodes.

EFFECTS OF THE INVENTION

A planar lighting device according to the first aspect of the present invention has the light guide plate disposed between the first light source and the second light source provided a given distance apart from each other. The light guide plate comprises the light exit plane having a rectangular external shape, the first light entrance plane facing the first light source, and the second light entrance plane facing the second light source. The light guide plate is shaped such that its thickness increases from the first light entrance plane and the second light entrance plane to the center and contains scattering particles for scattering light propagating through the inside. Configured as described above, the planar lighting device allows a thinner design to be achieved and is capable of emitting planar illumination light that is uniform with a reduced level of unevenness.

The planar lighting device according to the second aspect of the present invention comprises between the first light source and the second light source a light guide member comprising plastic optical fibers disposed in close contact with one another in layers and containing scattering particles that scatter light propagating therethrough. On one side of the plastic optical fibers is provided the first light source; on the other side is provided the second light source. Configured as described above, the planar lighting device allows a thin form to be achieved and is capable of emitting planar illumination light that is uniform with a reduced level of unevenness.

BRIEF DESCRIPTION OF THE DRAWINGS

FIG. 3 is a view schematically illustrating how RGB-LEDs configured using three kinds of light emitting diodes each representing colors of red, blue, and green are arranged.

FIG. 27 is a schematic view illustrating a configuration of the planar lighting device using a plurality of light guide plates.

Figure 1A:
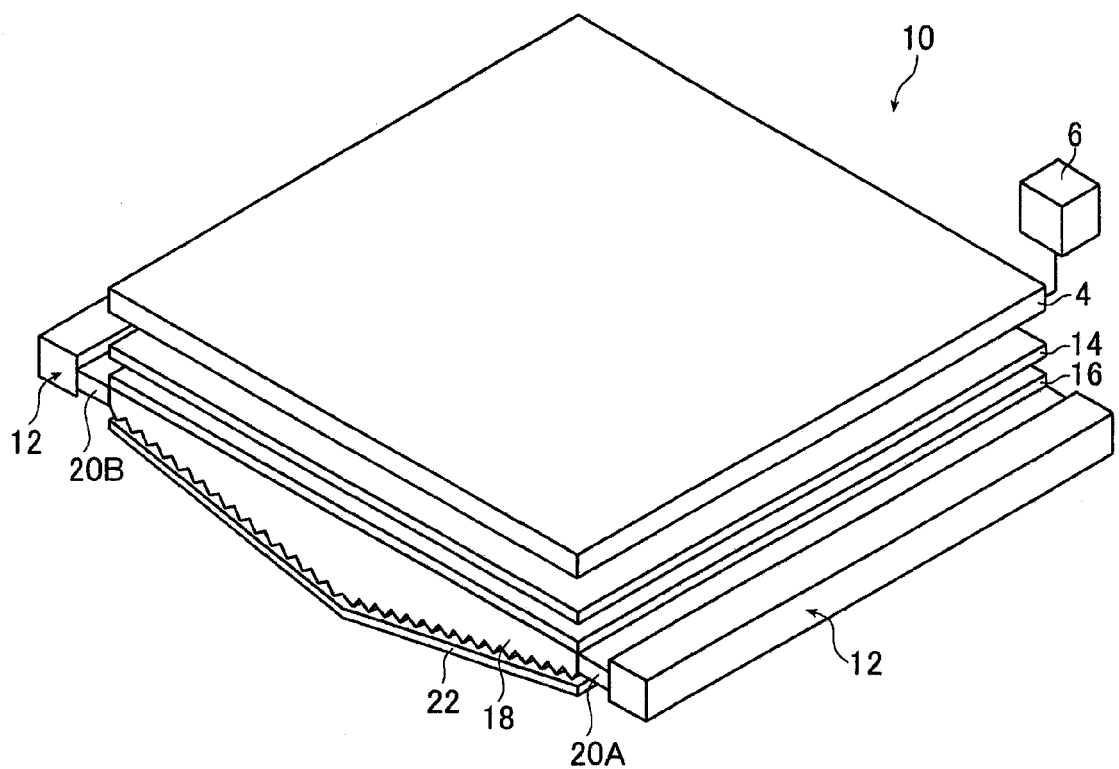
FIG. 1A is a schematic perspective view of a liquid crystal display device provided with the planar lighting device according to a first embodiment of the present invention.

LEGEND 2, 120, 141, 180: backlight units
4: liquid crystal display panel
6: drive unit
10: liquid crystal display device
12, 122, 142, 190: light sources
14: diffusion film
16: polarization separator film
18, 28, 38, 144, 151, 153, 155: light guide plates
18$a$: light exit plane
18$b$: first inclined plane
18$c$: second inclined plane
18$d$: first light entrance plane
18$e$: second light entrance plane
20A, 20B: light mixers
22: reflection sheet
24: LED array
26, 188: prism sheets
28$a$: first inclined plane
28$b$: second inclined plane
28$c$: flat surface
28$d$: first light entrance plane
38$a$: first inclined plane
38$b$: second inclined plane
38$c$: third inclined plane
38$d$: fourth inclined plane
82: light source
84: LED array
86: LED
88, 126: coupling lenses
90: light guide member
90$a$: light exit plane
92: optical fiber
94: case
100: backlight unit 102: reflection sheet
104, 106: prism sheets
108: diffusion sheet
124: LED array
128: LED chip
130: heat sink
132: multilayered LED array
140: diffusion reflector
146: base material
148, 152, 154, 156: low refractive index members
162: reflection member
182: transmittance adjusting member
184: transparent film
186: transmittance adjusting member

BEST MODE FOR CARRYING OUT THE INVENTION

Now, a liquid crystal display device provided with the inventive planar lighting device will be described in detail based on the embodiments illustrated in the attached drawings.

Figure 1B:
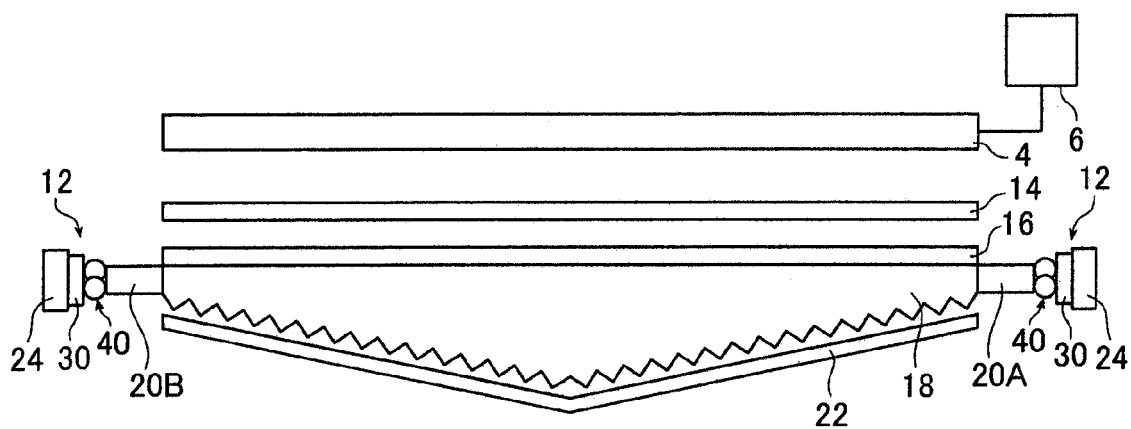
FIG. 1B is a schematic sectional view thereof.
Figure 2A:
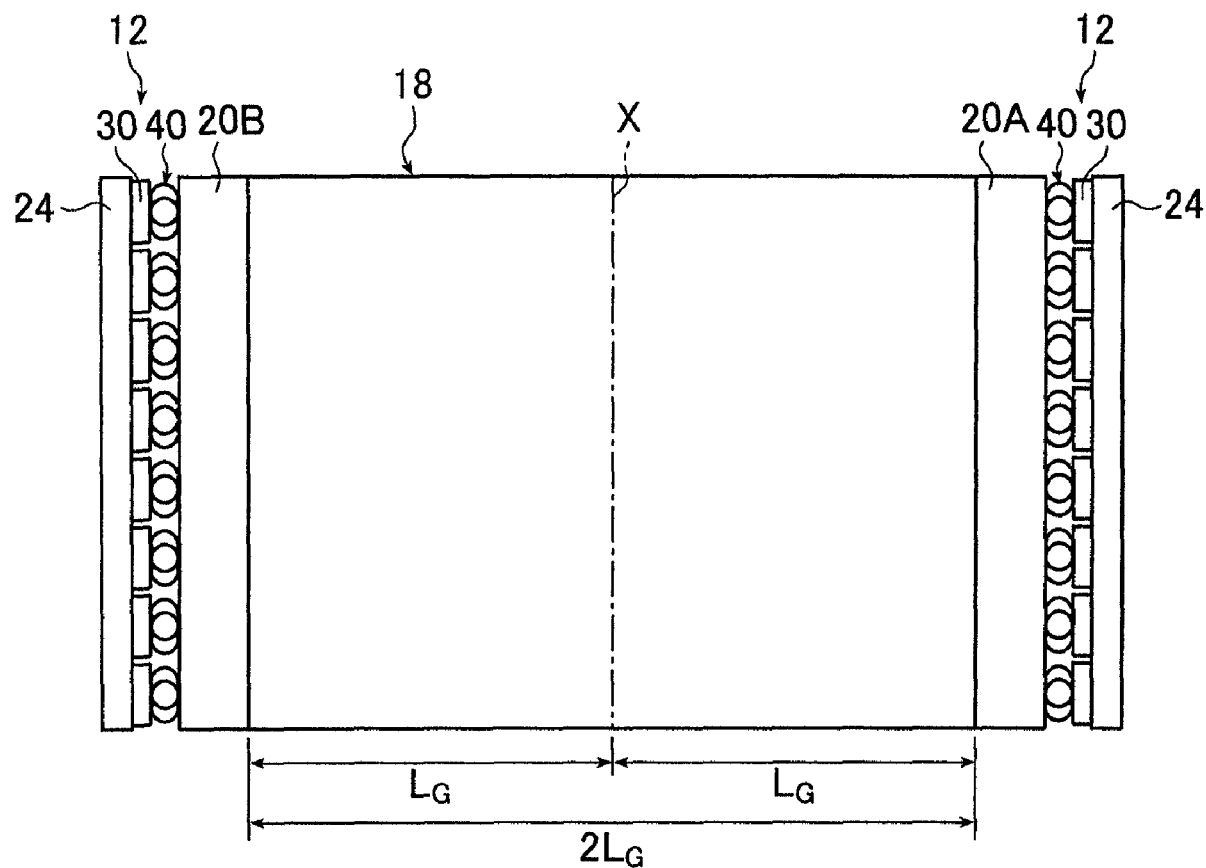
FIG. 2A is a schematic plan view of a light guide plate and light sources used in the inventive planar lighting device.
Figure 2B:
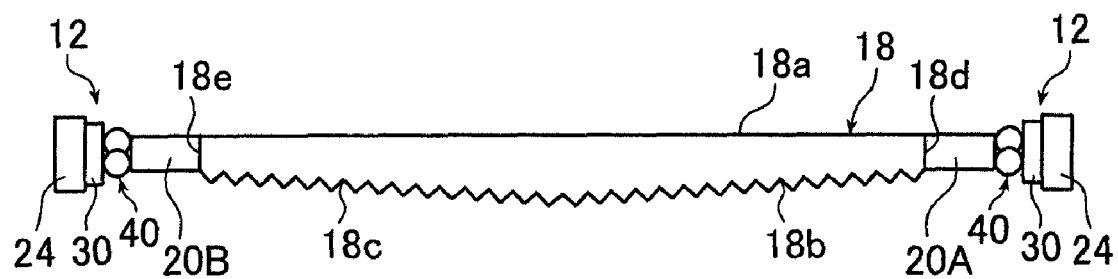
FIG. 2B is a schematic sectional view thereof.

FIG. 1A is a schematic perspective view of a liquid crystal display device provided with the planar lighting device according to the first embodiment of the present invention; FIG. 1B is a schematic sectional view of the liquid crystal display device. FIG. 2A is a schematic plan view of a light guide plate and light sources used in the inventive planar lighting device (hereinafter referred to as backlight unit); FIG. 2B is a schematic sectional view of the light guide plate.

A liquid crystal display device 10 comprises a backlight unit 2, a liquid crystal display panel 4 disposed on the side of the backlight unit closer to the light exit plane, and a drive unit 6 for driving the liquid crystal display panel 4.

In the liquid crystal display panel 4, electric field is partially applied to liquid crystal molecules previously arranged in a given direction to change the orientation of the molecules. The resultant changes in refractive index in the liquid crystal cells are used to display characters, figures, images, etc., on the liquid crystal display panel 4.

The drive unit 6 applies a voltage to transparent electrodes in the liquid crystal display panel 4 to change the orientation of the liquid crystal molecules, thereby controlling the transmittance of the light transmitted through the liquid crystal display panel 4.

The backlight unit 2 is a lighting device for illuminating the whole surface of the liquid crystal display panel 4 from behind the liquid crystal display panel 4 and comprises a light exit plane having substantially a same shape as an image display surface of the liquid crystal display panel 4.

As illustrated in FIGS. 2A and 2B, the backlight unit 2 according to the first embodiment of the present invention comprises two light sources 12, a diffusion film 14, a polarization separator film 16, a light guide plate 18 as a light guide member, a light mixer 20, and a reflection sheet 22. Now, components forming the backlight unit 2 will be described below.

First, the light sources 12 will be described.

As illustrated in FIG. 1B, the two light sources 12 are disposed such that the light guide plate 18 is held between them. Each light source 12 comprises an LED array 24 and coupling lenses 40. The LED array 24 is configured by RGB-LEDs 30 arranged in a row, each RGB-LED 30 being formed using three different light emitting diodes, i.e., red, green, and blue light emitting diodes (each referred to as R-LED 32, G-LED 34, and B-LED 36 below). FIG. 3 schematically illustrates how the RGB-LEDs 30 are arranged. The R-LED 32, the G-LED 34, and the B-LED 36 are regularly arranged as illustrated in FIG. 3.

Figure 4:
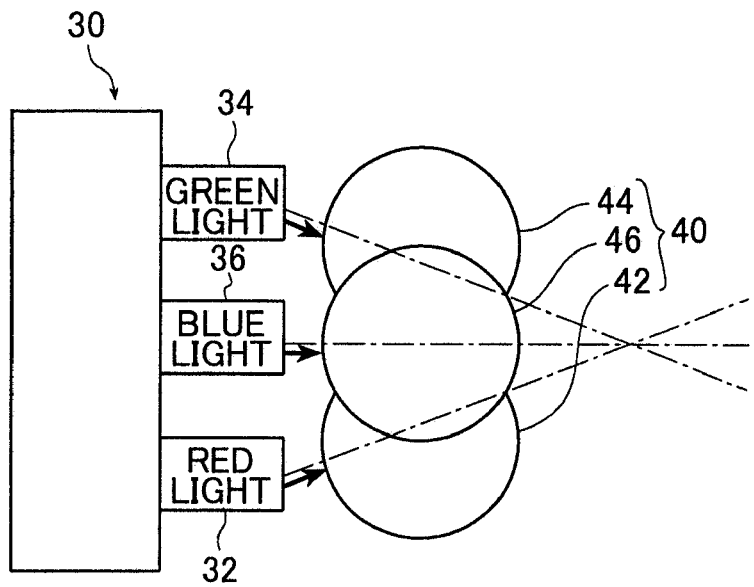
FIG. 4 is a schematic view of RGB-LEDs and coupling lenses.

In each RGB-LED 30, the directions of the optical axes of the three kinds of LEDs (the R-LED 32, the G-LED 34, and the B-LED 36) are adjusted as illustrated in FIG. 4 such that light beams leaving the R-LED 32, the G-LED 34, and the B-LED 36 cross one another at a given position. The three kinds of LEDs are thus adjusted such that the light beams from the LEDs are mixed to become white light.

The RGB-LED 30 configured using LEDs representing three primary colors (the R-LED 32, the G-LED 34, and the B-LED 36) achieves a wide range of color reproduction and a high color purity as compared with cold cathode tubes (CCFL) conventionally used as light source for backlight. Therefore, where the RGB-LED 30 is used as light source for backlight, color reproduction is improved over the prior art and images can be displayed in vivid color representation.

As illustrated in FIGS. 3 and 4, three ball lenses 42, 44, and 46 are disposed as coupling lens on the light emitting side of the respective LEDs of the RGB-LED 30. The ball lenses 42, 44, and 46 are disposed for the respective LEDs. Specifically, three ball lenses 42, 44, and 46 are allotted to one RGB-LED 30. Light beams leaving the LEDs (the R-LED 32, the G-LED 34, and the B-LED 36) are each collimated by the ball lenses 42, 44, and 46. The light beams then cross one another at a given position to become white light and enter a light mixer 20 of the light guide plate 18. The coupling lens composed of the three ball lenses 42, 44, and 46 is a lens having three axes, whereby light beams leaving the LEDs of the RGB-LED can be mixed such that said light beams meet at one point.

While ball lenses are used as coupling lens in the example under discussion, no specific limitation is placed thereon, provided that the coupling lens is capable of collimating the light beams emitted by the LEDs. One may use, for example, cylindrical lenses, lenticular lenses, half-cylindrical lenses, Fresnel lenses, etc., to form the coupling lens.

Next, the light guide plate 18 of the backlight unit 2 will be described.

As illustrated in FIG. 2A, the light guide plate 18 comprises a flat, substantially rectangular light exit plane 18a, two inclined planes (a first inclined plane 18b and a second inclined plane 18c) located on the opposite side from the light exit plane 18a and inclined a given angle with respect to the light exit plane 18a in such a manner as to be symmetrical to each other with respect to a bisector X parallel to one side of the light exit plane 18a and bisecting the light exit plane 18a, two light entrance planes (a first light entrance plane 18d and a second light entrance plane 18e) located opposite the two LED arrays 24 and admitting light emitted by the LED arrays 24. The first inclined plane 18b and the second inclined plane 18c are inclined with respect to the light exit plane 18a on both sides of the bisector X. The light guide plate 18 grows thicker from the first light entrance plane 18d and the second light entrance plane 18e to the center, and is thickest at the center and thinnest on both ends.

Expressed otherwise, the light guide plate 18 substantially has a plate-like shape, where the light exit plane 18a is located on the front side (a plane having a large area) of the plate, the first light entrance plane 18d and the second light entrance plane 18e are located on the lateral sides (elongate planes lying in the direction of the thickness) of the plate, and the first inclined plane 18b and the second inclined plane 18c are located on the rear side of the plate.

No specific limitation is placed on the angle of the first inclined plane 18b and the second inclined plane 18c with respect to the light exit plane 18a.

Further, the first inclined plane 18b and the second inclined plane 18c have prism arrays formed thereon in the direction parallel to the light entrance planes 18d and 18e. Instead of such prism arrays, optical elements similar to prisms may be formed regularly. For example, elements having lens effects such as lenticular lenses, concave lenses, convex lenses, or pyramid-shaped lenses may be formed on the inclined planes of the light guide plate.

In the light guide plate 18 illustrated in FIG. 2, light entering through the first light entrance plane 18d and the second light entrance plane 18e is scattered by scatterers (described later in detail) contained inside the light guide plate 18 as light travels through the inside of the light guide plate 18 and, directly or after being reflected by the first inclined plane 18b and the second inclined plane 18c, exits through the light exit plane 18a. Some light can in the process leak through the first inclined plane 18b and the second inclined plane 18c but is then reflected by the reflection sheet (not shown) covering the first inclined plane 18b and the second inclined plane 18c back into the light guide plate 18.

The light guide plate 18 is formed of a transparent resin into which scattering particles for scattering light are kneaded and dispersed. Transparent resin materials that may be used to form the light guide plate 18 include optically transparent resins such as PET (polyethylene terephthalate), PP (polypropylene), PC (polycarbonate), PMMA (polymethyl methacrylate), benzyl methacrylate, MS resins, and COP (cycloolefin polymer). To form the scattering particles kneaded and dispersed into the light guide plate 18, one may use, for example, TOSPEARL (trademark), silicone, silica, zirconia, or a derivative polymer. The light guide plate 18 containing such scattering particles is capable of emitting uniform illumination light through the light exit plane with a reduced level of brightness unevenness.

The light guide plate 18 so formed may be manufactured using an extrusion molding method or an injection molding method.

Now, let $\Phi$ be the scattering cross section of the scattering particles contained in the light guide plate 18; $L_G$ the length of the light guide plate 18 in the direction in which light is admitted from the light entrance plane to a position where the thickness of the light guide plate in the direction perpendicular to the light exit plane is greatest, the length $L_G$ being, in the embodiment under discussion, a half of the length of the light guide plate in the direction in which light is admitted (direction perpendicular to the first light entrance plane 18d of the light guide plate 18; also referred to as "direction of the optical axis" below); $N_p$ the density of the scattering particles contained in the light guide plate 18 (number of particles in unit volume); and $K_C$ a compensation coefficient. Then a relationship holds that the value $\Phi \cdot N_p \cdot L_G \cdot K_C$ is not less than 1.1 and not greater than 8.2, and that the compensation coefficient $K_C$ is not less than 0.005 and not greater than 0.1. The light guide plate 18, containing scattering particles satisfying the above relationship, is capable of emitting uniform illumination light through the light exit plane with a reduced level of brightness unevenness.

When parallel light beams are caused to enter an isotropic medium, a transmittance T is generally expressed according to the Lambert-Beer law by the following expression (1):

$$T = I/I_o = \exp(-\rho \cdot x) \quad (1)$$

where x is a distance, $I_o$ an intensity of incoming light, I an intensity of outgoing light, and $\rho$ an attenuation constant.

The above attenuation constant $\rho$ can be expressed using $\Phi$, the scattering cross section of particles and $N_p$, the number of particles in unit volume contained in the medium as follows:

$$\rho = \Phi \cdot N_p \quad (2)$$

Accordingly, a light extraction efficiency $E_{out}$ is expressed by the following expression (3) where $L_G$ is a half of the length of the light guide plate in the direction of the optical axis. The length $L_G$, a half of the length of the light guide plate in the direction of the optical axis, is the length of the light guide plate 18 in the direction perpendicular to the light entrance planes from one of the light entrance planes of the light guide plate 18 to the center of the light guide plate 18.

The light extraction efficiency $E_{out}$ is a ratio of light reaching the position distanced from the light entrance plane of the light guide plate by the length $L_G$ in the direction of the optical axis to the incoming light. In the case of the light guide plate 18 illustrated in FIG. 2, for example, the light extraction efficiency $E_{out}$ is a ratio of light reaching the center of the light guide plate (position determined by a half of the length of the light guide plate in the direction of the optical axis) to the light incident on the end faces.

$$E_{out} \propto \exp(-\Phi \cdot N_p \cdot L_G) \quad (3)$$

The expression (3) applies to a space of limited dimensions. To correct the relationship with the expression (1), the compensation coefficient $K_C$ is therein introduced. The compensation coefficient $K_C$ is a dimensionless compensation coefficient empirically obtained where light propagates through an optical medium of limited dimensions. The light extraction efficiency $E_{out}$ is then expressed by the following expression (4).

$$E_{out} = \exp(-\Phi \cdot N_p \cdot L_G \cdot K_C) \quad (4)$$

According to the expression (4), when $\Phi \cdot N_p \cdot L_G \cdot K_C$ is 3.5, the light extraction efficiency $E_{out}$ is 3%; When $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. It is assumed that the light extraction efficiency $E_{out}$ thus decreases because light is scattered increasingly as it travels in the direction of the optical axis of the light guide plate.

It follows, therefore, that the greater the value $\Phi \cdot N_p \cdot L_G \cdot K_C$ is, the more preferable a property of the light guide plate is. To be more specific, when $\Phi \cdot N_p \cdot L_G \cdot K_C$ is great, light exiting through the plane opposite a plane through which light is admitted can be reduced whereas light emitted through the light exit plane can be increased. Expressed otherwise, when $\Phi \cdot N_p \cdot L_G \cdot K_C$ is great, the ratio of light emitted through the light exit plane to the light incident on the light entrance planes can be increased (that ratio being also referred to as "light use efficiency" below). Specifically, a light use efficiency as high as 50% or more is achieved when $\Phi \cdot N_p \cdot L_G \cdot K_C$ is 1.1 or greater.

While light emitted through the light exit plane 18a of the light guide plate 18 increasingly exhibits illuminance unevenness as $\Phi \cdot N_p \cdot L_G \cdot K_C$ increases, the illuminance unevenness can be held to under a given level (within a tolerable range) by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate preferably satisfies a relationship that it is not less than 1.1 and not greater than 8.2, and more preferably not less than 2.0 and not greater than 7.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1.

Now, the light guide plate will be described in greater detail by referring to specific examples.

A computer simulation was conducted to obtain light use efficiencies for different light guide plates given different values of $\Phi \cdot N_p \cdot L_G \cdot K_C$ by varying the scattering cross section $\Phi$, the particle density $N_p$, the length $L_G$, which is a half of the length of the light guide plate in the direction of the optical axis, and the compensation coefficient $K_C$. Further, illuminance unevenness was evaluated. The illuminance unevenness [%] was defined as $[(I_{Max}-I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

The measurement results are shown in Table 1 below. In Table 1, judgments "O" indicate cases where the light use efficiency is 50% or more and the illuminance unevenness is 150% or less whereas judgments "X" indicate cases where the light use efficiency is less than 50% or the illuminance unevenness is more than 150%.

Figure 5:
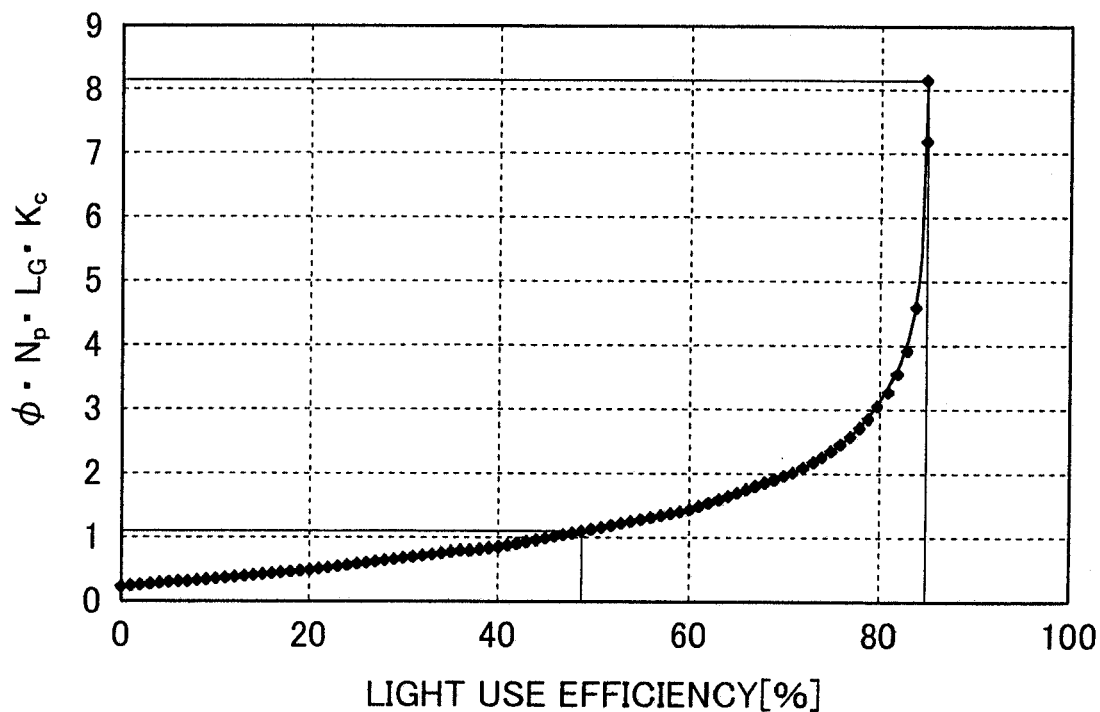
FIG. 5 is a graph illustrating measurements showing a relationship between $\Phi \cdot N_P \cdot L_G \cdot K_C$ and light use efficiency.

FIG. 5 illustrates a relationship between the value of $\Phi \cdot N_p \cdot L_G \cdot K_C$ and light use efficiency (ratio of light emitted through the light exit plane to light incident on the light entrance planes).

Figure 6:
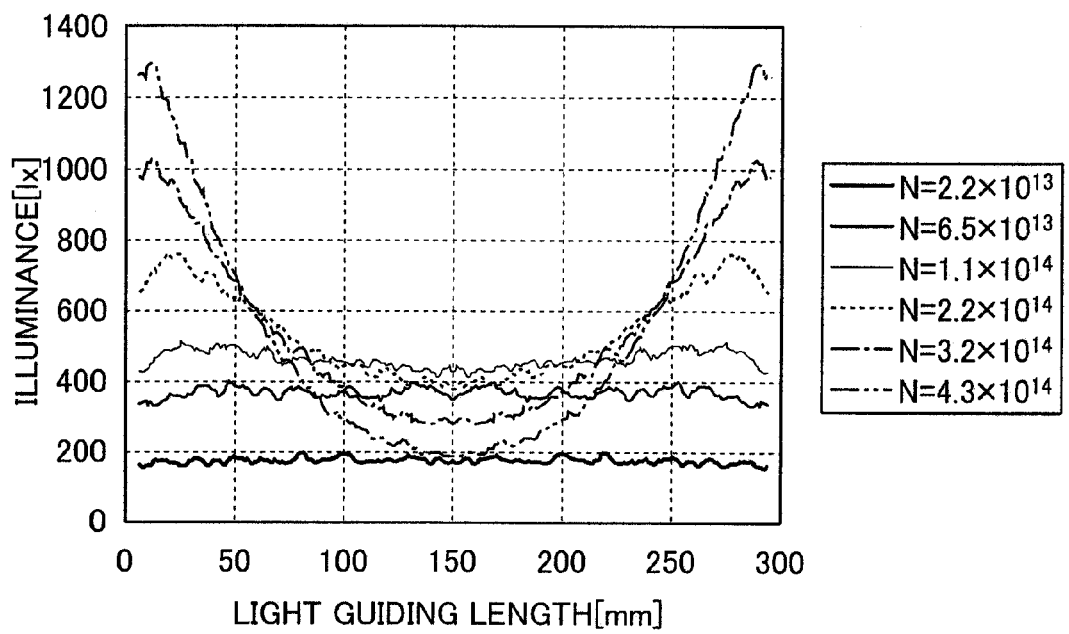
FIG. 6 is a graph illustrating measurements of illuminance of light emitted from different light guide plates having different particle-densities.

FIG. 6 shows the measurements of the distribution of illuminance observed in the light emitted through the light exit plane of the individual light guide plates having different particle densities. FIG. 6 shows the illuminance [lx] on the vertical axis plotted against the distance [mm] from one of the light entrance planes of the light guide plate (light guiding length) on the horizontal axis.

Further, illuminance unevenness was calculated from $[(I_{Max}-I_{Min})/I_{Ave}] \times 100$ [%], where $I_{Max}$ is a maximum illuminance in the measured distribution of light emitted through the side walls of the light guide plate, $I_{Min}$, is a minimum illuminance, and $I_{Ave}$ is an average illuminance.

Figure 7:
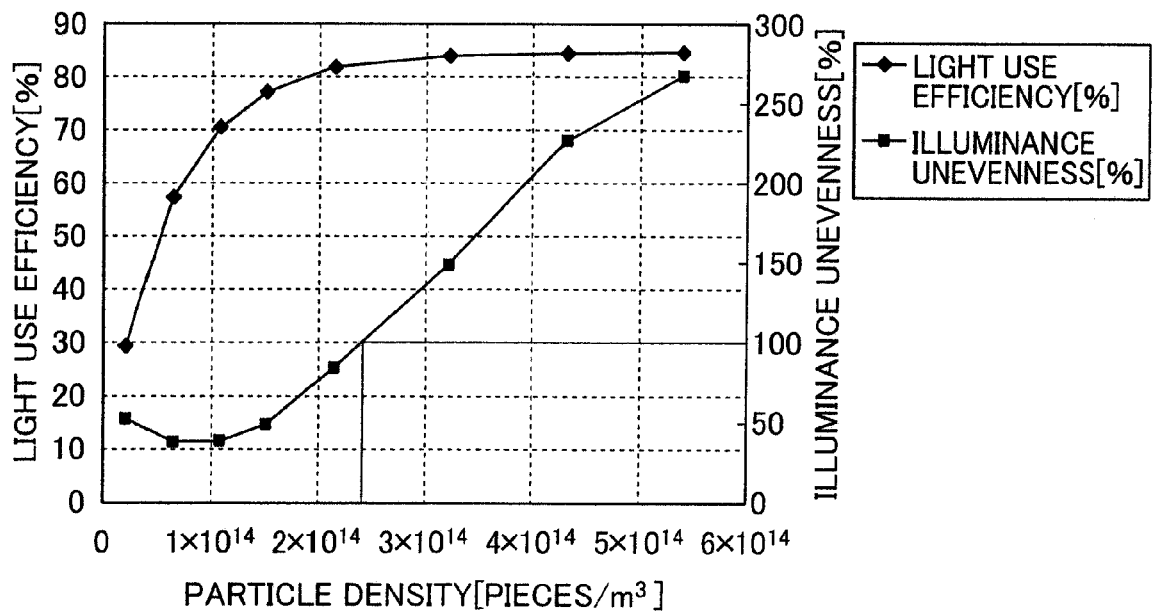
FIG. 7 is a graph illustrating a relationship between light use efficiency and illuminance unevenness on the one hand and particle density on the other.

FIG. 7 illustrates a relationship between calculated illuminance unevenness and particle density. FIG. 7 shows the illuminance unevenness [%] on the vertical axis plotted against the particle density [pieces/m$^3$] on the horizontal axis. Also shown in FIG. 7 is a relationship between light use efficiency and particle density, the particle density being likewise indicated on the horizontal axis and the light use efficiency [%] on the vertical axis.

As shown in FIGS. 6 and 7, increasing the particle density or, consequently, increasing $\Phi \cdot N_p \cdot L_G \cdot K_C$, results in an enhanced light use efficiency but then illuminance unevenness also increases. It is also shown that reducing the particle density or, consequently, reducing $\Phi \cdot N_p \cdot L_G \cdot K_C$, results in a lowered light use efficiency but then illuminance unevenness decreases.

TABLE 1

| | $\Phi$ [m$^2$] | $N_p$ [pcs/m$^3$] | $L_G$ [m] | $K_C$ | $\Phi \cdot N_p \cdot L_G \cdot K_C$ | Light use efficiency [%] | Illuminance unevenness [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | O |
| Example 2 | $2.0 \times 10^{-12}$ | $4.3 \times 10^{14}$ | 0.3 | 0.02 | 6.21 | 84.7 | 149 | O |
| Example 3 | $2.0 \times 10^{-12}$ | $8.6 \times 10^{14}$ | 0.1 | 0.02 | 3.86 | 82.8 | 82 | O |
| Example 4 | $1.1 \times 10^{-10}$ | $1.5 \times 10^{13}$ | 0.3 | 0.008 | 3.91 | 83.0 | 105 | O |
| Example 5 | $1.1 \times 10^{-10}$ | $2.0 \times 10^{13}$ | 0.3 | 0.007 | 4.98 | 84.3 | 142 | O |
| Example 6 | $1.1 \times 10^{-10}$ | $3.5 \times 10^{13}$ | 0.1 | 0.007 | 2.86 | 79.2 | 47 | O |
| Comparative example 1 | $2.0 \times 10^{-12}$ | $2.2 \times 10^{13}$ | 0.3 | 0.05 | 0.66 | 29.1 | 51 | X |
| Comparative example 2 | $1.1 \times 10^{-12}$ | $2.5 \times 10^{12}$ | 0.3 | 0.01 | 0.99 | 43.4 | 59 | X |
| Comparative example 3 | $4.8 \times 10^{-18}$ | $8.6 \times 10^{17}$ | 0.1 | 15.2 | 6.26 | 84.8 | 201 | X |
| Comparative example 4 | $4.8 \times 10^{-18}$ | $1.7 \times 10^{18}$ | 0.1 | 13.9 | 11.5 | 84.9 | 225 | X |

Table 1 and FIG. 5 show that given $\Phi \cdot N_p \cdot L_G \cdot K_C$ of 1.1 or more, a high light use efficiency, specifically 50% or more, is achieved whereas given $\Phi \cdot N_p \cdot L_G \cdot K_C$ of 8.2 or less, illuminance unevenness can be held to 150% or less.

It is also shown that given $K_C$ of 0.005 or more, a high light use efficiency is achieved, and given $K_C$ of 0.1 or less, illuminance unevenness observed in light emitted from the light guide plate can be reduced to a low level.

Next, light guide plates varying in particle density $N_p$ of the particles kneaded or dispersed in the light guide plates were constructed to measure brightness distributions of light emitted at different locations in the light exit plane of the individual light guide plates. In the embodiments under discussion, conditions including scattering cross section $\Phi$, the length $L_G$, which is a half of the length of the light guide plate in the direction of its optical axis, the compensation coefficient $K_C$, and the shape of the light guide plate, excluding the particle density $N_p$, were respectively set to fixed values as the measurements were made. In the embodiment under discussion, therefore, $\Phi \cdot N_p \cdot L_G \cdot K_C$ changes in proportion as the particle density $N_p$ changes.

The value of $\Phi \cdot N_p \cdot L_G \cdot K_C$ not less than 1.1 and not greater than 8.2 yields a light use efficiency of 50% or more and illuminance unevenness of 150% or less. Illuminance unevenness, when reduced to 150% or less, can be made inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

In the light guide unit 18, at least one surface of the first light entrance plane 18d and the second light entrance plane 18e, through which light is admitted, the light exit plane 18a, and the first inclined plane 18b and the second inclined plane 18c, which reflect light, preferably has a surface roughness Ra of smaller than 380 nm, thus, Ra<380 nm.

When the first light entrance plane 18d and the second light entrance plane 18e, through which light is admitted, is given a surface roughness Ra of smaller than 380 nm, diffuse reflection on the surfaces of the light guide unit can be ignored or, in other words, diffuse reflection on the surfaces of the light guide unit can be prevented and, thus, light admission efficiency can be improved.

Further, when the light exit plane 18a is given a surface roughness Ra of smaller than 380 nm, transmission by diffuse reflection through the surfaces of the light guide unit can be ignored or, in other words, transmission by diffuse reflection on the surfaces of the light guide unit can be prevented and, therefore, light is allowed to travel further deep into the light guide unit by total reflection.

Further, when the first inclined plane 18b and the second inclined plane 18c, which reflect light, is given a surface roughness Ra of smaller than 380 nm, diffuse reflection can be ignored or, in other words, diffuse reflection on these reflective surfaces can be prevented and, therefore, all the reflected light components are allowed to travel further deep into the light guide unit.

Now, let D1 be the thickness of the light guide plate at its light entrance plane (thickness at the light entrance) and D2 the thickness of the light guide plate at the plane located on the side opposite from the light entrance plane (thickness at the center), and L the length of the light guide plate in the direction in which light is admitted (light guiding length). Then, the following relationships preferably hold:

D1<D2 and

27/100000<(D2−D1)/(L/2)<5/100 (A); and the ratio Npa of the weight of the contained scattering particles to the weight of the light guide plate preferably satisfies a range:

0.04% Wt<Npa<0.25% Wt.

When the shape satisfies the above relationships, the light emission efficiency can be increased to 30% or more.

Alternatively, the following relationships preferably hold:
D1<D2 and
66/100000<(D2−D1)/(L/2)<26/1000 (B); and the ratio Npa of the weight of the contained scattering particles to the weight of the light guide plate preferably satisfies a range:
0.04% Wt<Npa<0.25% Wt.

When the shape satisfies the above relationships, the light emission efficiency can be increased to 40% or more.

Further, the following relationships preferably hold:
D1<D2 and
1/1000<(D2−D1)/(L/2)<26/1000 (C); and the ratio Npa of the weight of the contained scattering particles to the weight of the light guide plate preferably satisfies a range of:
0.04% Wt<Npa<0.25% Wt.

When the shape satisfies the above relationships, the light emission efficiency can be increased to 50% or more.

Figure 8:
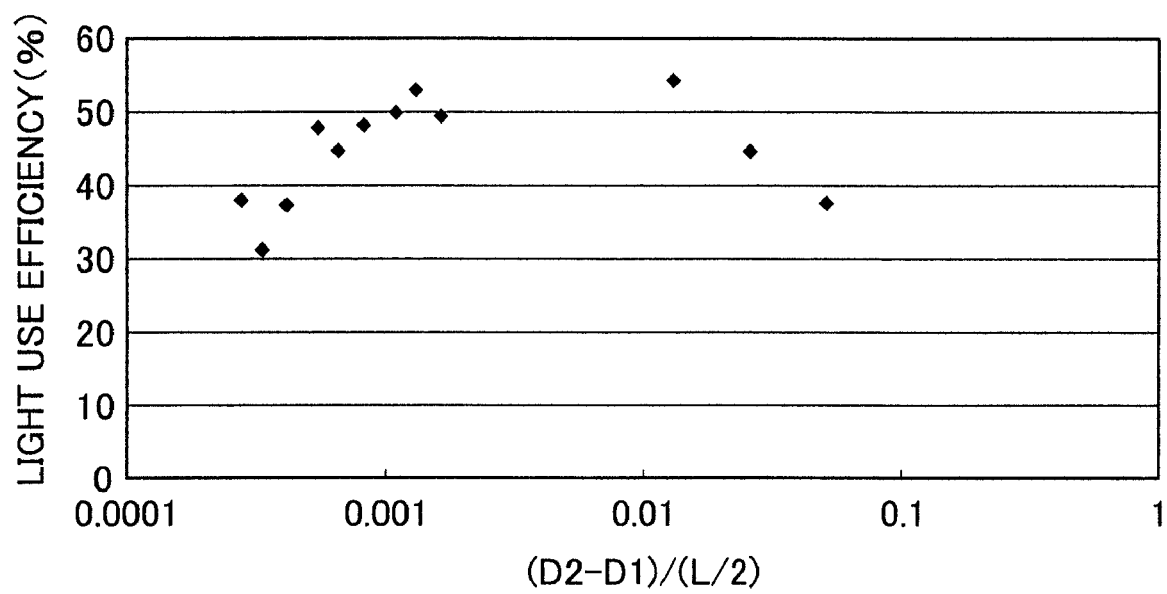
FIG. 8 is a graph illustrating a relationship between the shape of the light guide plate and light use efficiency.

FIG. 8 shows measurements of light use efficiencies of light guide plates having different inclination angles of the inclined planes, i.e., light guide plates having various shapes with different (D2−D1)/(L/2). FIG. 8 indicates (D2−D1)/(L/2) of the light guide plate on the horizontal axis plotted against light use efficiency [%] on the vertical axis.

FIG. 8 also reveals that when the light guide plate has a shape satisfying 27/100000<(D2−D1)/(L/2)<5/100, the light use efficiency can be increased to 30% or more; that when the light guide plate has a shape satisfying 66/100000<(D2−D1)/(L/2)<26/1000, the light use efficiency can be increased to 40% or more; and that when the light guide plate has a shape satisfying 1/1000<(D2−D1)/(L/2)<26/1000, the light use efficiency can be increased to 50% or more.

While the two inclined planes (the first inclined plane 18b and the second inclined plane 18c) of the light guide plate 18, in the embodiment under discussion, have prism arrays formed thereon for efficient reflection of light, the prism arrays need not necessarily be formed and the inclined planes may be allowed to have a flat surface without an asperity formed thereon.

While the planes of the light guide plate opposite the light exit plane are inclined a given angle with respect to the light exit plane in the embodiment under discussion, the present invention is not limited thereto; the light guide plate may have any shape, provided that the light guide plate is thicker at the plane opposite the light entrance plane than at the light entrance plane. For example, the plane of the light guide plate opposite the light exit plane (the first inclined plane 18b and/or the second inclined plane 18c illustrated in FIGS. 1 and 2) may be a curved surface. Where the inclined plane is formed to be a curved plane, it may be curved outward or inward with respect to the light exit plane.

Now, examples of preferred shapes of the light guide plate will be described referring to FIG. 9 below.

FIGS. 9A to 9D are schematic sectional views illustrating other examples of the light guide plate. FIG. 10A is a schematic sectional view illustrating another example of the light guide plate; FIG. 10B is a schematic sectional view illustrating a part near the joint of the inclined planes of the light guide plate of FIG. 10A as enlarged.

Figure 9A:
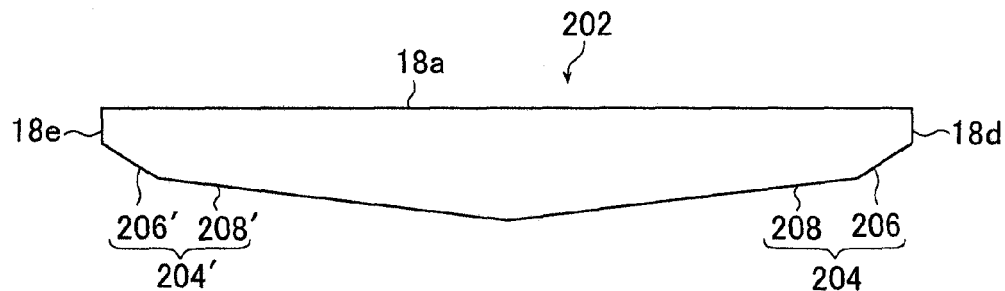
FIGS. 9A to 9D are schematic sectional views illustrating other examples of the light guide plate, respectively.
Figure 10A:
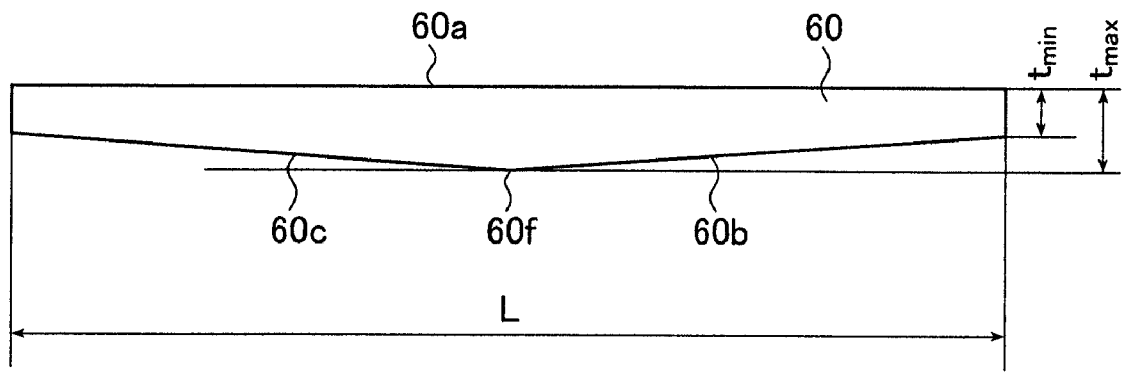
FIG. 10A is a schematic sectional view illustrating another example of the light guide plate.
Figure 10B:
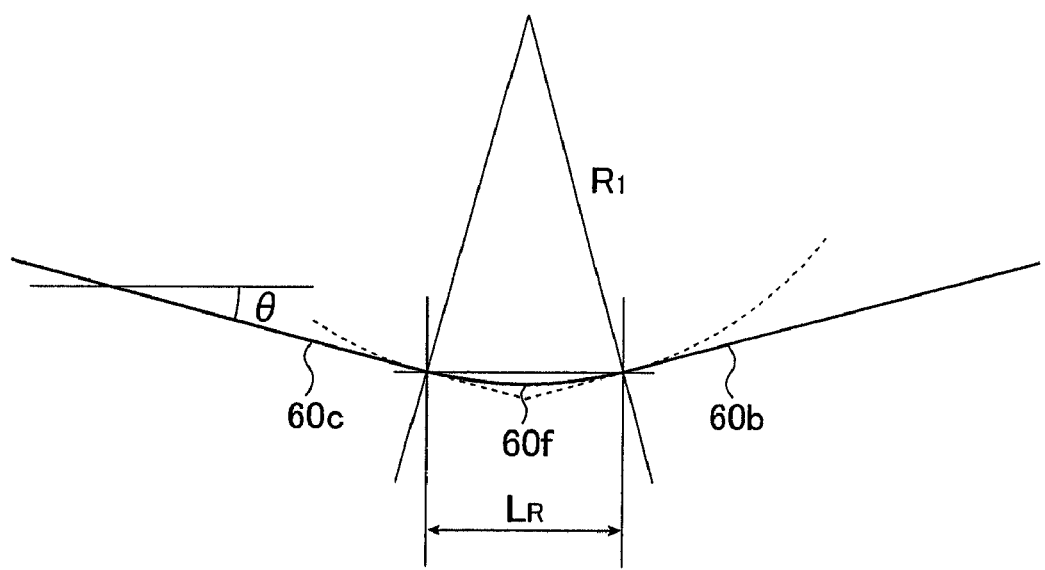
FIG. 10B is a schematic sectional view illustrating part of the light guide plate of FIG. 10A enlarged.

In a light guide plate 202 of FIG. 9A, a first inclined plane 204 comprises a first inclined portion 206 located closer to the light entrance plane 18d and a second inclined portion 208 located closer to the center of the light guide plate. The first inclined portion 206 and the second inclined portion 208 are inclined by different angles from each other with respect to the light exit plane such that the inclination angle of the first inclined portion 208 is smaller than the inclination angle of the second inclined portion 206. Expressed otherwise, the first inclined plane is formed with inclined portions of which the inclination angles grow smaller toward the center of the light guide plate.

A second inclined plane 204' is symmetric to the first inclined plane 204 and comprises a first inclined portion 206' located closer to the light entrance plane 18e and a second inclined portion 208' located closer to the center of the light guide plate and having an inclination angle smaller than that of the first inclined portion 206'.

Where the inclined planes are given a cross section shaped by straight lines defining different inclination angles such that the inclination angle of the inclined portion located closer to the light entrance plane is greater than the inclination angle of the inclined portion located closer to the center, the increase in brightness of light emitted at an area of the light exit plane near the light entrance planes can be prevented. This enables more uniform light to be emitted through the light exit plane.

While each inclined plane consists of two inclined portions in FIG. 9A, the number of inclined portions forming the inclined plane is not limited specifically; each inclined plane may be composed of any number of inclined portions, provided that the inclination angle grows gradually smaller toward the center of the light guide plate.

Figure 9B:
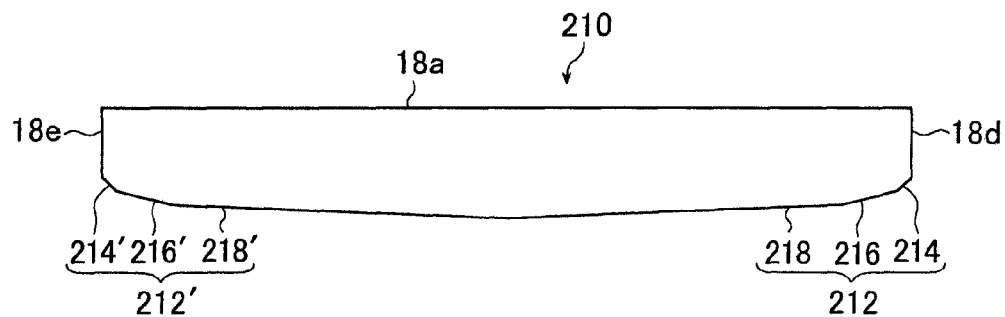

As illustrated in FIG. 9B, for example, a first inclined portion 212 (a second inclined portion 212') of a light guide plate 210 may be formed with three inclined portions: a first inclined portion 214 (214'), a second inclined portion 216 (216') having a smaller inclination angle than the first inclined portion 214 (214'), and a third inclined portion 218 (218') having a smaller inclination angle than the second inclined portion 216 (216'), arranged from the first light entrance plane 18d (the second light entrance plane 18e) toward the center of the light guide plate.

Figure 9C:
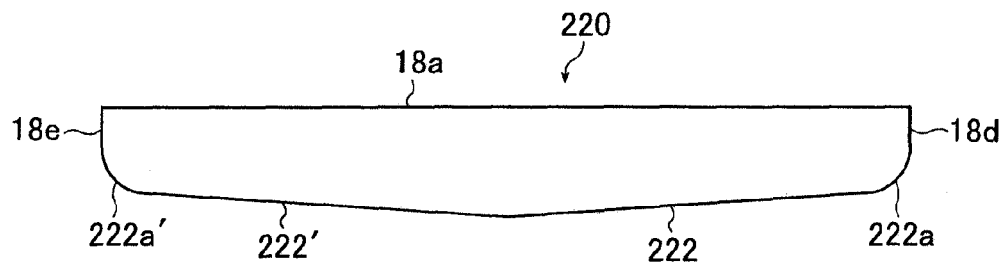

Next, a light guide plate 220 illustrated in FIG. 9C comprises a rounded portion 222a at the end of a first inclined plane 222 closer to the first light entrance plane 18d, i.e., at the joint of the first inclined plane 222 with the first light entrance plane 18*d*. Likewise, a second inclined plane 2221 also has a rounded portion 222*a*' at its end closer to the second light entrance plane 18*e*.

Thus, the increase in brightness of light emitted at the area of the light exit plane near the light entrance planes can be prevented also by the above configuration where the rounded portion is provided at the joint of the inclined plane with the light entrance plane such that the light entrance plane smoothly connects with the inclined plane.

Figure 9D:
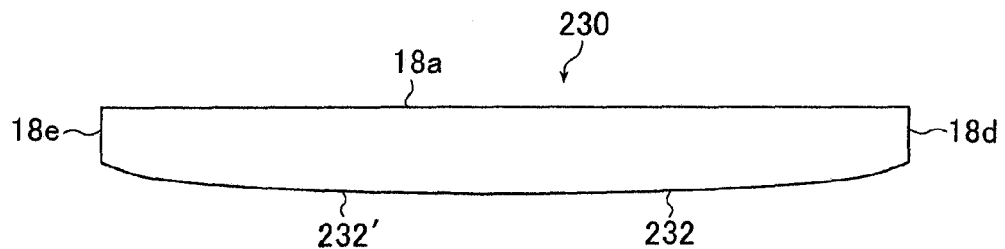

Next, a light guide plate 230 illustrated in FIG. 9D has a first inclined plane 232 and a second inclined plane 2321 formed into an aspherical shape that may be expressed by a 10-th order polynomial.

Thus, the increase in brightness of light emitted at the area of the light exit plane near the light entrance planes can be prevented also by forming the inclined planes into an aspherical shape.

Further, as illustrated in FIGS. 10A and 10B, a light guide plate 60 preferably has a curved or rounded joint 60*f* between a first inclined plane 60*b* and a second inclined plane 60*c* (the central portion of the inclined planes of the light guide plate) allowing a smooth connection. This prevents occurrence of bright lines or dark lines at the joint 60*f* between the first inclined plane 60*b* and the second inclined plane 60*c*, and enables emission of light with an increased uniformity.

Where the joint 60*f* between the inclined planes 60*b* and 60*c* of the light guide plate 60, i.e., the central part of the light guide plate 60, is formed into a rounded shape, the relationship between the radius of curvature $R_1$, which is a radius of curvature of the rounded shape, and the length L of the light guide plate in the direction in which light is admitted preferably satisfies $3L \leq R_1 \leq 500L$.

Further, $2R_1 \cdot \sin(\theta) \leq L_R$ preferably holds, where $L_R$ denotes the length of the rounded portion of the joint 60*f* from one end thereof to the other in the direction in which light is admitted, and $\theta$ denotes the angle formed by a plane parallel to a light exit plane 60*a* and the first inclined plane 60*b* (or the second inclined plane 60*c*).

Where $L_R$ is not smaller than $2R_1 \cdot \sin(\theta) \leq L$, the decrease in brightness at the central part can be prevented and light with an increased uniformity can be emitted through the light exit plane.

Further, the light guide plate preferably has a shape satisfying $3L \leq R_1 \leq 500L$ and $2R_1 \cdot \sin(\theta) \leq L_R \leq 0.98L$.

The angle $\theta$ can be represented by the following expression (D) using a maximum thickness $t_{max}$ of the light guide plate 60, a minimum thickness $t_{min}$, and the length L of the light guide plate in the direction in which light is admitted.

$$\theta = \tan^{-1}\left[\frac{t_{max} - t_{min}}{L/2}\right] \quad (D)$$

The light guide plate may be made by mixing a plasticizer into the transparent resin described earlier.

The light guide plate made of materials containing a transparent material mixed with a plasticizer is given a flexibility, or a pliability such that the light guide plate can be formed into various shapes. Thus, the surface of the light guide plate can be formed into various curved surfaces.

Therefore, in cases where, for example, the light guide plate or a planar lighting device using the light guide plate is used as a display board employing ornamental lighting (illuminations), it can also be mounted to a wall having a curvature. Thus, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

As illustrated in FIGS. 1 and 2, the backlight unit 2 according to the embodiment under discussion has light mixers 20A and 20B provided on both sides of the light guide plate 18 in close contact therewith. The light mixers 20A and 20B are columnar optical members formed of a transparent resin containing light scattering particles mixed therein and have a function to mix incoming light admitted through the coupling lenses 40. The light mixers 20A and 20B may basically be formed of a same material as the light guide plate 18 and may contain scattering particles for scattering light inside. The density, etc., of the scatterers contained in the light mixers 20A and 20B may be identical to or different from those of the scatters contained in the light guide plate 18. The light mixers 20A and 20B, located close to the LED array 24*s* as illustrated in FIG. 2, are preferably formed of a material having a great heat resistance.

Next, the polarization separator film 16 will be described.

In the embodiment under discussion, the polarization separator film 16 in a preferred embodiment preferably is integrally formed with the light guide plate 18 on the light exit plane 18*a*, which is a plane located on the light emitting side of the light guide plate 18. The polarization separator film 16 is capable of selectively transmitting a given polarized component, e.g., p-polarized component, of light emitted through the light exit plane of the light guide plate and reflecting almost all of the other polarized components, e.g., s-polarized component. The polarization separator film 16 causes reflected light to reenter the light guide plate for reuse, which greatly increases light use efficiency and enhances brightness.

The polarization separator film 16 may for example be obtained by mixing, kneading, and dispersing acicular particles into a transparent resin and stretching a resultant sheet material to orient the acicular particles in a given direction.

The polarization separator film 16 preferably is integrated with the light guide plate 18 by compression or fusion at the time of manufacture. Thus, the light exit plane 18*a* of the light guide plate 18 and the polarization separator film 16 can be brought into close contact without allowing air therebetween.

While the polarization separator film 16 is integrated with the light guide plate 18 in the above example, the present invention is not limited thereto; the polarization separator film 16 and the light guide plate 18 may be manufactured each separately, bonding the polarization separator film 16 to a surface located on the light emitting side of the light guide plate 18.

While the polarization separator film 16 is provided immediately on the light exit plane of the light guide plate 18 in the illustrated example, the present invention is not limited thereto; the polarization separator film 16 may be provided on the diffusion film. In this case, the polarization separator film 16 may be integrated with the diffusion film.

Further, the polarization separator film 16 may be a known polarization separator film.

For example, one may use a birefringent material having a refractive index greater than that of the light guide plate at the light exit plane thereof with respect to at least one plane of polarization and having a refractive index lower than an average refractive index of the light guide plate with respect to a plane of polarization perpendicular to said plane of polarization, as described in JP 06-331824 A.

Alternatively, one may use a stretched film as described in JP 11-281975 A. When a stretched film is used, the film is preferably bonded to one of both surfaces of the light guide plate by means of an adhesive layer or a bond layer as described in JP 11-281975 A.

Alternatively, one may use a multilayered structure composed of transparent media having a relatively high refractive index and transparent media having a relatively low refractive index laminated alternately on one another, a planar transparent base material having formed on at least one of both surfaces thereof at least one layer of dielectric film having a thickness of preferably not greater than 1000 nm, or a multi-layered transparent polymers having different refractive indices, as described in JP 07-49496 A.

Alternatively, one may use a polarization separator comprising a transparent base material having a substantially W-shaped cross section provided with at least one layer of dielectric thin film having a thickness not greater than a wavelength of visible light, said polarization separator transmitting the p-polarized component of light adjacent a given incident direction, while reflecting at least part of the s-polarized component of light, as described in JP 07-72475 A.

Alternatively, one may use a retroreflective polarizer as described in JP 2004-78234 A comprising a first material, a second material, and at least one optical deposit. The first material has a structured surface consisting of linear arrays of juxtaposed prisms each having an essentially isosceles coefficient with a substantially right angle and each having a plane of vertical coefficient forming an angle of about 45° with respect to a tangential plane to the smooth surface on the side opposite from said structured surface; the second material is essentially the same as the first material. Said at least one optical deposit lies on the structured surface of at least one of said materials and is composed of alternately accumulated layers of high refractive index materials and low refractive index materials having selected optical thicknesses. The first and the second materials are all optically joined to form a single unit where the refractive indices of the first and the second materials and said refractive indices and optical thicknesses of the layers forming said optical deposit are all so selected as to cause selective reflection of polarized light such that incoming mixed beams of polarized light are separated into an s-polarized component and a p-polarized component inside a part of said optical deposit. Said s-polarized component is reflected by the other part of said optical deposit in a direction parallel to the incident light in said other part, then traveling in the opposite direction to the incident light. Said p-polarized component is transmitted parallel to the incident light.

One may alternatively use a polarizing element comprising a transparent material having a triangular wave shape formed thereon with alternately provided A-shaped ridges and V-shaped grooves and a multilayered dielectric films having a polarizing filter function and a retardation function provided on said transparent material.

Alternatively, one may use a multilayered polarizing film as described in U.S. Pat. No. 3,610,729 B comprising successively laminated, alternating layers of birefringent materials each having a thickness of one quarter of various wavelengths.

Alternatively, one may use a polymeric optical film as described in U.S. Pat. No. 5,867,316 B comprising a continuous phase and a small amount of dispersed phase inside the continuous phase.

Alternatively, one may use a polarization separator film as described in JP 2003-295183 A comprising a metal thin film using surface plasmon sandwiched by transparent media having a low refractive index.

Moreover, brightness can be further improved by a configuration of the light guide plate integrated with a polarization direction changing film for changing the polarization direction of light, such as a $\lambda/4$ phase-film having a slightly birefringent property causing a difference of $\lambda/4$ in optical thickness between mutually perpendicular polarized light components or a diffusing film, in addition to providing a polarization separator film using surface plasmon that transmits only the p-polarized component parallel to the incident plane and reflects the s-polarized component perpendicular to the incident plane.

In place of the polarization separator film 16, one may use a scattering type polarizing film using anisotropic scatterers formed by stretching a compound material of liquid crystal and a polymer as described in JP 08-76114 A or one may use as the polarization separator film 16 a cholesteric polarizing film where the axis of the molecular helix is so oriented as to extend across the film and the pitch of the molecular helix in the film varies by a difference of at least 100 nm between a maximum pitch and a minimum pitch, as described in JP 06-281814 A.

Alternatively, one may use a haze anisotropic layer where the value of the haze varies with the vibration direction of the linear polarized light as described in JP 2001-343612 A. In this case, it is preferable to attach a first retardation film to the surface opposite from the light exit plane of the light guide plate and provide a second retardation film between the light guide plate and the reflection plate.

Further, one may use a polarizing element as described in JP 09-274108 A comprising minute regions formed of a material different from that of a transparent polymer film in which said minute regions are evenly dispersed, the polymer film and the minute regions having approximately a same refractive index with respect to one of the mutually perpendicular linear polarized light beams and different refractive indices with respect to the other.

While improvement in brightness is achieved by providing the polarization separator film on the light emitting side of the light guide plate 18 in the above embodiment, brightness of light emitted through the light exit plane can also be improved by forming a micro-asperity having a polarization separator function on the light exit plane of the light guide plate, as described in JP 2001-201746 A and JP 2001-228474, instead of providing the polarization separator film.

In place of the polarization separator film 16, one may alternatively improve brightness by disposing between the light guide plate and a reflection member (reflection plate) an anisotropic layer having a first refractive index virtually equal to or greater than that of the light guide plate and a second refractive index virtually smaller than that of the light guide plate and separating substantially the entirety of a first polarized state from a second polarized state perpendicular to the first polarized state, as described in JP 09-134607 A.

Brightness may also be improved by forming a roughened surface pattern on the inclined rear surfaces of the light guide plate consisting of fine projections and having a polarization separator function, as described in JP 2004-363062 A.

Further, one may provide a light waveguide path (light guide plate) with recesses filled with a material different from that of the light waveguide path, one of these two materials being an isotropic material having a refractive index of np, the other being an anisotropic material having refractive indices of no and ne, as described in JP 10-508151 A. The refractive indices of these materials are determined such that either no or ne is equal or virtually equal to np. Thus, the polarized beams of light can be separated at a boundary surface between the isotropic material and the anisotropic material such that a majority of the light radiated from the light source can be converted into light having a same polarization direction before leaving the light waveguide path. Thus, brightness can also be improved by applying the configuration described in JP 10-508151 A to the present invention.

Further, brightness can also be improved by forming the light guide plate with two or more layers having a light guiding function such that at least one of a first layer and a second layer has a birefringent property and that an interface is provided between the first and the second layers, thereby emitting light that is scattered, refracted or diffracted at the interface through a surface of the light guide plate, as described in JP 09-292530 A.

Next, the reflection sheet 22 of the backlight unit will be described.

The reflection sheet 22 is provided to reflect light leaking through the inclined planes 18c and 18d of the light guide plate 18 back into the light guide plate 18, thereby enhancing the light use efficiency. The reflection sheet 22 is bent at the middle thereof to cover the inclined planes 18c and 18d of the light guide plate 18.

The reflection sheet 22 may be formed of any material that is capable of reflecting light leaking through the inclined planes 18c and 18d of the light guide plate 18. It may be formed, for example, of a resin sheet formed by kneading PET, PP (polypropylene), etc. with a filler and then drawing a resultant mixture to form voids therein thereby to increase the reflectance; a sheet formed by depositing aluminum vapor or otherwise forming a specular surface on the surface of a transparent resin sheet or a white resin sheet; a metal foil such as an aluminum foil or a resin sheet carrying a metal foil; and a metal thin plate having sufficient reflective property on the surface.

Next, the diffusion film 14 will be described.

As illustrated in FIG. 1, the diffusion film 14 is disposed between the polarization separator film 16 and the liquid crystal display panel 4. The diffusion film 14 is formed by imparting a light diffusing property to a material in the form of film. The material in the form of film may be formed of an optically transparent resin such as PET (polyethylene terephthalate), PP (polypropylene), PC (polycarbonate), PMMA (polymethyl methacrylate), benzyl methacrylate, an MS resin, or COP (cycloolefin polymer).

The method of manufacturing the diffusion film 14 is not limited specifically. For example, a surface of the material in the form of film may be machined to form an asperity thereon or roughened by grinding thereby to provide a light diffusing property, or by coating the surface with a material that diffuses light as exemplified by silica; pigments such as titanium oxide and zinc oxide; a resin; and beads of glass, zirconia, etc., together with a binder, or by kneading the above pigments or beads having a light diffusing property into said transparent resin. Otherwise, one may also use a material having a high reflectance and a low light-absorbing property such as metals as exemplified by Ag and Al.

In the present invention, a diffusion film of a matte type or a coating type may be used as the diffusion film 14.

The diffusion film 14 may be disposed a given distance apart from the light exit plane of the light guide plate 18. The distance may be altered as appropriate according to the light amount distribution of light emitted through the light exit plane of the light guide plate 18.

With the diffusion film 14 spaced a given distance apart from the light exit plane of the light guide plate 18, the light emitted from the light exit plane of the light guide plate 18 is further mixed (blended) between the light exit plane and the diffusion film 14. This further enhances the uniformity of brightness of light transmitted through the diffusion film 14 to illuminate the liquid crystal display panel 4.

The diffusion film 14 may be spaced a given distance apart from the light exit plane of the light guide plate 18 using a method, for example, whereby spacers are provided between the diffusion film 14 and the light guide plate 18.

While components of the backlight unit 2 according to the first embodiment of the present invention are described in detail above, the present invention is by no means limited thereto.

While the above embodiment uses the red, green, and blue LEDs 32, 34, and 36, and light beams emitted by the individual LEDs are mixed by the coupling lens 40 to obtain white light, the present invention is not limited thereto. The light source may use a monochromatic LED whose emitted light is converted into white light through a fluorescent substance. Where a GaN base blue LED is used as a monochromatic LED, for example, white light can be obtained using a YAG (yttrium aluminum garnet) base fluorescent substance.

Such light source whereby white light can be obtained eliminates the need to use lenses and, hence, reduces the number of components required.

Figure 11A:
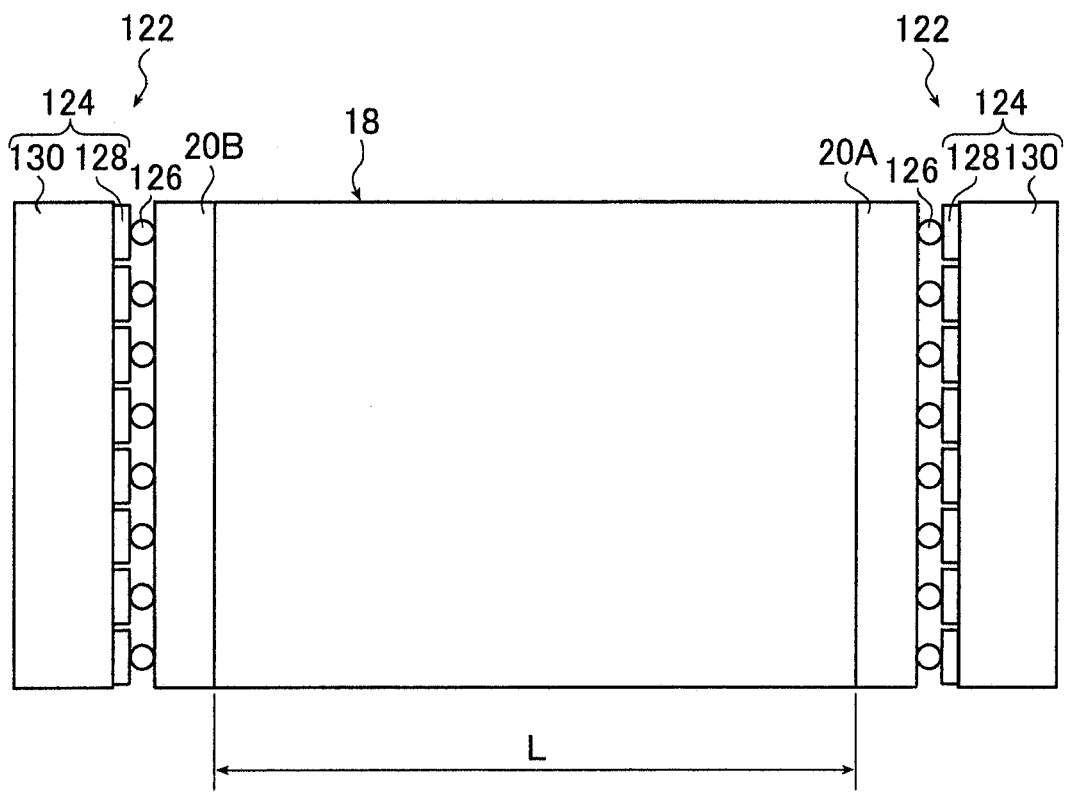
FIG. 11A is a schematic plan view of a light guide plate and light sources used in the inventive planar lighting device.
Figure 11B:
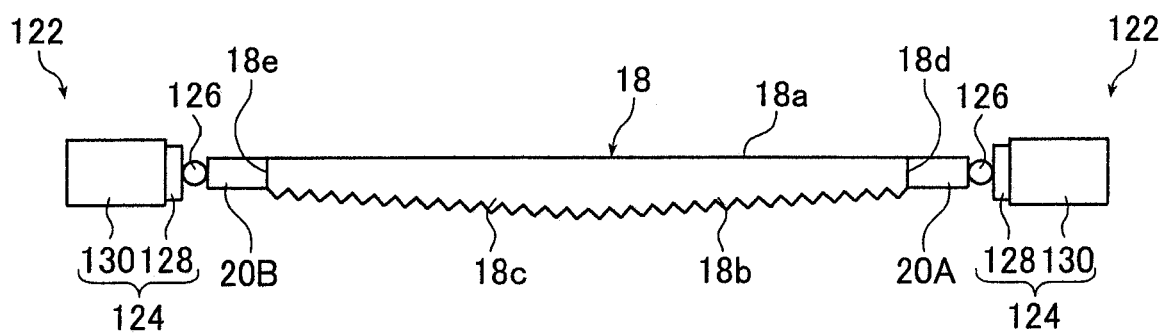
FIG. 11B is a schematic sectional view thereof.

FIG. 11A is a schematic plan view illustrating an embodiment of the planar lighting device (backlight) using monochromatic LEDs as light source; FIG. 11B is a schematic sectional view of the planar lighting device.

Except for light sources 122, the components of a backlight unit 120 illustrated in FIGS. 11A and 11B have similar configurations to those of the backlight unit 2 of FIG. 1. Accordingly, like components share like reference characters between the two, and detailed descriptions thereof will not be given here, focusing instead on features unique to the backlight unit 120 below.

The light sources 122 comprise LED arrays 124 and coupling lenses 126 and are disposed opposite the first light entrance plane 18d and the second light entrance plane 18e as illustrated in FIG. 11A.

Figure 12A:
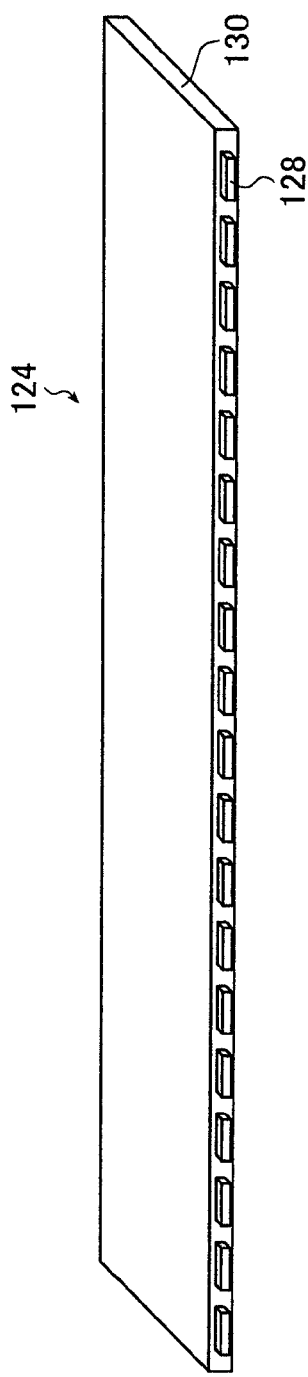
FIG. 12A is a schematic perspective view illustrating an example of configuration of an LED array used in the present invention.
Figure 12B:
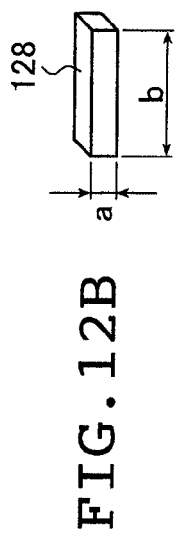
FIG. 12B is a schematic front view of an LED chip of the LED array illustrated in FIG. 12A.
Figure 12C:
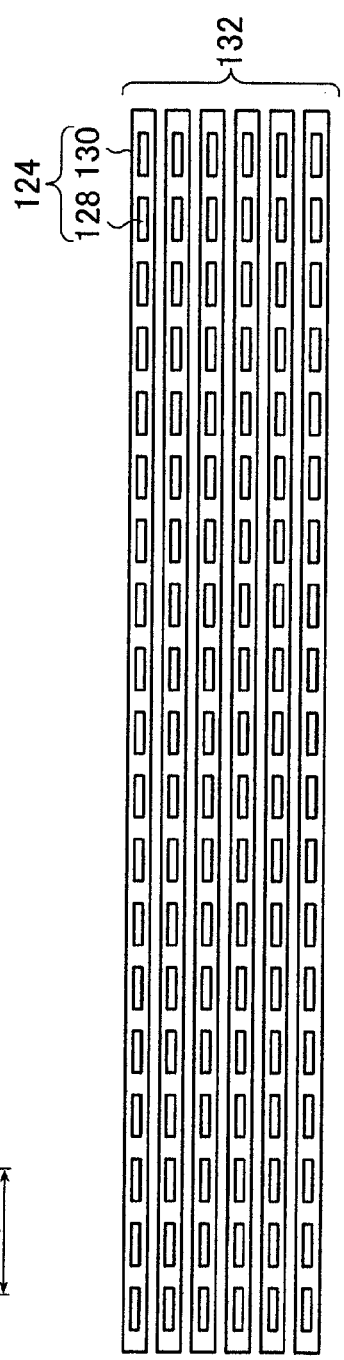
FIG. 12C is a schematic front view illustrating the configuration of a multilayered LED array using the LED array of FIG. 12A.

In each of the LED arrays 124, LED chips 128 are disposed in a row at given intervals on a heat sink 130. FIG. 12A is a schematic perspective view illustrating a configuration of the LED array 124; FIG. 12B is a schematic top view of a configuration of an LED chip 128; FIG. 12C is a schematic plan view of a configuration of multilayered LED array 132; and FIG. 3D is a schematic side view of an embodiment of a heat sink 25.

The LED chip 128 is a monochromatic LED configured such that light emitted by an LED thereof is converted into white light using the fluorescent substance mentioned earlier.

The heat sink 130 is a sheet member parallel to one side of the light guide plate 18 and disposed opposite the light guide plate 18. The heat sink 130 carries LED chips 128 on a surface thereof facing the light guide plate 18. The heat sink 130 is formed of a metal having a good thermal conductivity such as copper or aluminum to absorb and release heat generated by the LED chips 128 to the outside.

The heat sink 130 preferably has a shape such that, as in the embodiment under discussion, the length thereof in the direction perpendicular to the plane thereof facing the first light entrance plane and the second light entrance plane of the light guide plate 18 is longer than the length of the plane thereof facing the first light entrance plane and the second light entrance plane of the light guide plate 18 in the direction of the shorter sides. This increases the efficiency with which the LED chips 128 are cooled.

Figure 12D:
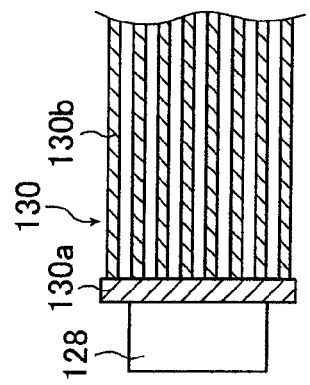
FIG. 12D is a schematic side view illustrating an embodiment of a heat sink.

The heat sink preferably has a large surface area. For example, the heat sink 130 may be configured for example by a base 130*a* carrying the LED chips 128 and a plurality of fins 130*b* joined to the base 130*a* as illustrated in FIG. 12D.

A plurality of fins 130*b* provided secure a large surface area and a high heat dissipation efficiency, increasing the efficiency with which the LED chips 128 are cooled.

The heat sink may be not only of air-cooled type but also of water-cooled type.

While the embodiment under discussion uses a heat sink as a support member for the LED chips, the present invention is not limited thereto: where the LED chips need not be cooled, a sheet member without a heat-releasing function may be used as the support member.

As illustrated in FIG. 12B, the LED chip 128 according to the embodiment under discussion has a rectangular shape such that the sides perpendicular to the direction in which the LED chips 128 are arrayed are shorter than the sides lying in the direction in which the LED chips 128 are arrayed or, in other words, the sides lying in the direction of thickness of the light guide plate 18 (the direction perpendicular to the light exit plane 18*a*) are the shorter sides. Expressed otherwise, the LED chip 128 has a shape satisfying b>a where "a" denotes the length of the sides perpendicular to the light exit plane 18*a* of the light guide plate 18 and "b" denotes the length of the sides in the direction of the array. Further, let "p" be a distance by which the arrayed LED chips 128 are spaced apart from one another, then p>b holds. Thus, the relationship between the length "a" of the sides of the LED chips 128 perpendicular to the light exit plane 18*a* of the light guide plate 18, the length "b" of the sides in the direction of the array, and the distance "p" of the LED chips 128 by which the arrayed LED chips 128 are spaced apart from one another preferably satisfies p>b>a.

The LED chips 128 each given a rectangular shape allows the thickness of the light source to be reduced while maintaining a great amount in which light is produced. A thinner light source, in turn, enables a thinner design of the planar lighting device to be achieved.

While the LED chips each preferably have a rectangular shape with the shorter sides lying in the direction of thickness of the light guide plate to achieve a thinner design of the LED array, the present invention is not limited thereto, allowing use of LED chips having any shape as appropriate such as a square, a circle, a polygon, and an ellipse.

While the LED array is monolayered in the embodiment under discussion, the present invention is not limited thereto; one may use a multilayered LED array 132 comprising a plurality of LED arrays 124 for the light source as illustrated in FIG. 12C. Where the LEDs are thus stacked, more LED arrays can be stacked when the LED chips are each given a rectangular shape and the LED arrays each have a reduced thickness. Where the LED arrays are stacked into a multilayer, that is to say, where more LED arrays (LED chips) are packed into a given space, an increased amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

As illustrated in FIG. 3, ball lenses are provided as coupling lenses 126 on the light emitting side of the respective LED chips 128 of the LED array 124. The coupling lenses 126 are provided for the respective LED chips 128. Light emitted by the individual LED chips 128 is collimated by the coupling lenses 126 before entering the light mixer 20 of the light guide plate 18.

While ball lenses are used as coupling lenses here, one may use various types of members capable of collimating light emitted by the LEDs other than ball lenses. One may use, for example, a cylindrical lens, a lenticular lens, a half-cylindrical lens, a Fresnel lens, etc.

Instead of providing the LED arrays 24 opposite the first light entrance plane and the second light entrance plane of the light guide plate 18, light guides may be used to lead light emitted by the LEDs of the LED arrays 24 to the light guide plate. The light guides may be formed, for example, of optical fibers and light guide paths made of a transparent resin.

Where the LED arrays 24 are used as light source and located close to the lateral planes of the light guide plate 18, heat generated by the LEDs forming the LED array 24 may possibly deform or melt the light guide unit 18. Deformation and melting of the light guide 18 due to the heat generated by the LEDs, however, can be prevented by locating the LED arrays 24 away from the lateral planes of the light guide plate 18 and leading light emitted by the LEDs as far as the light guide plate 18 through the light guides.

Other examples of the light source using LEDs include one where blue LEDs are used with a red-green fluorescent substance. Specifically, one may use a fluorescent element where the LEDs are used with a fluorescent substance as described in JP 2005-228996 A.

Alternatively, one may use a light source where red LEDs are used with red, green, and blue fluorescent substances. Examples of such light source include a light emitting device where an LED is used with a fluorescent substance as described in JP 2000-347691 A, a white light emitting diode where an LED is used with fluorescent substances as described in JP 2002-43633 A, and a light emitting device where an LED is used with fluorescent substances as described in JP 2005-126577 A. The present invention is not limited to providing a fluorescent substance opposite the light emission face of the LED to radiate white light; emission of white light through the light exit plane is also achieved by mixing a fluorescent substance into the light guide plate instead of providing a fluorescent substance opposite the light emission face of the LED.

One may alternatively use a configuration where an optical sheet having a fluorescent substance applied thereto or mixed therein is disposed on the light exit plane of the light guide plate instead of or in addition to disposing a fluorescent substance opposite the light emission face of the LED.

While the heat sink of the LED array is shaped like a flat plate and disposed on the rear side of the LED chip to extend parallel to the light exit plane in the above embodiment, it may alternatively be formed into a bent shape like a letter L, for example, in such a manner as to extend from behind the LED chip toward the inclined plane of the light guide plate, i.e., over the rear side of the reflection member. This serves to reduce the area of the planar lighting device lying in the direction parallel to the light exit plane.

Where the heat sink is formed into a bent shape and disposed on the side of the light guide plate closer to the inclined plane, the heat sink preferably has a thickness and/or a length that does not affect the thickness of the backlight unit. Where the heat sink is made thinner than a maximum thickness and a minimum thickness of the light guide plate and disposed on the rear side of the inclined planes, the space between the inclined planes of the light guide plate and a housing can be used efficiently, and the thickness of the planar lighting device can be reduced.

The heat sink may be formed of a material having a high thermal conductivity such as, for example, aluminum or copper, as described earlier as well as various other materials.

Preferably, the heat sink thermally communicates with the housing, which supports the light guide plate, the reflection members, the LED arrays, and the like from the outside. To be brief, the heat sink preferably communicates thermally with the housing. Where the heat sink thermally communicates with the housing, heat generated by the LED chips can be released from the whole backlight unit (planar lighting device).

Thus, efficient heat dissipation is achieved.

The heat sink and the housing need not necessarily be in immediate contact with each other; they may be in contact with each other via a thermal connector.

Figure 13:
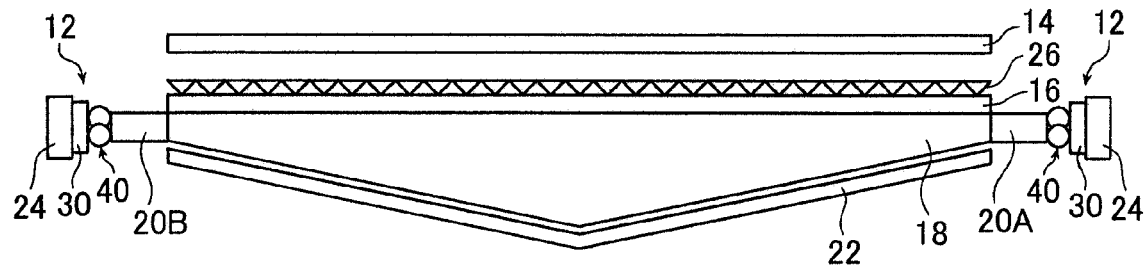
FIG. 13 is a schematic view illustrating a configuration of a backlight unit comprising a prism sheet on the light exit plane of the light guide plate of FIG. 1.

While the above embodiment has a configuration where prism arrays are formed on the first inclined plane 18b and the second inclined plane 18c of the light guide plate 18, like effect may be achieved by a configuration where a prism sheet having prism arrays formed thereon is disposed on the light exit plane 18a of the light guide plate 18 without forming the prism arrays on the first inclined plane 18b and the second inclined plane 18c of the light guide plate 18. FIG. 13 schematically illustrates a configuration of the backlight unit where a prism sheet 26 is disposed on the light exit plane 18a of the light guide plate 18. In the illustrated example, the light guide plate 18, the polarization separator film 16, and the prism sheet 26 are formed integrally. While the light guide plate 18, the polarization separator film 16, and the prism sheet 26 are integrally formed here, they may be provided as discrete members.

The prism sheet 26 is a transparent sheet formed by prisms arranged parallel to one another and helps condense light emitted through the light exit plane of the light guide plate 18 to improve brightness.

The light guide plate 18, the polarization separator film 16, and the prism sheet 26 may be integrated by a method whereby, for example, the polarization separator film 16 and the prism sheet 26 are integrated into a sheet first, whereon the sheet is united with the light guide plate 18 by fusion or compression at the time of manufacture of the light guide plate 18.

The polarization separator film 16 may be integrated with the prism sheet 26 by a method whereby, for example, the polarization separator film 16 and the prism sheet 26 are manufactured separately and simply bonded to each other, or by a method whereby a polarization separator sheet material is fed to the molding rolls of a continuous extruder, whereon the polarization separator film is fused to the extruded prism sheet. The present invention is not limited to these methods, however.

Alternatively, the prism sheet may be provided between the polarization separator film 16 and the diffusion sheet 14 of the backlight unit illustrated in FIG. 1 comprising the light guide plate 18 having prism arrays formed on the first inclined plane 18b and the second inclined plane 18c.

While the prism sheet is composed of a single sheet in the example illustrated in FIG. 13, it may be composed of two sheets. In this case, one of the two prism sheets is disposed such that the prism arrays thereof extend parallel to the light entrance planes (the first light entrance plane and the second light entrance plane) of the light guide plate 18; the other is disposed with the prism arrays extending perpendicular thereto. Thus, the two prism sheets are disposed such that their respective prism arrays extend perpendicular to each other. Further, the prism sheets are preferably disposed such that the vertexes of the prisms face the polarization separator film 16.

Where two prism sheets are provided, the order in which the prism sheets are disposed is not specifically limited. To be more specific, one may dispose the prism sheet having prisms extending parallel to the light entrance plane of the light guide plate 18 immediately on the polarization separator film 16 while overlaying on that prism sheet the other prism sheet having prisms extending perpendicular to the light entrance plane of the light guide plate 18, or the prism sheets may be disposed in the reversed order.

While the illustrated example uses the prism sheet 26, a sheet on which optical elements similar to prisms are arranged regularly may be used instead of the prism sheet 26. For example, one may use a sheet on which optical elements having lens effects such as lenticular lenses, concave lenses, convex lenses, or pyramid-shaped lenses are arranged regularly instead of the prism sheet.

Alternatively, a plurality of diffusion films may be used without using the prism sheet. Then, two or more, preferably three diffusion films are used.

Figure 14:
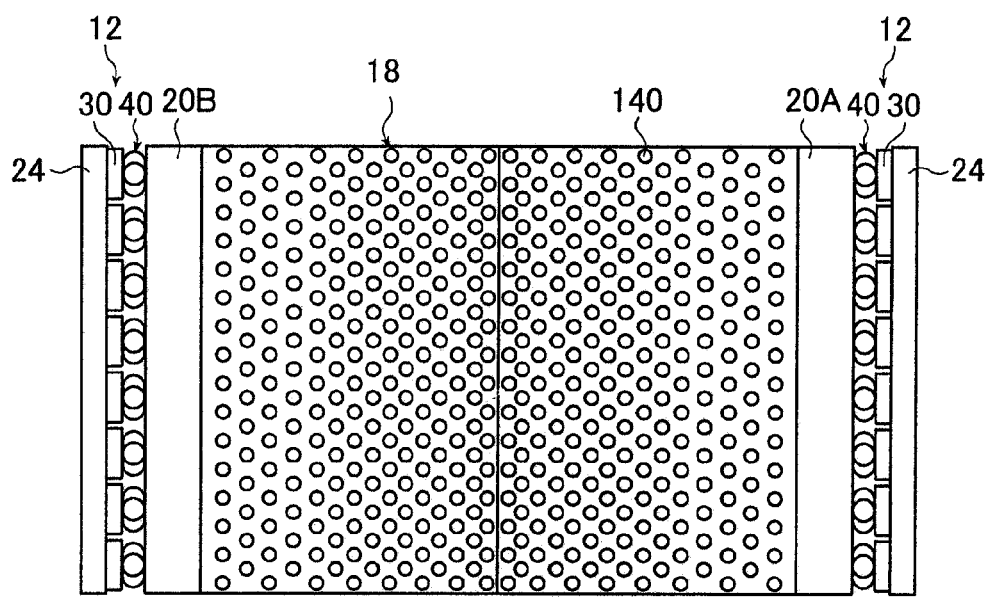
FIG. 14 is a schematic top plan of a planar lighting device with a light guide plate having diffusion reflectors printed on the inclined planes.

Further, as illustrated in FIG. 14, a plurality of diffusion reflectors 140 may be formed, by printing for example, on the first inclined plane 18b and the second inclined plane 18c of the light guide plate 18 in a given pattern, specifically in such a pattern that the density is low on the end portions of the light guide plate 18, i.e., close to the first light entrance plane 18d and the second light entrance plane 18e, growing gradually higher toward the center of the light guide plate 18. Such diffusion reflectors 120 formed on the inclined plane 18b of the light guide plate 18 in a given pattern limit generation of bright lines or unevenness on the light exit plane 18a of the light guide plate 18.

Instead of printing the diffusion reflector 140 on the first inclined plane 18b and the second inclined plane 18c of the light guide plate 18, a thin sheet having the diffusion reflectors 140 formed thereon in a given pattern may be disposed between the first inclined plane 18b and the second inclined plane 18c of the light guide plate 18 and the reflection sheet 22. The diffusion reflectors 140 may each have any shape such as a rectangle, a polygon, a circle, and an ellipse.

The diffusion reflectors 140 may be formed, for example, by applying a material for diffusing light as exemplified by silica; pigments such as titanium oxide and zinc oxide; a resin; and beads of glass, zirconia, etc., together with a binder, or may be a pattern created by machining the surface to form an asperity thereon or by grinding to roughen the surface. Otherwise, one may use a material having a high reflectance and a low light-absorbing property such as metals as exemplified by Ag and Al. One may also use ordinary white ink as used in screen printing, offset printing, etc., to form diffusion reflectors. One may use, for example, ink obtained by dispersing titanium oxide, zinc oxide, zinc sulfate, barium sulfate, etc. into acrylic binder, polyester binder, vinyl chloride binder, etc.; or ink given a diffusing property by mixing titanium oxide with silica.

While the diffusion reflectors are distributed in a density that increases with the increasing distance from the light entrance plane in the embodiment under discussion, the present invention is not limited thereto and may be determined as appropriate according to the intensity or distribution of bright lines, brightness distribution required of emitted light, etc. The diffusion reflectors, for example, may be distributed evenly on the whole surface of the inclined planes or in a density that increases with the increasing distance from the light entrance planes. Further, instead of providing the diffusion reflectors by printing, the positions corresponding to the locations of the diffusion reflectors may be roughened to provide sand-rubbed surfaces.

While the diffusion reflectors are provided on the inclined planes in the light guide plate of FIG. 14, the present invention is not limited thereto; the diffusion reflectors may be provided on any plane as desired except the light entrance planes.

Further, the planar lighting device may be provided on the light emitting side thereof with a transmittance adjusting member having a function to reduce brightness unevenness of light emitted through the light exit plane.

Figure 15:
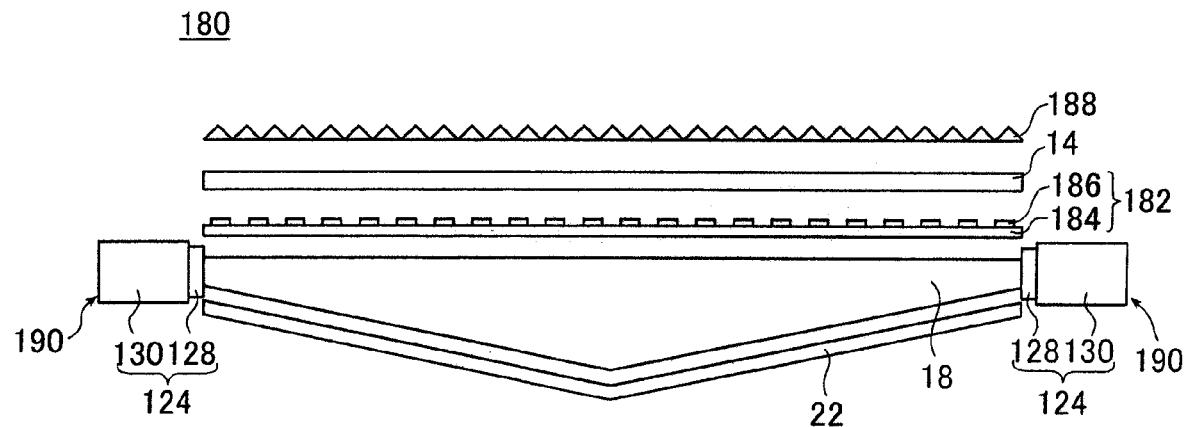
FIG. 15 is a schematic sectional view illustrating an example of the planar lighting device comprising a transmittance adjusting member.

FIG. 15 is a schematic sectional view of a planar lighting device 180 provided with a transmittance adjusting member 182.

The planar lighting device 180 comprises light sources 190, the diffusion film 14, the light guide plate 18, the reflection sheet 22, the transmittance adjusting member 182, and a prism sheet 188.

The diffusion film 14, the light guide plate 18, and the reflection sheet 22 have the same functions as the diffusion film, the light guide plate, the reflection sheet of FIG. 13 and, therefore, detailed description thereof will not be given here.

The light sources 190 have substantially the same configuration as the LED arrays 124 each comprising the LED chips 128 and the heat sink 130 described earlier; in the embodiment under discussion, the LED arrays 124 are disposed opposite the first light entrance plane 18*d* and the second light entrance plane 18*e* of the light guide plate 18. Thus, the coupling lenses and the light mixers are not provided between the LED arrays 124 and the first light entrance plane 18*d* and the second light entrance plane 18*e*. Thus, light emitted from the LED arrays 124 enters the light guide plate 18 directly.

On the light exit plane 18*a* of the light guide plate 18 are laid the transmittance adjusting member 182, the diffusion film 14, and the prism sheet 188 in this order on one another. The prism sheet 188 has substantially the same function and shape as the prism sheet 26 described above and is disposed such that the vertexes of the prisms face the diffusion sheet 14 or, expressed otherwise, the base of the prisms are parallel to the light entrance plane 18*a* of the light guide plate 18.

As described above, the transmittance adjusting member 182 is used to reduce brightness unevenness of light emitted from the light guide plate and comprises a transparent film 184 and numerous transmittance adjusters 186 arranged on the surface of the transparent film 184.

The transparent film 184 is in the form of a film and formed of optically transparent resins such as PET (polyethylene terephthalate), PP (polypropylene), PC (polycarbonate), PMMA (polymethyl methacrylate), benzyl methacrylate, MS resins, other acrylic resins or COP (cycloolefin polymer).

The transmittance adjusters 186 are dots of various sizes each having a given transmittance and have various shapes such as a rectangle, a circle, and a hexagon; the transmittance adjusters 186 are formed, by printing for example, on the whole surface of the transparent film 184 facing the light guide plate 18 in a given pattern, or in such a pattern, for example, that the sizes of dots or the number of dots vary according to the location (halftone dot pattern).

The transmittance adjusters 186 need only be diffusion reflectors and may, for example, be formed by applying a material that diffuses light as exemplified by silica; pigments such as titanium oxide and zinc oxide; a resin; and beads of glass, zirconia, etc., together with a binder, or may be a pattern created by machining a surface to form an asperity thereon or by grinding a surface to roughen the surface. Otherwise, one may use a material having a high reflectance and a low light-absorbing property such as metals as exemplified by Ag and Al.

One may also use ordinary white ink as used in screen printing, offset printing, etc. One may use, for example, ink obtained by dispersing titanium oxide, zinc oxide, zinc sulfate, barium sulfate, etc. into acrylic binder, polyester binder, vinyl chloride binder, etc.; or ink given a diffusing property by mixing titanium oxide with silica.

Numerous transmittance adjusters 186 are distributed on the surface of the transparent film 184 facing the light guide plate unit 18 in a given pattern such that the pattern density of the transmittance adjusters 186 varies according to the location on the surface.

Now, let $\rho(x, y)$ be the pattern density of the transmittance adjusting member 182 at a given position $(x, y)$ and $F(x, y)$ be the relative brightness of light emitted at a given position $(x, y)$ on the light exit plane of the backlight unit 180 (plane facing the liquid crystal display panel 4) having no transmittance adjusting member 182. Then the relationship between the pattern density $\rho(x, y)$ of the transmittance adjusting member 182 and the relative brightness $F(x, y)$ preferably satisfies the following expression (5).

$$\rho(x,y) = c\{F(x,y) - F_{min}\}/(F_{max} - F_{min}) \quad (5)$$

In the expression (5), $F_{max}$ denotes a maximum brightness, and $F_{min}$ denotes a minimum brightness, of light emitted through the light exit plane of the diffusion film 14 of the backlight unit 180 without the transmittance adjusting member 182. Note that the relative brightness $F(x, y)$ is determined with reference to the maximum brightness $F_{max}$ ($F_{max}=1$).

The value of "c," a maximum density, preferably satisfies $0.5 \leq c \leq 1$.

Where the density of the distribution of the transmittance adjusters is designed according to the above expression, there may be cases where brightness unevenness is observed depending on the angle of observation when the observation is made at an angle other than from the front. To remedy that, the calculated density distribution is complemented by a "uniform pattern distribution (bias density $\rho b$)." This reduces brightness unevenness and eliminates or reduces angular dependence of brightness unevenness.

The bias density $\rho b$ is preferably 0.01 to 1.50 (1 to 150%). When the distribution density is greater than 1 (100%), the transmittance adjusters are provided in two layers. Specifically, transmittance adjusters having a distribution density of ($\rho b - 1$) are further disposed on the transmittance adjusters laid on the entire surface.

The pattern density $\rho(x, y)$ denotes occupancy per unit area (1 mm$^2$) of the transmittance adjusters 186 at a given position $(x, y)$. When $\rho(x, y)=1$, the transmittance adjusters 186 are provided on the whole surface within the unit area; when $\rho(x, y)=0$, no transmittance adjuster 186 is provided within the unit area.

The transmittance adjusters 186 of the transmittance adjusting member 182 so arranged as to satisfy the pattern density $\rho(x, y)$ defined by the above expression (5) limit the lowering of the average brightness of light emitted through the light exit plane of the backlight unit 180 and reduces the brightness unevenness. Where brightness unevenness is thus reduced using the transmittance adjusting member 182, the diffusion sheet 14 need not achieve thorough diffusion of light. As a result, the diffusion sheet 14 may be made thinner, and the prism sheet need no longer be used, or the number of prism sheets used may be reduced, thus providing a lightweight, low-cost backlight unit.

Now, the planar lighting device having the transmittance adjusting member will be described in greater detail referring to specific examples.

In the example now to be described, a backlight unit having a similar configuration to that illustrated in FIG. 15 was constructed. Specifically, the backlight unit 180 according to the example under discussion comprises light sources 190, the diffusion film 14, the light guide plate 18, the reflection film 22, the transmittance adjusting member 182, and the prism sheet 188.

In the example under discussion, the light guide plate 18 was configured such that the first light entrance plane 18d and the second light entrance plane 18e had a thickness of 2 mm; the light guide plate 18 had a thickness at the center thereof, i.e., a maximum thickness, of 4 mm; the distance from the first light entrance plane 18d to the second light entrance plane 18e was 300 mm; the distance of the light guide plate 18 in the direction of depth, i.e., the distance of the light guide plate 18 in the direction parallel to the first light entrance plane 18d and parallel to the light exit plane 18a was 500 mm.

The light guide plate 18 was formed using an acrylic resin having a refractive index of 1.495 as the transparent resin and silicone particles having a refractive index of 1.44 as the scattering particles. The scattering particles have a particle diameter of 2000 nm. The scattering particles were kneaded and dispersed into the transparent resin in such a manner as to provide a scattering cross section $\Phi$ of $2.06 \times 10^{-12}$ m$^2$ and a particle density of 220000 pieces/mm$^3$.

The space between the light sources 190 (LED arrays 124) and the light guide plate 18 measured 0.1 mm.

To calculate the pattern density $\rho(x, y)$ of the transmittance adjusters 186 satisfying the above expression (5) in the backlight unit 180 of FIG. 15, the relative brightness $F(x, y)$ of light emitted through the light exit plane of a backlight unit having no transmittance adjusting member was measured using a backlight unit having the same configuration and shape except that no transmittance adjusting member 182 was provided.

The relative brightness $F(x, y)$ was measured as follows.

First, the above backlight unit 180 was secured to an XY stage and a brightness meter was secured vertically to the light exit plane of the backlight unit 180. Brightness at locations on the light exit plane of the backlight unit 180 was measured with the brightness meter to obtain information on brightness at particular locations on the light exit plane of the light guide plate 18.

Figure 16:
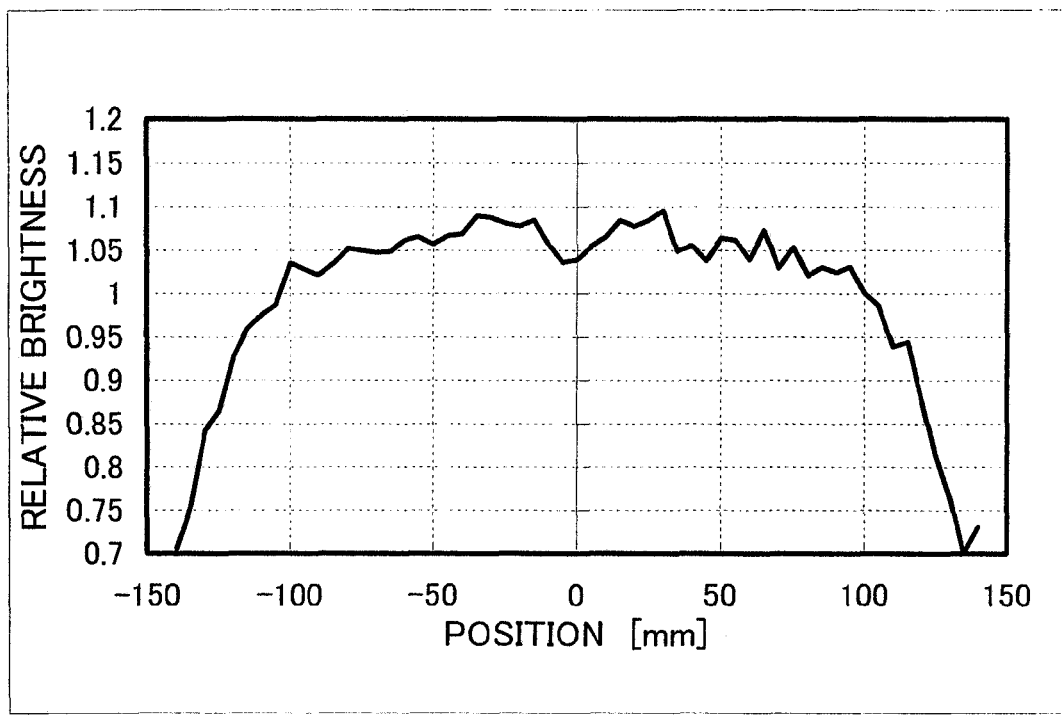
FIG. 16 is a graph of a relative brightness of light emitted through the light exit plane of a backlight unit having no transmittance adjusting member.

Then, the XY stage is moved to obtain the relationship between location on the light exit plane of the backlight unit 180 and brightness. The maximum brightness of the calculated brightness is denoted by $F_{max}$ and the minimum brightness by $F_{min}$. With reference to a maximum brightness of 1, the ratios of brightness at individual locations to the maximum brightness $F_{max}$ were expressed by relative brightness $F(x, y)$ for the respective locations. FIG. 16 illustrates measurements obtained. FIG. 16 indicates relative brightness on the vertical axis plotted against the distance from the central part of the light guide plate on the horizontal axis.

Next, the pattern density $\rho(x, y)$ for the relative brightness $F(x, y)$ is calculated from the measured maximum brightness $F_{max}$ and minimum brightness $F_{min}$ using the above expression 1. In the example under discussion, the relationship between the relative brightness $F(x, y)$ and the pattern density $\rho(x, y)$ was calculated when the maximum density c=0.75. The relationship between the relative brightness $F(x, y)$ and the pattern density $\rho(x, y)$ is proportional such that when the relative brightness $F(x, y)$ is the minimum brightness $F_{min}$, the pattern density $\rho(x, y)$ is 0 whereas when the relative brightness $F(x, y)$ is the maximum brightness $F_{max}$, the pattern density $\rho(x, y)$ is the maximum density, thus c=0.75.

Figure 17:
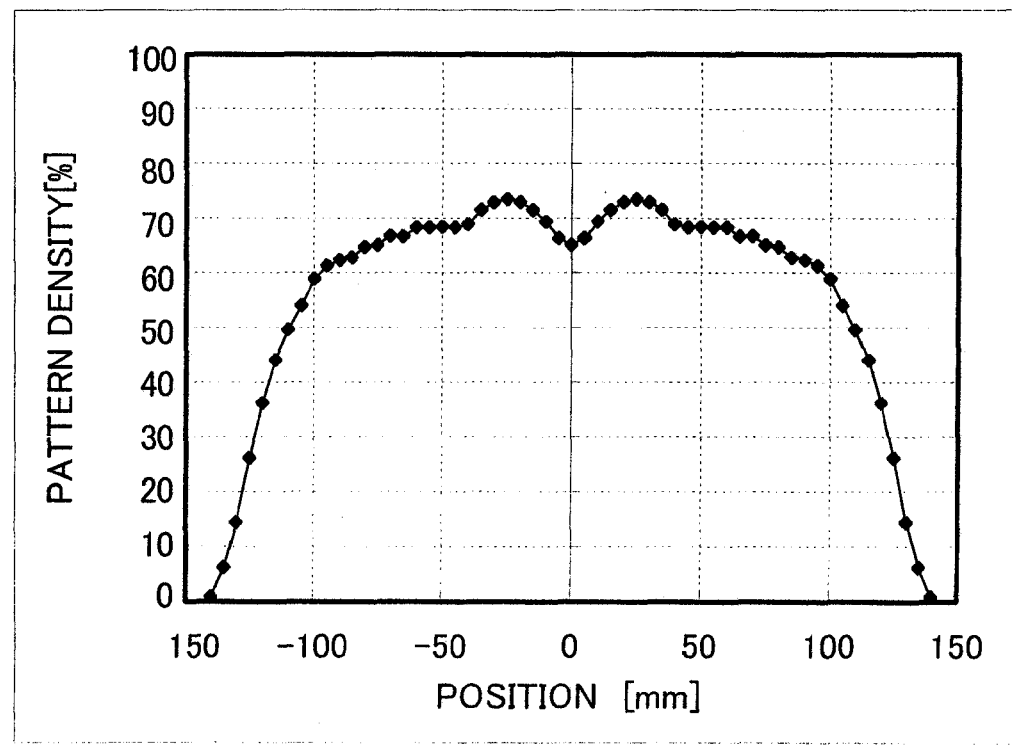
FIG. 17 is a graph illustrating a calculation result obtained by calculating a pattern density distribution of a transmittance adjusting member satisfying the requirements of the present invention when a maximum density "c" is 0.75 based on the relative brightness calculated in FIG. 16.

Next, the distribution of the pattern density $\rho(x, y)$ for the relative brightness $F(x, y)$ of the backlight unit according to the embodiment under discussion illustrated in FIG. 15 will be calculated based on the relationship between the relative brightness $F(x, y)$ and the pattern density $\rho(x, y)$. FIG. 17 illustrates a distribution of the pattern density $\rho(x, y)$ where the maximum density c=0.75. FIG. 17 indicates the pattern density $\rho(x, y)$ on the vertical axis plotted against the distance from the center (central part) of the light guide plate on the horizontal axis.

Next, the transmittance adjusting member 182 provided with the transmittance adjusters 186 was constructed based on a distribution of the pattern density $\rho(x, y)$ satisfying the expression (5) when the calculated maximum density c=0.75.

In the embodiment under discussion, the distribution of the pattern density $\rho(x, y)$ was calculated for locations at 5 mm intervals in the widthwise direction; according to the calculated pattern density $\rho(x, y)$, transmittance adjusters 186 each measuring 0 to 1 mm in the widthwise direction were arranged as appropriate to construct the transmittance adjusting member 182.

In the embodiment under discussion, the transmittance adjusters 182 arranged were formed of white ink having a transmittance of 33% for a wavelength of 550 nm when the transmittance adjusters are provided on the whole surface or, expressed otherwise, when the pattern density $\rho(x, y)$ is 1.

Figure 18:
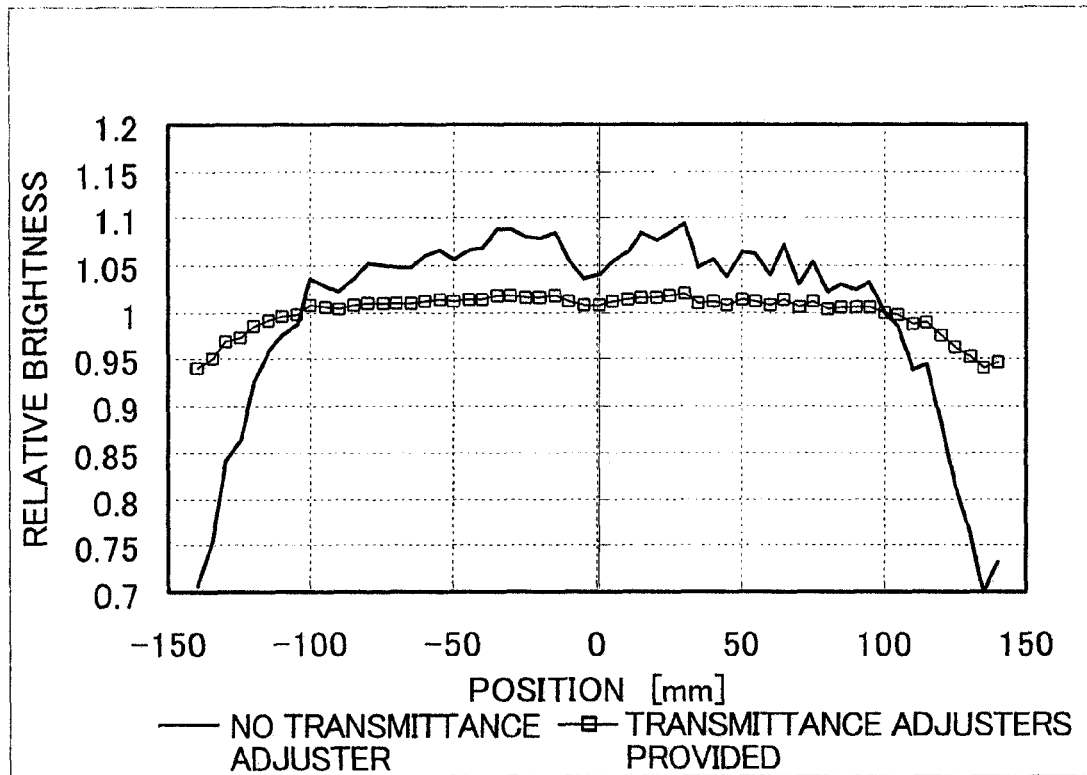
FIG. 18 is a graph illustrating relative brightness of light emitted through the light exit plane of the planar lighting device having a transmittance adjusting member, where the maximum density found in FIG. 17 is 0.75.

Now, the relative brightness of light emitted through the light exit plane of the backlight unit 180 was measured with the thus formed transmittance adjusting member 182 provided in the backlight unit 180. The relative brightness was measured by the same method whereby said relative brightness $F(x, y)$ was measured. FIG. 18 illustrates the measurements obtained. FIG. 18 indicates the relative brightness on the vertical axis plotted against the distance from the center (central part) of the light guide unit on the horizontal axis. Also shown for comparison is vertical brightness of light emitted through the light exit plane of a backlight unit having the same configuration except that it is not provided with the transmittance adjusting member 182.

FIG. 18 shows that the transmittance adjusting member 182 provided reduces brightness unevenness when compared with a case where the transmittance adjusting member 182 is not provided.

As described earlier, the maximum density c is preferably in the range of $0.5 \leq c \leq 1$. The maximum density c not smaller than 0.5 curbs the decrease of the average brightness and enables emission of light with enhanced brightness and uniformity.

The transmittance adjusters 186 preferably have a transmittance of 10% inclusive to 50% inclusive and, more preferably, 20% inclusive to 40%, when the pattern density $\rho(x, y)=1$ or, expressed otherwise, when the transmittance adjusters 186 are provided on the whole surface.

Where the transmittance is not smaller than 10%, brightness unevenness can be reduced in a suitable manner and where the transmittance is not greater than 50%, brightness unevenness can be reduced without lowering the average brightness.

Further, a transmittance of 20% inclusive to 40% allows the above effects to be achieved in a more suitable manner.

The transmittance adjusters may each have any shape including a rectangle, a triangle, a hexagon, a circle, and an ellipse.

Where the backlight unit uses linear light sources and a light guide plate shaped by uniaxial drawing as in the example under discussion, the transmittance adjusters may each be shaped into an elongate strip parallel to the axes of the linear light sources.

While the above embodiment uses a transparent film as an optical member on which the transmittance adjusters are provided, the present invention is not limited thereto; the transmittance adjusters may be provided on a diffusion film or a prism sheet. For example, the transmittance adjusters may be formed on the diffusion film 14 or the prism sheet 188 illustrated in FIG. 15 instead of the transparent film. This enables reduction of the number of components required and, hence, reduction of manufacturing costs.

The pattern density distribution of the transmittance adjusters 186 of the transmittance adjusting member 182 are adjusted according to the incident light on the transmittance adjusting member 182. The pattern density distribution of the transmittance adjusters 186 may be adjusted by varying the size of the transmittance adjusters 186 or by varying the intervals at which the transmittance adjusters 186, each having a given shape, are arranged.

The transmittance adjusters 186 may be arranged according to the pattern density by any of various methods including the FM screening method and the AM core method; among these methods, the FM screening method is preferably used. By the FM screening method, the transmittance adjusters 186 can be arranged dispersedly and densely as fine, even-sized dots, making it difficult to visually recognize the arrangement pattern of the transmittance adjusters 186 through the light exit plane of the backlight unit. Specifically, the FM screening method prevents projection of the arrangement pattern of the transmittance adjusters 186 through the light exit plane of the backlight unit and emission of uneven light, thus enabling emission of light with increased uniformity. That method also prevents the dot size from being reduced to such a degree that formation of the transmittance adjusters 186 becomes difficult.

Preferably, the transmittance adjusters 186 each have a maximum size of 500 μm or less, for example, a side of 500 μm or less when they are rectangular; a major axis of 500 μm or less when they are elliptical, and more preferably, 200 μm or less. The transmittance adjusters 186 each measuring 500 μm or less make visual recognition of the shapes of the transmittance adjusters 186 difficult; the transmittance adjusters 186 each measuring 200 μm or less make visual recognition of the shapes of the transmittance adjusters 186 no longer possible with the result that the shapes of the transmittance adjusters 186, when actually used for a liquid crystal display device, are not projected through the light exit plane of the backlight unit to exhibit brightness unevenness. Thus, brightness unevenness can be efficiently reduced.

Still more preferably, the transmittance adjusters 186 each measure 100 μm at maximum. A maximum size of 100 μm reduces the visibility of the size to under a level recognizable by the naked eye with an increased certainty with the result that the shapes of the transmittance adjusters 186, when actually used for a liquid crystal display device, are not projected through the light exit plane of the backlight unit to exhibit brightness unevenness, thus reducing brightness unevenness with an increased certainty and efficiently.

The transmittance adjusters may be printed on the transparent film by any of various methods including screen printing, offset printing, gravure printing, and ink jet printing. Offset printing has an advantage of excellent productivity; screen printing has an advantage that ink thickness can be increased and, hence, a transmittance of the patterned area can be reduced without having to increase the ink concentration. Ink jet printing permits printing on a three-dimensional object and, hence, is best suited to form the transmittance adjusters on the surface of the light guide plate.

When printing the transmittance adjusters on the surface of the transparent film, alignment marks may be printed on the transparent film outside the area in which the half dot pattern is arranged. The alignment marks formed on the transparent film facilitates alignment of the light guide plate with the transmittance adjusting member at the time of manufacture.

While the transmittance adjusting member is provided between the light guide plate and the diffusion film in the embodiment under discussion, the location is not limited thereto; they may be provided between the diffusion film and the prism sheet.

Further, the transmittance adjusting member is provided such that the transmittance adjusters are arranged on the transparent film, the present invention is not limited thereto; the transmittance adjusters may be arranged on the surface of the diffusion film, the prism sheet, or the light guide plate to provide the transmittance adjusting member. Specifically, the transmittance adjusters may be provided on at least one of the surface of the diffusion film closer to the light guide plate (plane through which light is admitted) and the surface of the diffusion film opposite from the light guide plate (plane through which light is emitted). The transmittance adjusters may alternatively be provided on at least one of the surface of the prism sheet closer to the light guide plate (plane through which light is admitted) and the surface of the prism sheet opposite from the light guide plate (plane through which light is emitted). Alternatively, the transmittance adjusters may be provided immediately on the light exit plane of the light guide plate.

Thus, the transmittance adjusting member can be formed by providing the transmittance adjusters on the surface of the diffusion film, the prism sheet, or the light guide plate without using the transparent film such that the layer configuration can be further simplified.

In addition to the above advantageous effects, where the transmittance adjusters are provided immediately on the light exit plane of the light guide plate, the transmittance adjusters can be placed in an accurate position with respect to the brightness unevenness of light emitted from the light guide plate without having to establish an alignment when assembling the planar lighting device.

The transmittance adjusters are preferably provided in a plurality of locations, i.e., on a plurality of optical members such as, for example, on the surface of the light guide plate and the rear side of the diffusion film, thereby to form a plurality of transmittance adjusting members. Where the transmittance adjusters are thus provided on a plurality of optical members, the tolerance to misalignment between the arrangement pattern of the transmittance adjusters and the incident light at the individual locations where the transmittance adjusters are provided can be increased, thereby enabling emission of uniform light free from brightness unevenness and uneven coloration. Where the transmittance adjusters are provided in a plurality of locations, the transmittance adjusters may be arranged in the same arrangement pattern or in different arrangement patterns between the locations where they are provided.

While, in the above embodiment, the transmittance adjusters of the transmittance adjusting member are arranged with a pattern density ρ(x, y) satisfying the above expression (5) as a preferred embodiment, the present invention is not limited thereto; the transmittance adjusters may be arranged with various pattern densities for curbing the generation of brightness unevenness. For example, the transmittance adjusting member may be a known transmittance adjusting member, wherein the transmittance adjusters are arranged in such a manner as to have a density distribution in a direction perpendicular to the axis of the linear light sources.

Preferably, a chromaticity adjusting film formed of a transparent film having on its surface white ink mixed with and dispersed into ink of any color (other than white ink) is provided on the light exit plane of the light guide plate. The mixing ratio of ink of any color to white ink is less than 1 of ink of any color to 100 of white ink.

The chromaticity adjusting film provided enables the color of emitted light to be adjusted and color rendition and color reproduction to be improved. Thus, color rendition can also be improved where the light source used can only offer poor color rendition. Further, the color of emitted light can be fine-tuned.

Now, description will be made in more detail referring to specific examples.

In the examples now to be described, three light sources were used: cold cathode tubes (CCFL) having a color temperature of 3500 K, LED elements having a color temperature of 9150 K, and LED elements having a color temperature of 8500 K. Measured was the chromaticity of light emitted without using the chromaticity adjusting film and the chromaticity of light emitted using chromaticity adjusting films with different ink mixing ratios given in Tables 2 and 3 below.

TABLE 2

| No. | white ink | violet | trichromatic magenta | magenta | trichromatic cyan |
|---|---|---|---|---|---|
| S0  | 500  | 0.0 | 0.0 | 0.0 | 0.0 |
| S1  | 500  | 1.5 | 0.0 | 0.0 | 0.0 |
| S2  | 500  | 3.0 | 0.0 | 0.0 | 0.0 |
| S3  | 500  | 0.0 | 1.5 | 0.0 | 0.0 |
| S4  | 500  | 0.0 | 3.0 | 0.0 | 0.0 |
| S5  | 500  | 0.0 | 0.0 | 1.5 | 0.0 |
| S6  | 500  | 0.0 | 0.0 | 3.0 | 0.0 |
| S7  | 500  | 0.0 | 0.0 | 0.0 | 1.5 |
| S8  | 500  | 0.0 | 0.0 | 0.0 | 3.0 |
| S9  | 260  | 1.5 | 0.0 | 0.0 | 1.0 |
| S10 | 520  | 1.5 | 0.0 | 0.0 | 1.0 |
| S11 | 1040 | 1.5 | 0.0 | 0.0 | 1.0 |
| S12 | 1166 | 1.0 | 0.0 | 0.0 | 2.4 |
| S13 | 875  | 1.0 | 0.0 | 0.0 | 2.3 |
| S14 | 438  | 1.0 | 0.0 | 0.0 | 2.3 |
| S15 | 1750 | 1.0 | 0.0 | 0.0 | 2.3 |

TABLE 3

| No. | white, highly concentrated 4707M | indigo 4746M | magenta FIL135TC |
|---|---|---|---|
| A0  | 500 | 0.0 | 0.0 |
| A14 | 900 | 1.5 | 1.5 |

Figure 19:
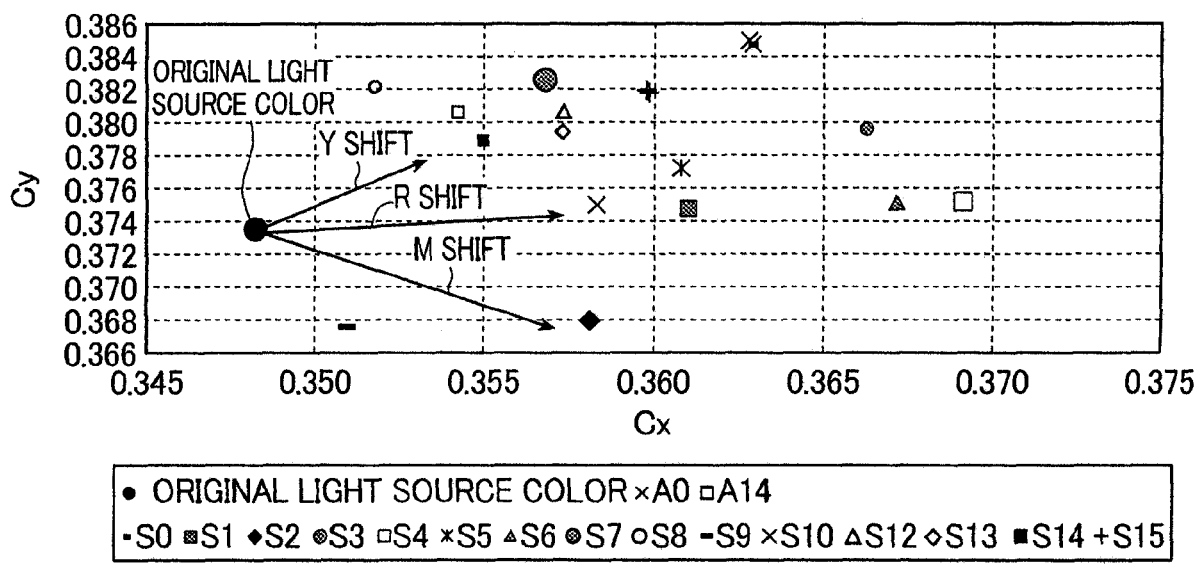
FIG. 19 is a graph illustrating the measurements of light emitted by a light source and transmitted through a chromaticity adjusting film.
Figure 20:
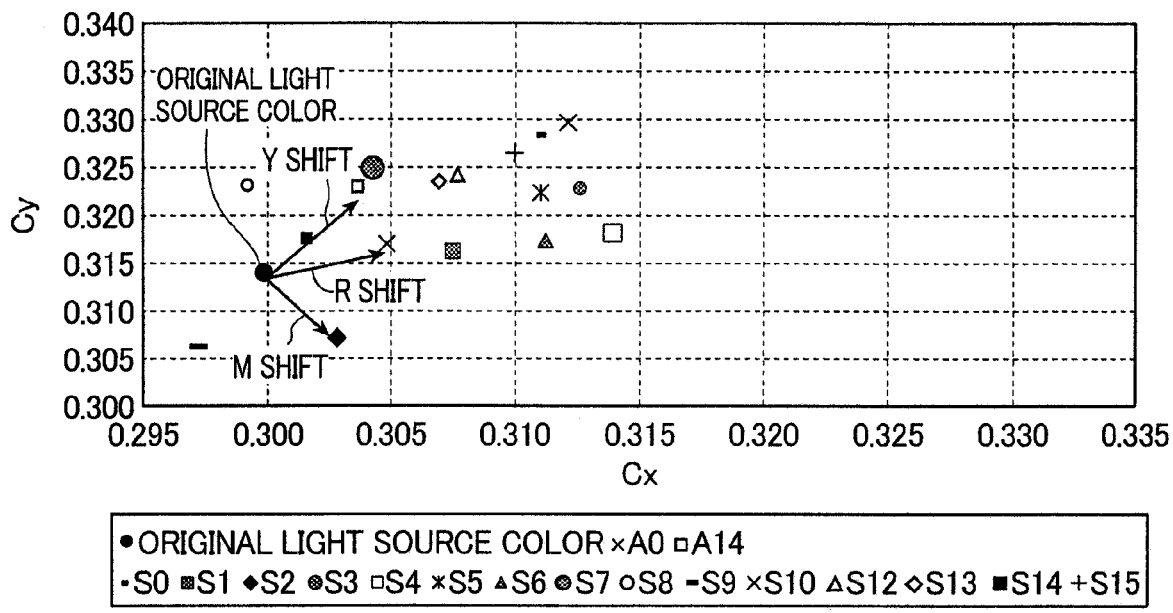
FIG. 20 is a graph illustrating the measurements of light emitted by another light source and transmitted through the chromaticity adjusting film.
Figure 21:
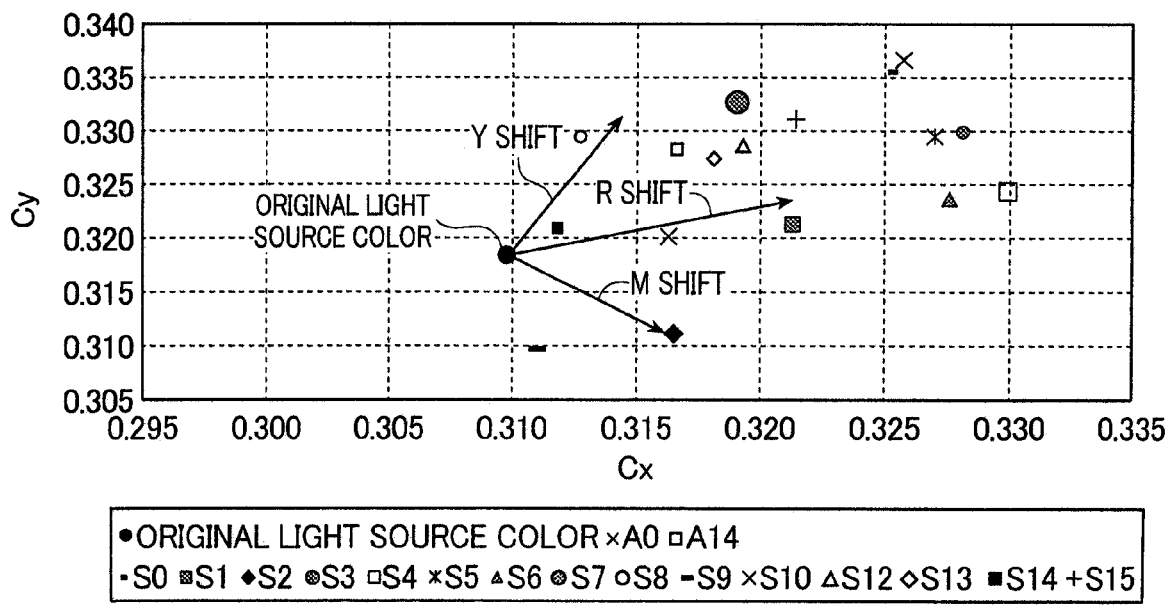
FIG. 21 is a graph illustrating the measurements of light emitted by another light source and transmitted through the chromaticity adjusting film.

FIGS. 19 to 21 illustrate the measurements obtained.

FIG. 19 is a graph illustrating the measurements of light emitted by cold cathode tubes (CCFL) having a color temperature of 3500 K and transmitted through the chromaticity adjusting films given in Tables 2 and 3; FIG. 20 is a graph illustrating the measurements of light emitted by LED elements having a color temperature of 9150 K and transmitted through the chromaticity adjusting films given in Tables 2 and 3; and FIG. 21 is a graph illustrating the measurements of light emitted by LED elements having a color temperature of 8500 K and transmitted through the chromaticity adjusting films given in Tables 2 and 3.

As illustrated in FIGS. 19 to 21, various chromaticity adjusting films provided permit adjustment of the color temperatures of emitted light. Specifically, the color of emitted light can be shifted from the original light source color in various color directions such as R (red) direction, Y (yellow) direction, and M (magenta) direction.

Thus, color rendition and color temperature reproduction range can be improved. Where blue LEDs are used together with fluorescent substance to emit white light, color reproduction of red can be improved by providing chromaticity adjusting films.

The locations of the chromaticity adjusting films are not limited specifically; the chromaticity adjusting films may be located between the light exit plane of the light guide plate and the optical members, between optical members, or between the light sources and the light guide plate.

In addition to providing the chromaticity adjusting films, one may apply ink containing white ink mixed with various inks each in given amounts as described earlier to the surface of, for example, the diffusion film, the prism sheet and the light guide plate.

While the light guide plate used in the above embodiment has a flat surface 18a on the light emitting side and inclined planes on the opposite side thereof as illustrated in FIG. 1, the light guide plate used in the inventive backlight unit is not limited to such a shape.

Now, other examples of configurations of the light guide plate that may be used in the inventive backlight unit will be described below.

Figure 22A:
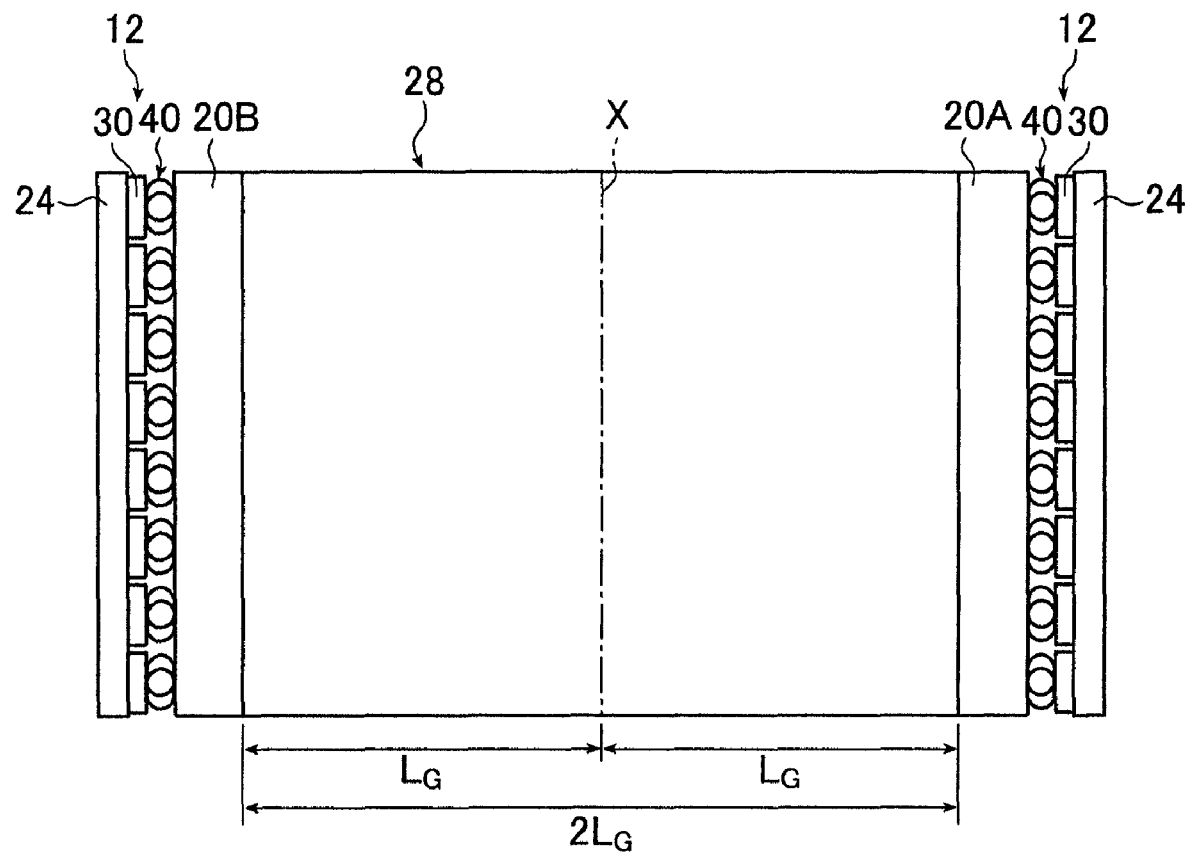
FIG. 22A is a schematic plan view of an example of another configuration of the light guide plate that may be used in the backlight unit of the invention.
Figure 22B:
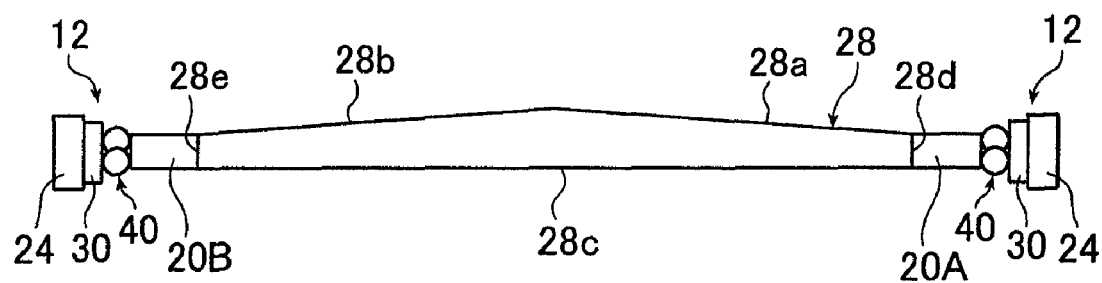
FIG. 22B is a schematic sectional view thereof.

FIGS. 22A and 22B illustrate another example of configuration that may be used in the inventive backlight unit. FIG. 22A is a schematic plan view illustrating a light guide plate 28, the light mixers 20, and the light sources 12; FIG. 22B is a schematic sectional view illustrating the light guide plate 28. In FIGS. 22A and 22B, the light sources 12 and the light mixer 20 (20A and 20B) have the same functions as the light sources and the light mixers of FIG. 1. Therefore, detailed description thereof will not be given here.

The light guide plate 28 has a structure comparable to the light guide plate 18 of FIG. 1 as overturned and has a light exit plane formed by a pair of a first inclined plane 28a and a second inclined plane 28b, both flat, the opposite side therefrom being formed by a flat plane 28c. The first inclined plane 28a and the second inclined plane 28b of the light guide plate 28 are inclined with respect to the flat plane 28c such that the light guide plate grows thinner from the central part thereof toward the end portions. In the light guide plate 28 having such structure, light admitted through the first light entrance plane 28d and the second light entrance plane 28e exits through the first inclined plane 28a and the second inclined plane 28b.

The light guide plate 28 thus shaped is also formed of a transparent resin containing scatterers as is the light guide plate 18 described earlier. Now, let Φ be the scattering cross section of scattering particles contained in the light guide plate, $L_G$ a half of the length of the light guide plate in the direction in which light is admitted, $N_p$ the density of the scattering particles contained in the light guide plate (number of particles in unit volume), and $K_C$ a compensation coefficient. Then a relationship holds that the value $\Phi \cdot N_p \cdot L_G \cdot K_C$ is not less than 1.1 and not greater than 8.2, and the compensation coefficient $K_C$ is not less than 0.005 and not greater than 0.1. Thus, uniform illumination light with a reduced level of brightness unevenness can be emitted through the first inclined plane 28a and the second inclined plane 28b.

In the backlight unit 2 using the light guide plate 18 having a shape illustrated in FIG. 1, the reflection sheet 22 has a shape such that the reflection sheet 22 inclines from the central part toward both end faces (the first light entrance plane 18d and the second light entrance plane 18e) of the light guide plate 18 according to the first inclined plane 18b and the second inclined plane 18c located on the opposite side of the light guide plate 18 from the light exit plane. Where the light guide plate 28 having a shape as illustrated in FIGS. 22A and 20B is used in the backlight unit, however, the reflection sheet 22 is given a flat shape to cover the flat plane 28c of the light guide plate 28.

While the light guide plate 28 of FIGS. 22A and 22B does not have prism arrays on the first inclined plane 28a and the second inclined plane 28b, prism arrays may be formed on the first inclined plane 28a and the second inclined plane 28b. Alternatively, the prism arrays may be formed on the flat plane 28c located on the opposite side of the light guide plate 28 from the light exit plane.

Where the light guide plate 28 having the shape illustrated in FIGS. 22A and 22B is used in the backlight unit, the polarization separator film is provided on the light emitting side of the light guide plate, i.e., on the first inclined plane 28b and the second inclined plane 28c. The polarization separator film may be formed on and in close contact with the first inclined plane 28b and the second inclined plane 28c or may alternatively be glued to a flat plate made of a transparent resin to make a polarization separator plate, which is then placed a given distance away from the first inclined plane 28b and the second inclined plane 28c.

Figure 23A:
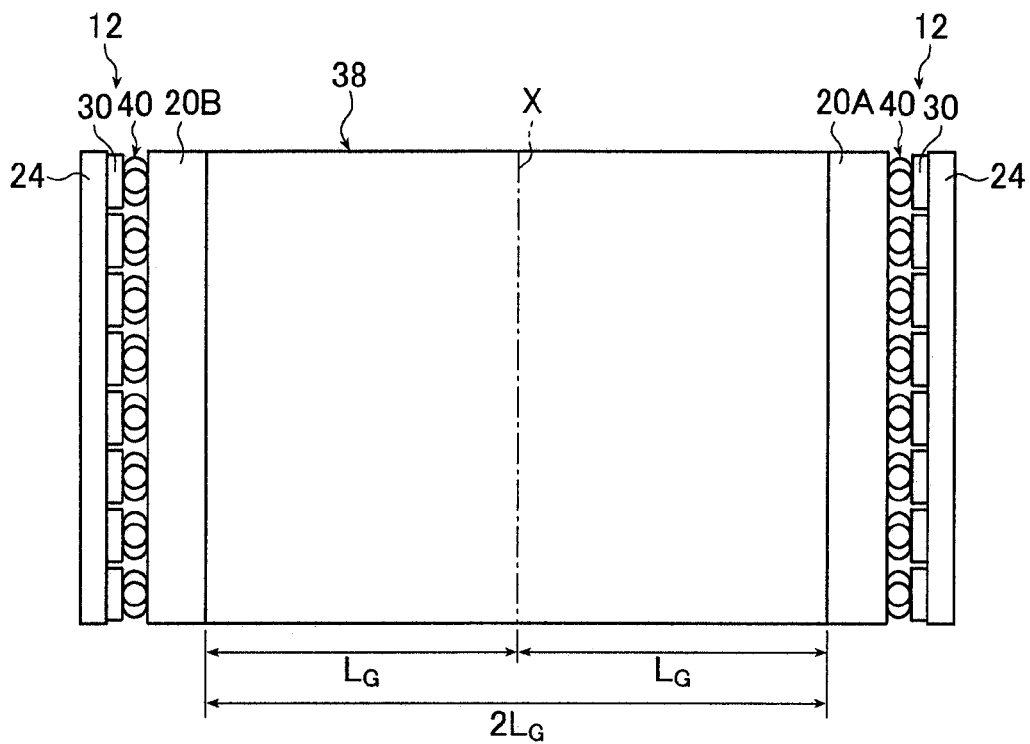
FIG. 23A is a schematic plan view of an example of yet another configuration of the light guide plate that may be used in the backlight unit of the invention.
Figure 23B:
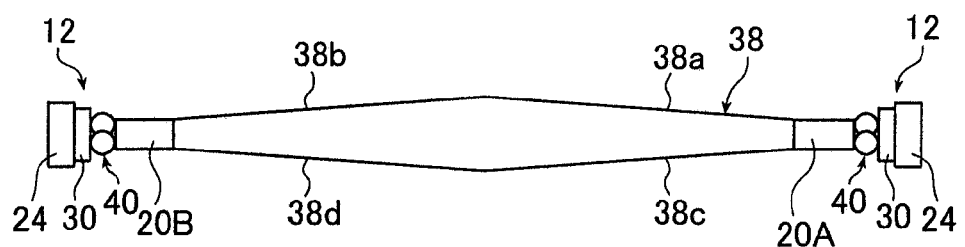

FIGS. 23A and 23B illustrate another example of configuration of the light guide plate that may be used in the inventive backlight unit. FIG. 23A is a schematic plan view illustrating a light guide plate 38, the light mixer 20, and the light sources 12; FIG. 23B is a schematic sectional view illustrating the light guide plate 38. In FIGS. 23A and 23B, the light sources 12 and the light mixer 20 (20A and 20B) have the same functions as the light sources and the light mixers of FIG. 1. Detailed description thereof will therefore not be given here.

In the light guide plate 38 of FIGS. 23A and 23B, the light exit plane located on the light emitting side is formed to have the same shape as the plane on the opposite side. The light exit plane of the light guide plate 38 has a rectangular contour formed with a pair of a first inclined plane 38a and a second inclined plane 38b, both flat; the opposite side is likewise formed with a pair of a third inclined plane 38c and a fourth inclined plane 38d, both flat. Expressed otherwise, the light guide plate 38 has the light emitting side and the opposite side both formed with a pair of inclined planes gently inclined from the central part toward both end portions thereof. The first inclined plane 38a and the second inclined plane 38b are inclined a given angle with respect to each other and, likewise, the third inclined plane 38c and the fourth inclined plane 38d are inclined a given angle with respect to each other. The second inclined plane 38b is inclined with respect to the first inclined plane 38a by a same angle by which the fourth inclined plane 38d is inclined with respect to the third inclined plane 38c. The light guide plate 38 is thinnest at both end portions, growing thicker from both end portions toward the center, where the light guide plate 38 is thickest.

In the light guide plate 38 of FIG. 23, light admitted through the lateral planes passes through the inside of the light guide plate 20 and exits through the first inclined plane 38a and the second inclined plane 38b. Part of light may then leak to the outside through the third inclined plane 38c and the fourth inclined plane 38d but is reflected back into the light guide plate by a reflection sheet (not shown) provided in such a manner as to cover the rear side of the light guide plate 38.

Figure 24:
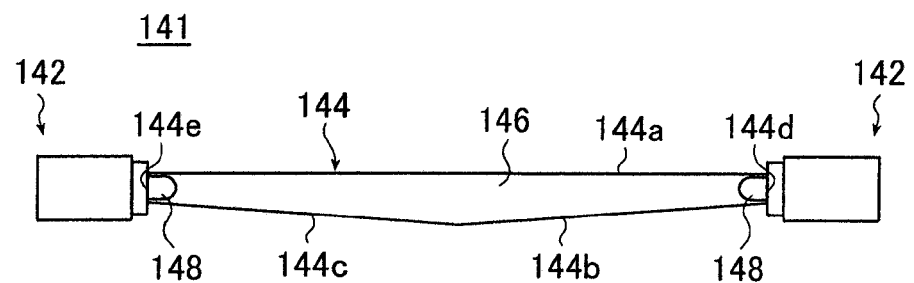
FIG. 24 is a schematic sectional view illustrating another example of the planar lighting device according to the first embodiment of the present invention.

FIG. 24 is a schematic sectional view of another example of a planar lighting device (backlight unit) 141 that may be used in the first embodiment. Note that in this embodiment, components having similar configurations to those in the backlight unit 10 of FIGS. 1 and 2 are given identical reference characters and detailed descriptions thereof will not be given here. Thus, description will be focused on the other, different components.

The backlight unit 141 comprises light sources 142 and a light guide plate 144. As does the backlight unit 10 of FIGS. 1 and 2, the light guide plate 144 of the backlight unit 141 has the diffusion film and the prism sheet, though not shown, provided on the light emitting side and the reflection film 22 provided on the side of the light guide plate 144 closer to the inclined planes (on the opposite side from the light exit plane).

The light sources 142 are substantially the same as the LED arrays 124 of FIGS. 12A and 12B.

The light guide plate 144 comprises a flat, substantially rectangular light exit plane 144a, two inclined planes (a first inclined plane 144b and a second inclined plane 144c) located on the opposite side from the light exit plane 144a and inclined a given angle with respect to the light exit plane 144a in such a manner as to be symmetrical to each other with respect to a bisector X that is parallel to one side of the light exit plane 144a and bisects the light exit plane 144a, and two light entrance planes (a first light entrance plane 144d and a second light entrance plane 1443e) that are located opposite two LED arrays and through which light is admitted. The first inclined plane 144b and the second inclined plane 144c are inclined with respect to the light exit plane 144a on both sides of the bisector X. The light guide plate 144 grows thicker from the first light entrance plane 144d and the second light entrance plane 144e toward the center in such a manner as to be thickest at the central part and thinnest on both end portions. In the light guide plate 144, part of the light guide plate closer to a side thereof on which the first light entrance plane 144d is located and part of the light guide plate closer to a side thereof on which the second light entrance plane 144e is located are formed of a low refractive index member 148, which is different from the material forming the other part of the light guide plate 144 (referred to below as base material 146).

The low refractive index member 148 forms a light entrance plane 144c together with the base material 146 and is in contact with the base material 146 except on the side thereof defining the light entrance plane 144c. Specifically, the low refractive index member 148 is covered with the base material 146 on the sides thereof facing the light exit plane 144a, the first inclined plane 144b, the second inclined plane 144c, and the center. The low refractive index member 148 has a shape comparable to a half cylinder curving outward toward the center.

Such light guide plate may also be manufactured using an extrusion molding method or an injection molding method. Alternatively, the base material 146 and the low refractive index member 148 may be manufactured separately, thereon fitting or bonding the low refractive index member 148 to the base material 146.

Now, let Ni be the refractive index of the low refractive index member 148 and Nm the refractive index of the base material 146. Then the base material 146 and the low refractive index member 148 satisfy a relationship Nm>Ni.

Incorporating a low refractive index member having a lower refractive index than the base material in part including the light entrance plane and admitting light emitted by the light source into the low refractive index member enables reduction of Fresnel loss of light emitted by the light source and admitted through the light entrance plane, which increases the light admission efficiency.

Further, the low refractive index member 148 has a function to collimate and mix admitted light, i.e., a function performed by the coupling lens and the mixer. The backlight unit according to the embodiment under discussion, provided with the low refractive index member, allows light emitted by the light source to reach a farther position without the coupling lens and the mixer and is capable of emitting uniform light free from brightness unevenness.

The light exit plane of the light guide plate is preferably formed of a low refractive index member substantially in its entirety. Where substantially the entire surface of the light exit plane of the light guide plate is formed of a low refractive index member, light emitted by the light source and entering the light guide plate can be admitted into the low refractive index member, which further improves the light admission efficiency.

While the low refractive index member 148 has a shape of a half cylinder curving outward toward the center of the light guide plate 144, the present invention is not limited thereto.

Figure 25A:
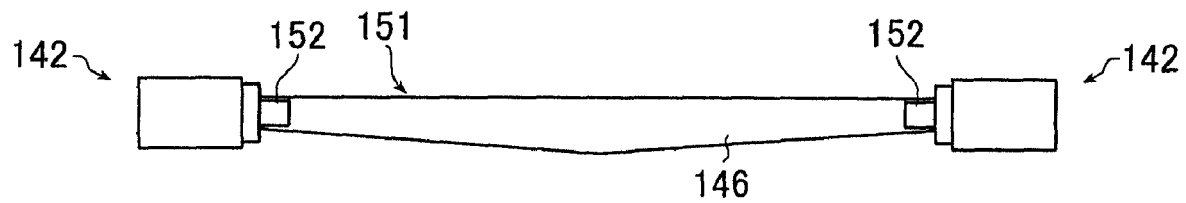
FIGS. 25A to 25C are schematic sectional views respectively illustrating other examples of the light guide plate used in the planar lighting device according to the first embodiment of the present invention.
Figure 25B:
Figure 25C:
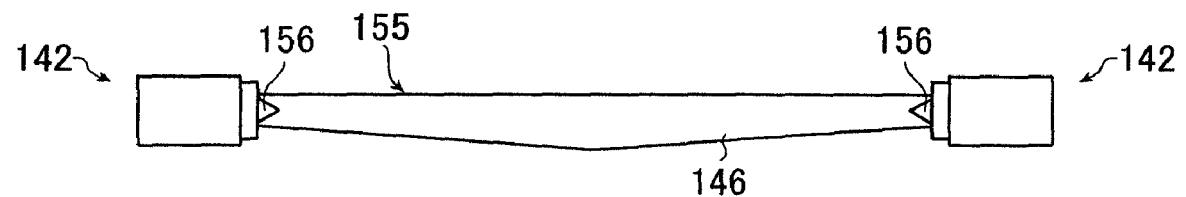

FIGS. 25A to 25C are schematic sectional views illustrating other examples of the light guide plate and the light sources that may be used in the inventive backlight unit. Note that the light guide plates illustrated in FIGS. 25A to 25C have a same shape in any cross section taken at any position.

FIG. 25A illustrates a light guide plate 151 comprising a low refractive index member 152 having a square cross section. FIG. 25B illustrates a light guide plate 153 comprising a low refractive index member 154 having a cross section in the form of a trapezoid or, to be specific, a trapezoid wherein a plane 154a, a light entrance plane, is parallel to a plane 154b located on the opposite side from the light entrance plane, and the side represented by the plane 154b, which is located on the side closer to the center of the light guide plate 153, is shorter than the side represented by the plane 154a, a light entrance plane. FIG. 25C illustrates a light guide plate 155 comprising a low refractive index member 156 having a cross section in the form of a triangle or, to be specific, a triangle wherein the base is the plane acting as the light entrance plane and the vertex is located on the side of the light guide plate 155 closer to the center.

The low refractive index member having a shape as described above can also improve the light admission efficiency.

Further, the shape of the low refractive index member is not limited to the shapes of the above examples; the cross section thereof may have the shape of, for example, a semicircle, a hyperbolic shape, a parabolic shape, or any of various other shapes.

While components of other examples of the backlight unit that may be used in the first embodiment of the present invention have been described in detail above, the present invention is not limited thereto.

Figure 26:
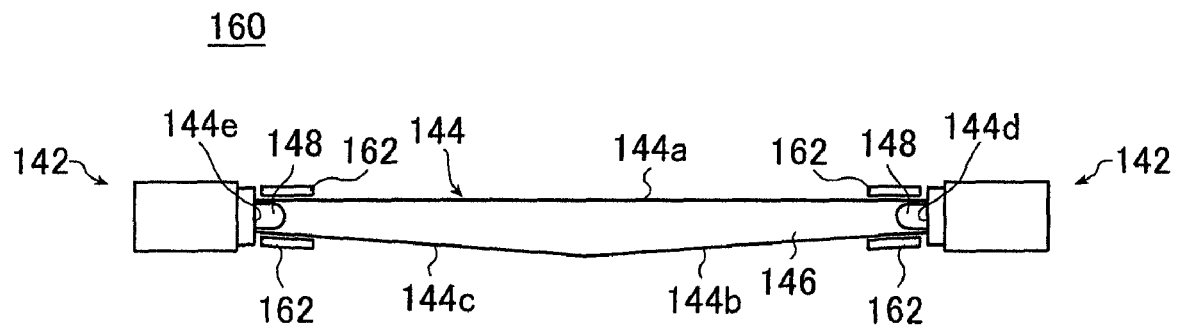
FIG. 26 is a schematic sectional view illustrating a configuration of another example of the planar lighting device according to the first embodiment of the present invention.

FIG. 26 is a schematic sectional view illustrating still another example of the backlight unit that may be used in the first embodiment of the present invention. The components of a backlight unit 160 are the same as those of the backlight unit 141 of FIG. 24 except that the backlight unit 160 has reflection members 162 close to the light entrance plane 144c of the light guide plate 144. Accordingly, like components share like reference characters between the two, and detailed descriptions thereof will not be given here, focusing instead on features unique to the backlight unit 160 below.

The reflection members 162 are provided to reflect light leaking through the light entrance plane 144a, the first inclined plane 144b and the second inclined plane 144c close to the light entrance planes of the light guide plate 144 back into the light guide plate. The reflection members 162 are provided by application, evaporation, or by bonding to four locations of the light guide plate 144: part of the light exit plane 144a of the light guide plate 144 closer to the first light entrance plane 144d, part of the light exit plane 144a closer to the second light entrance plane 144e, part of the first inclined plane 144b closer to the first light entrance plane 144d, and part of the second inclined plane 144c closer to the second light entrance plane 144e.

The reflection members 162 may be formed of any material capable of reflecting light leaking through the light exit plane 144a and the inclined plane 144b of the light guide plate 144 close to the light entrance planes; the reflection members 162 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

The reflection members 162 provided on the light exit plane 144a, the first inclined plane 144b, and the second inclined plane 144c close to the first light entrance plane 144d and the second light entrance plane 144e prevent leakage of light near the light entrance plane 144c where light is liable to exit because of a short distance from each light source 142, and enable light, which conventionally was allowed to exit near the light entrance planes, to reach a farther position. This permits an efficient use of light admitted into the light guide plate.

While the low refractive index members are preferably provided close to the light entrance planes of the light guide plate as in the embodiment under discussion to achieve an increased light admission efficiency, the present invention is not limited thereto; light use efficiency can also be increased by only providing reflection members without providing the low refractive index members.

In the embodiment under discussion, the reflection members are provided on both the light exit plane and the inclined planes. Where the reflection sheet is provided on the inclined planes, however, the reflection sheet serves as reflection member and, hence, the reflection member need only be provided on part of the light exit plane closer to the light entrance plane.

While the first embodiment has been described with reference to only a single light guide plate in every case, the present invention is not limited thereto; a plurality of light guide plates may be used to form one light exit plane.

FIG. 27 illustrates an example of the planar lighting device using a plurality of light guide plates. Note that FIG. 27 only shows light guide plates 18, 18', and 18" and the light sources 12 to clearly illustrate how the light guide plates are arranged.

The plurality of the light guide plates are arranged such that the light exit planes of the individual light guide plates lie in the same plane and that the light entrance planes thereof lie in the same plane. Specifically, the light guide plate 18 and the adjacent light guide plate 18' are so positioned that the light exit plane 18a of the light guide plate 18 and the light exit plane 18a' of the light guide plate 18' lie in the same plane and that the first light entrance plane 18d of the light guide plate 18 and the first light exit plane 18'd of the adjacent light guide plate 18' lie in the same plane. The light guide plate 18 and the adjacent light guide plate 18' are preferably in close contact with each other. Likewise, the light guide plate 18' and the adjacent light guide plate 18" are so positioned that the light exit plane 18'a and the light exit plane 18"a of the respective light guide plates lie in the same plane and that the first light entrance plane 18'd and the first light entrance plane 18'd lie in the same plane. Further, the second light entrance plane, the first inclined plane, and the second inclined plane of one light guide plate are also positioned in such a manner as to form the same plane with their respective counterparts of the other light guide plates.

The light sources 12 are located opposite the first light entrance plane and the second light entrance plane of the light guide plates 18, 18', and 18". Thus, light emitted from the common light sources 12 enters the first light entrance plane and the second light entrance plane of the light guide plates 18, 18', and 18".

The plurality of light guide plates juxtaposed as described above to form one light exit plane provide a planar lighting device having a larger area and hence may be used as a planar lighting device for a larger liquid crystal display device.

The light exit plane formed by the plurality of light guide plates is preferably covered by a single diffusion film and a single prism sheet, though not shown in FIG. 27, as with the light sources.

While all the examples given in the above embodiment have a flat light exit plane, the present invention is not limited thereto.

Figure 28A:
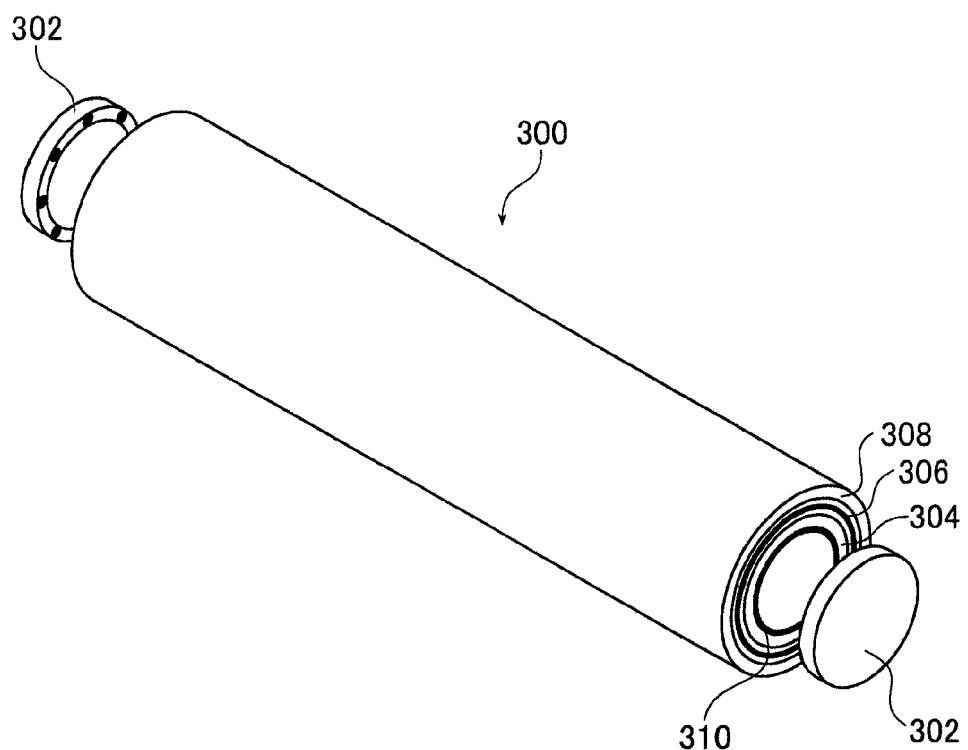
FIG. 28A is a schematic perspective view illustrating another example of the planar lighting device.
Figure 28B:
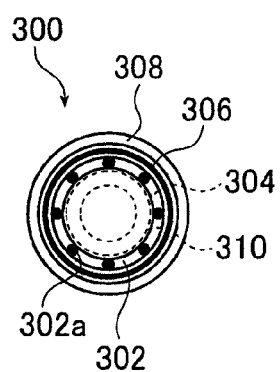
FIG. 28B is a schematic side view of the planar lighting device of FIG. 28A.
Figure 28C:
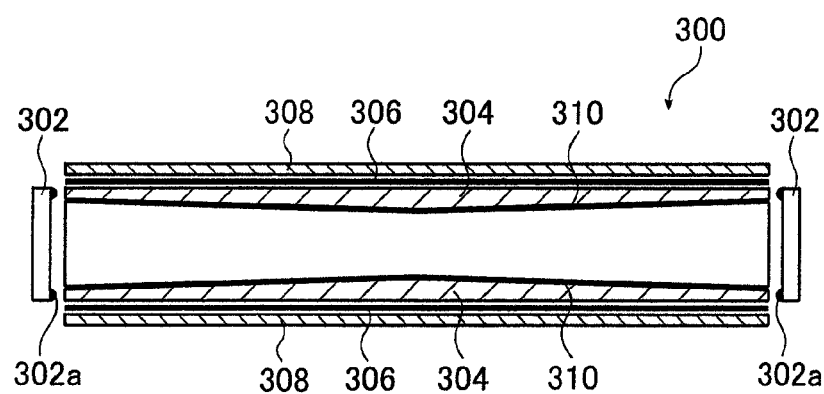
FIG. 28C is a schematic view illustrating a longitudinal cross section of the planar lighting device of FIG. 28A.

FIGS. 28A to 28C illustrate another example of the planar lighting device. FIG. 28A is a schematic perspective view of a planar lighting device 300; FIG. 28B is a side view of the planar lighting device 300; and FIG. 28C is a schematic sectional view illustrating a longitudinal cross section of the planar lighting device 300.

The planar lighting device 300 comprises light sources 302, a light guide plate 304, a diffusion film 306, an acrylic pipe 308, and a reflection film 310.

The two light sources 302 are provided in such a manner as to have the light guide plate 304 between them as illustrated in FIG. 28C. The light sources 302 comprise a plurality of LEDs 302a, which, as illustrated in FIG. 28B, are disposed in the form of a ring contouring the shape of the light entrance plane of the light guide plate 304. The LEDs 302a may be formed with any of the various LEDs described earlier.

As illustrated in FIG. 28B, the light guide plate 304 has the shape of a hollow cylinder where the light exit plane is circular in cross section perpendicular to the direction in which light emitted by the light sources 302 is admitted and the periphery defines the light exit plane. As illustrated in FIG. 28C, the light guide plate 304 increases in thickness from the light entrance planes each defining the upper and lower end faces of the cylinder (end portions of the cylinder in axial direction) toward the center in such a manner as to be thickest at the center and thinnest at both end portions. Thus, the light guide plate 304 has such a shape in cross section parallel to the direction in which light emitted by the light sources 302 is admitted that is similar to the shape of, for example, the light guide plate 18 described above, i.e., a shape growing thicker in the direction in which light is admitted with the increasing distance from either light entrance plane.

The diffusion film 306 is provided on the light exit plane of the light guide plate 304. Specifically, the diffusion film 306 is provided in the form of a cylinder to cover the peripheral surface of the cylindrical light guide plate 304.

The acrylic pipe 308 is given the shape of a hollow cylinder and provided on the periphery of the diffusion film 306. The acrylic pipe 308 is formed of a transparent resin.

The reflection film 310 is provided on the side of the light guide plate 304 closer to the inclined plane, i.e., on the inside of the cylindrical light guide plate 304.

Thus, the planar lighting device 300 has the cylindrical reflection film 310, the light guide plate 304, the diffusion film 306, and the acrylic pipe 308 overlaid on one another in this order from the inside outwardly.

The planar lighting device 300 has similar components to those of the planar lighting devices described earlier except that the it has a cylindrical exterior and hence the shapes, materials, etc, thereof will not be described in detail here.

Also in the planar lighting device 300, light leaving the light sources 302 and entering the light guide plate 304 is diffused by the scattering particles inside, exits through the light exit plane either directly or after being reflected by the reflection film 310, and is transmitted through the diffusion film 306 and the acrylic pipe 308 before emission.

In the planar lighting device 300, the peripheral surface of the cylinder provides the light exit plane; light is emitted through the whole surface of the peripheral surface. Thus, light can be emitted in all the directions covering 360° such that the planar lighting device can be used like a fluorescent lamp.

Thus, the inventive planar lighting device may have the shape of a rod comparable to a rod-type fluorescent lamp that is used as a lighting device and may be used for substantially the same applications as such fluorescent lamp.

While, in the embodiment under discussion, only the diffusion film is provided on the light exit plane of the light guide plate, various optical members may also be provided as in the embodiments of the planar lighting device described earlier to achieve like effects.

The shape of the planar lighting device is not limited to a cylinder.

Figure 29A:
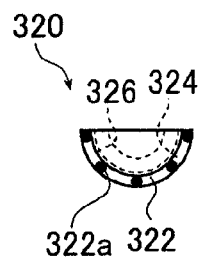
FIG. 29A is a schematic side view of still another example of the planar lighting device.
Figure 29B:
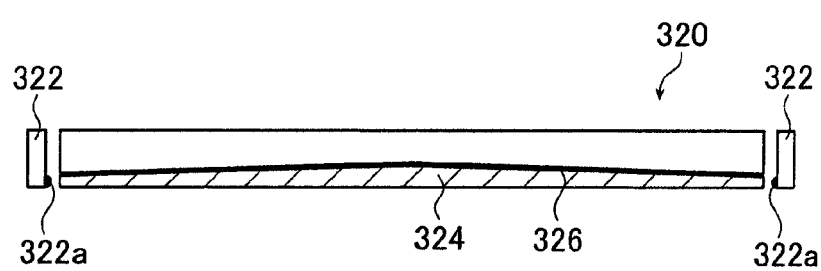
FIG. 29B is a schematic view illustrating a longitudinal cross section of the planar lighting device of FIG. 29A.

FIG. 29 illustrates still another example of the planar lighting device: FIG. 29A is a schematic side view of a planar lighting device 320; FIG. 29B is a schematic sectional view illustrating a longitudinal cross section of the planar lighting device 320.

As illustrated in FIGS. 29A and 29B, the planar lighting device 320 comprises light sources 322, a light guide plate 324, and a reflection film 326. Further, the diffusion film and the acrylic pipe, though not shown, are provided on the peripheral surface of the light guide plate 324, as in the planar lighting device 300.

The planar lighting device 320, as seen in cross section perpendicular to the direction in which light emitted by the light sources 322 is emitted, has the shape of a half cylinder obtained by halving the sectionally circular planar lighting device 300. Specifically, the light sources 322, the light guide plate 324, and the reflection film 326 have the shape of a half cylinder.

Such half-cylindrical planar lighting device may also be used in a suitable manner. In applications where, for example, the planar lighting device is provided on the ceiling for indoor illumination like a fluorescent lamp, the planar lighting device, when given the shape of a half cylinder, is capable of illuminating the inside of a room without radiating light in the direction of the ceiling. This enables efficient indoor illumination.

While the cylindrical light guide plate of the planar lighting device 300 illustrated in FIG. 28 is a straight tubing in the form of a rod, the cylindrical light guide plate may be formed into a bent tubing to provide an annular planar lighting device.

Figure 30:
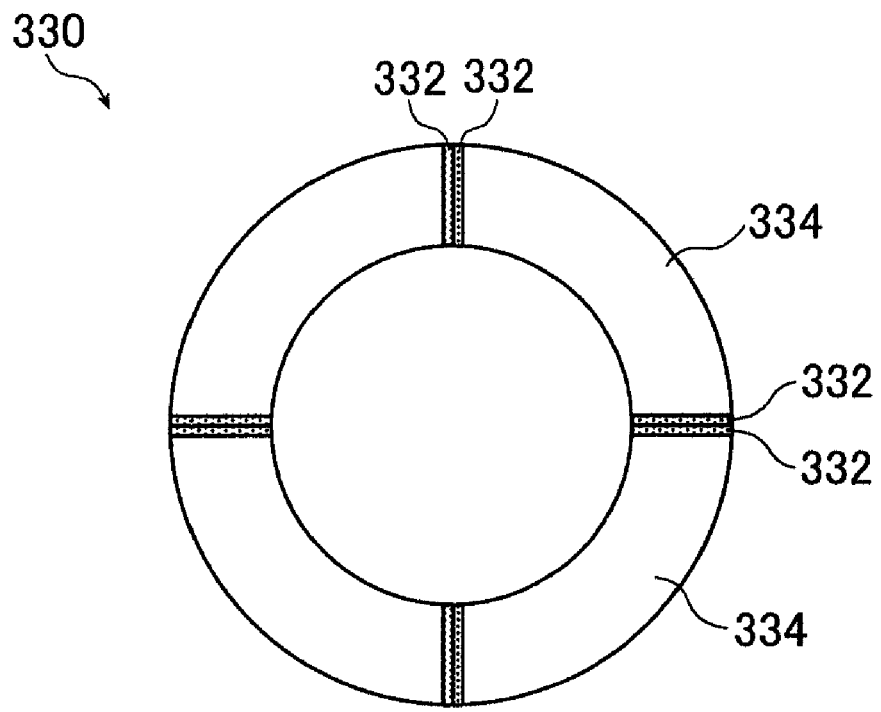
FIG. 30 is a schematic front view illustrating an example of the planar lighting device having an annular form.
Figure 31:
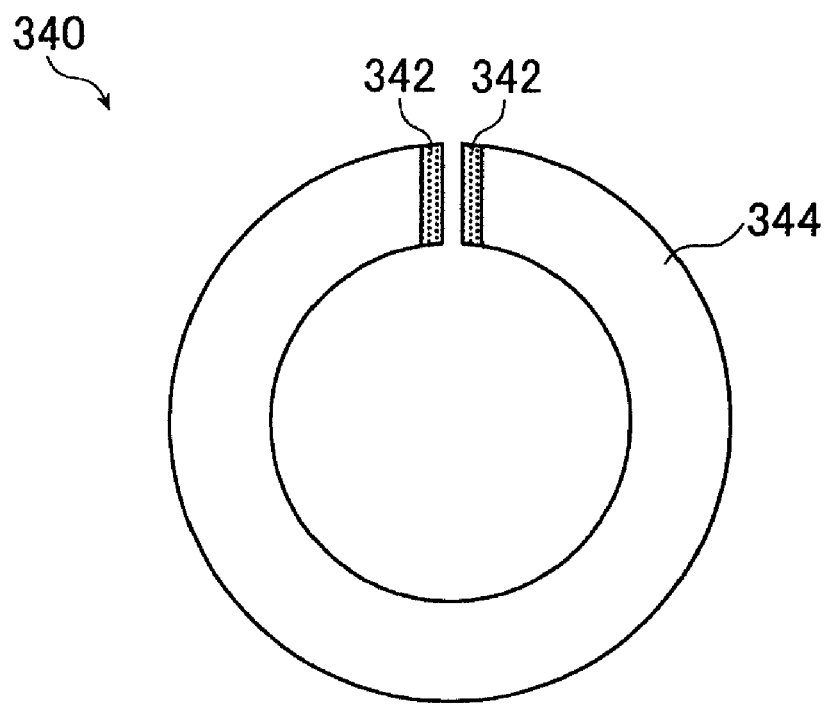
FIG. 31 is a schematic front view illustrating another example of an annular planar lighting device.

FIGS. 30, 31, and 32 are schematic front views illustrating examples of annular planar lighting devices.

A planar lighting device 330 illustrated in FIG. 30 comprises eight light sources 332 and four light guide plates 334.

The light guide plates 332 each have the shape of a cylinder of which the peripheral surface provides the light exit plane; the thickness thereof increases from the end faces toward the center. The light guide plates 334 each are bent tubings such that the axis passing through the cylinder forms a 90° arc from end face to end face.

The light guide plates 332 are arranged such that the end faces of one light guide plate 332 are opposite the end faces of the adjacent light guide plates 332 and that the four connected light guide plates 332 form a single ring.

The end faces of the light guide plate 334 are each provided with a light source 332.

Thus, an annular planar lighting device can be made by forming the light guide plates 332 each into bent tubings and connecting a plurality of them in an arrangement as described above.

While the planar lighting device 330 has four light guide plates formed into an annular planar lighting device, the present invention is not limited thereto. As illustrated in FIG. 31, for example, a single light guide plate may be formed into a shape such that the axis of the cylinder forms a circle to provide a planar lighting device 340 comprising a single light guide plate 344 and two light sources 342 disposed on the end faces thereof, hence an annular planar lighting device.

Any number of light guide plates may be used to form an annular shape by setting the angle of the arc formed by the axis passing through the cylinders represented by the light guide plates.

Figure 32A:
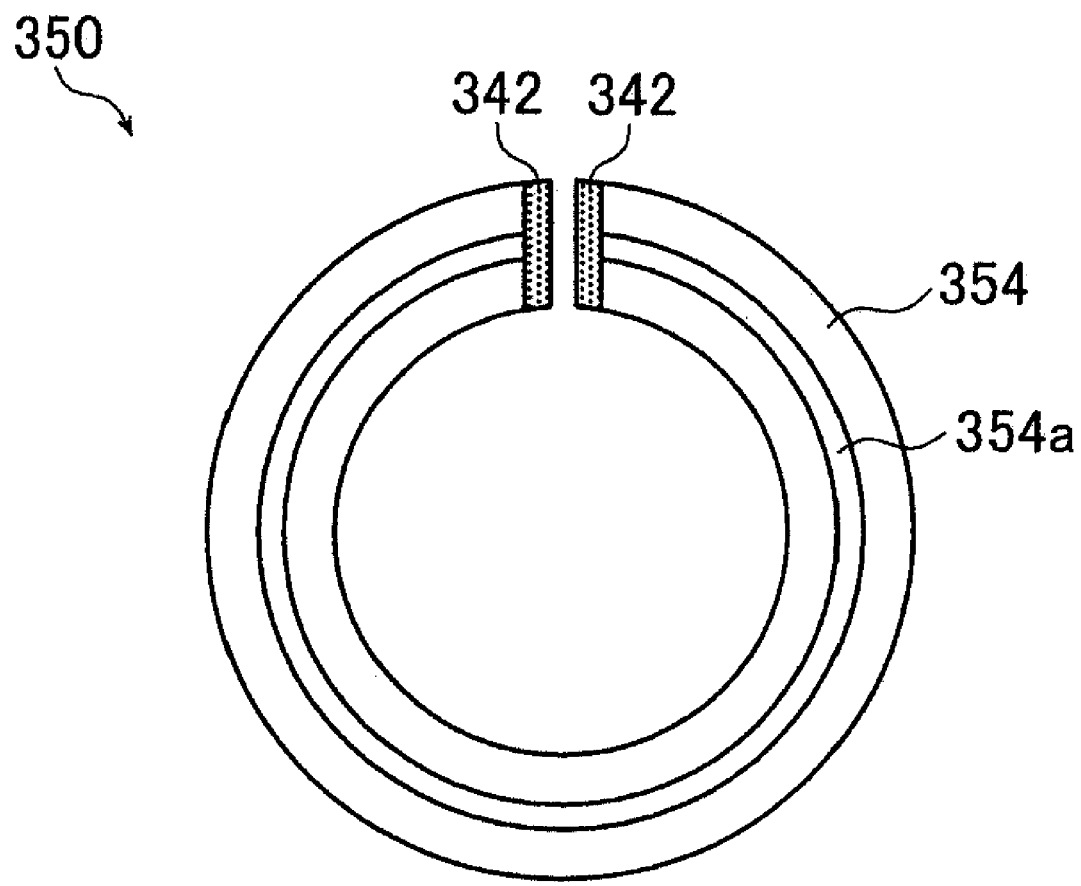
FIG. 32A is a schematic front view illustrating another example of an annular planar lighting device.
Figure 32B:
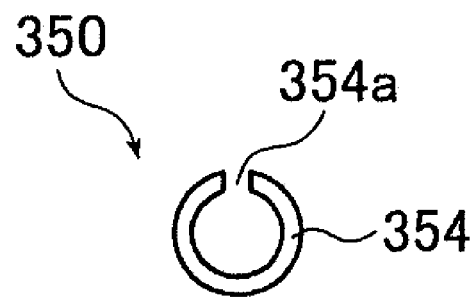
FIG. 32B is a sectional view of the planar lighting device of FIG. 32A.

Further, the planar lighting device is not limited to the shape of a rod or a ring and may have various shapes desired.

Where the light guide plate is formed into a cylinder, a groove 354a as illustrated in FIG. 32A is preferably formed in part of a cylindrical light guide plate 354 of a planar lighting device 350. Specifically, the groove 354a is preferably formed as illustrated in FIG. 32B in part of the light guide plate 354 in cross section perpendicular to the direction in which light emitted by light sources 342 is admitted.

Where the groove 354a is formed in the light guide plate 354, a reflection film 346 can be easily provided on the inside of the light guide plate 354.

Next, a second embodiment of the inventive planar lighting device will be described.

Figure 33A:
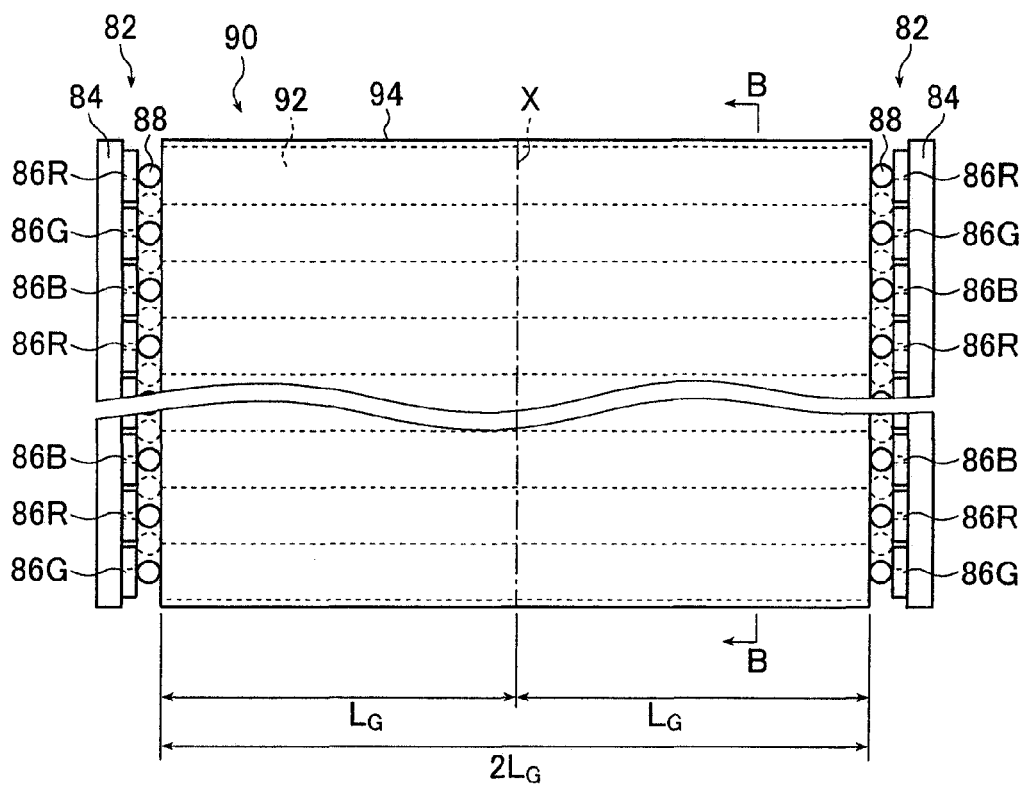
FIG. 33A is a schematic plan view of part of a light guide member according to a second embodiment and light sources used to admit light into the light guide member.
Figure 33B:
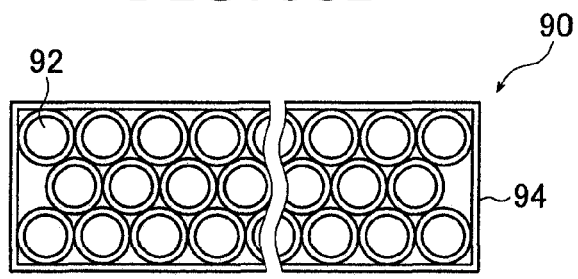
FIG. 33B is a schematic sectional view of the light guide member of FIG. 33A taken along a line B-B.
Figure 34:
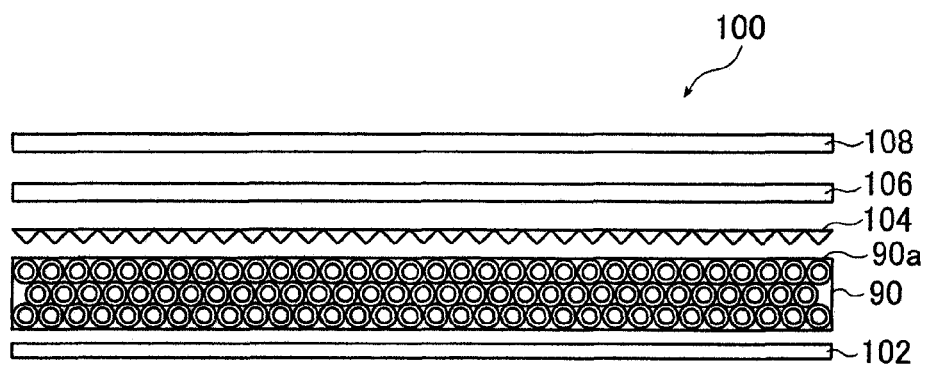
FIG. 34 is a schematic view illustrating a configuration of a backlight unit comprising the light guide member of FIG. 33.

In the second embodiment, the planar lighting device is configured using a light guide member illustrated in FIGS. 33A and 33B. FIG. 33A is a schematic plan view illustrating part of the light guide member according to the second embodiment and a light source used to admit light into the light guide member; FIG. 33B is a schematic sectional view of the light guide member of FIG. 33A taken in line B-B.

The light guide member 90 is configured with a plurality of plastic optical fibers (POF) 92 and a transparent case 94 housing them as illustrated in FIG. 33B. The plastic optical fibers (simply referred to as optical fibers below) 92 and the case 94 are both formed of a flexible material. As illustrated in FIG. 33B, the plastic optical fibers (simply referred to as optical fibers below) 94 are each provided most closely inside the case 94 such that the spaces between the optical fibers are the smallest possible as illustrated in FIG. 33B. Specifically, one optical fiber is disposed in such a manner as to be in contact with six optical fibers surrounding it. The light guide member 90 is configured with a flat rectangular plate having a substantially even thickness.

The optical fibers 92 housed in the case 94 may be formed by bonding them at their lateral faces with an adhesive, etc. Alternatively, the optical fibers may be bonded to one another by filling the spaces between the optical fibers piled on one another with a flexible transparent resin material. To allow light to travel deep inside, layers of air preferably exist in the spaces between the optical fibers in contact with one another. Where such layers of air are allowed to exist, occurrence of uneven brightness is further restrained in the light guide member in applications where the light guide plate is used with a reduced thickness.

Thus, in the light guide member 90 according to the embodiment under discussion, a plurality of optical fibers 92 are piled on top of one another to form a kind of multilayered structure. Considering the spaces formed between the boundaries defined by the optical fibers, the multilayered structure is preferably composed of 3 to 5 layers. Suppose, for example, that each optical fiber has a diameter of 1.0 mm and the light guide member is configured with three layers, the light guide member will have a thickness of less than 3.0 mm. Where the optical fiber has a diameter of 0.5 mm, the light guide member, when given the same 3-layer configuration, will have a thickness of less than 1.5 mm.

Each optical fiber 92 comprises a core portion formed of an organic compound of which the matrix is a polymer and a clad portion formed of an organic compound having a different refractive index than the core portion. The core portion and the clad portion may be added with additives such as a stabilizer to improve their weatherability or durability.

Preferably, the clad portion is formed of a polymer, is given a lower refractive index than the core portion, and is permeable to light emitted by point light sources.

The core portion is formed of material composed of a polymer and permeable to light emitted by point light sources and contains scattering particles for scattering light.

Let $\Phi$ be the scattering cross section of the scattering particles contained in the optical fiber 92, $L_G$ a half of the length of the optical fiber in the direction in which light is admitted, $N_p$ the particle density of the scattering particles contained in the optical fiber (number of particles in unit volume), and $K_C$ a compensation coefficient. Then, a relationship holds that the value of $\Phi \cdot N_p \cdot L_G \cdot K_C$ is not smaller than 1.1 and not greater than 8.2, and $0.005 \leq K_C \leq 0.1$. The optical fibers, each containing scattering particles satisfying the above relationship, are capable of emitting uniform illuminating light with a reduced level of brightness unevenness through their lateral faces.

Further, the resin material forming the optical fiber may be added with the plasticizer described earlier. This increases the flexibility of the optical fiber, achieving a flexible light guide member.

The light sources 82 illustrated in FIG. 33A each comprise an LED array 84 having a plurality of LEDs 86 arranged thereon and coupling lenses 88 for the respective LEDs 86. As illustrated in FIG. 33A, the optical fibers 92 are each provided adjacent both end faces thereof with an LED 86, specifically, an R-LED 86R for emitting red light, a G-LED 86G for emitting green light, or a B-LED 86B for emitting blue light. The LEDs provided on each LED array 84 (R-LEDs 86R for emitting red light, G-LEDs 86G for emitting green light, and B-LEDs 86B for emitting blue light) are arranged such that adjacent LEDs are LEDs of different colors. When light is admitted through the lateral faces of the optical fibers 92 from the LEDs of the individual colors (R-LEDs 86R for emitting red light, G-LEDs 86G for emitting green light, and B-LEDs 86B for emitting blue light), the light is scattered by the scatterers inside the optical fibers 92 and light beams of the individual colors are emitted through the lateral faces of the optical fibers 92. Since the optical fibers 92 are placed adjacent one another such that their lateral faces are in contact with one another, light beams of the individual colors emitted through the lateral faces of the optical fibers blend to become white light.

While, in the example under discussion, the light source 82 is configured using the LED array 84, on which the LEDs of the individual colors are arranged, and the coupling lenses 88 such that the LEDs of the individual colors are located adjacent the end faces of the optical fibers 92, the present invention is not limited to such configuration. The light source may be configured using white LEDs and coupling lenses such that the white LEDs are located adjacent the end faces of the optical fibers.

Further, only red, blue or green LEDs may be used to provide monochromatic illumination.

FIG. 32 is a schematic view illustrating an example of configuration of a backlight unit (planar lighting device) 100 provided with such light guide member 90. As illustrated in FIG. 32, the backlight unit 100 comprising the light guide member 90 as illustrated in FIG. 33 can be configured such that a reflection sheet 102 is provided on the side of the light guide member 90 opposite from a plane (light exit plane) 90a through which light is allowed to exit and that two prism sheets 104 and 106 and a diffusion sheet 108 are disposed on one another in this order on the light exit plane 90a of the light guide member 90. The backlight unit, however, is not limited to the structure of FIG. 32; a polarization separator film, for example, may be provided between the light exit plane 90a of the light guide member 90 and the prism sheet 104.

The reflection sheet 102, the prism sheets 104 and 106, and the diffusion sheet 108 forming part of the backlight unit 100 of FIG. 32 may be similar to the counterparts of the backlight unit according to the first embodiment described above. Referring to FIG. 32, the light sources, not shown, are provided on the side of the light guide member 90 facing the viewer and on the side away from the viewer.

The light guide member 90 thus formed of overlaid layers of optical fibers 92 has a flexibility. Thus, in cases where the backlight unit 100 using such light guide member is used as a display board for ornamental lighting (illuminations), it can also be mounted to walls having a curvature. Thus, the light guide plate can be used for a wider variety of applications and in a wider application range including ornamental lighting and POP (point-of-purchase) advertising.

While the planar lighting device according to the present invention has been described in detail above, the present invention is not limited to the above embodiments; various improvements and modifications may be made without departing from the spirit of the present invention.

INDUSTRIAL APPLICABILITY

The inventive planar lighting device may be used as a planar lighting device (backlight unit) employed in liquid crystal display devices, over-head projectors, and illuminated advertising sign boards, and for indoor and outdoor illumination.

The invention claimed is:
1. A planar lighting device comprising:
 a first light source and a second light source disposed a given distance apart from each other; and
 a light guide plate disposed between said first light source and said second light source,
 wherein said light guide plate comprises a light exit plane, a first light entrance plane facing said first light source and containing one side of said light exit plane, a second light entrance plane facing said second light source and containing an opposite side to said one side and a rear plane, and grows thicker from said first light entrance plane and said second light entrance plane toward a center,
 wherein the rear plane of said light guide plate has a first inclined plane and a second inclined plane located on the opposite side from the light exit plane and inclined a given angle respectively, and a joint formed into a curved shape between said first inclined plane and said second inclined plane, and
 wherein said light guide plate contains scattering particles to reduce a degree of brightness unevenness for scattering light entering through said first and said second light entrance planes of said light guide plate inside thereof and propagating nearly parallel to said light exit plane inside thereof, said scattering particles satisfying an expression (1) below:

$$1.1 \leq \Phi \cdot N_p \cdot L_G \cdot K_c \leq 8.2 \tag{1}$$

(where $\Phi$ denotes a scattering cross section of said scattering particles, $L_G$ denotes a half of a length of said light guide plate in a direction in which light is admitted, $N_p$ denotes a density of said scattering particles, and $K_c$ denotes a compensation coefficient, $K_c$ being not smaller than 0.005 and not greater than 0.1).

2. The planar lighting device of claim 1, wherein said light exit plane of said light guide plate has a rectangular contour.

3. The planar lighting device of claim 2, wherein said light exit plane of said light guide plate is formed to have a flat shape, and wherein said light guide plate has a first inclined plane and a second inclined plane on an opposite side thereof from said light exit plane formed in such a manner as to be inclined symmetrically to each other with respect to a bisector of said light exit plane parallel to said one side of said light exit plane.

4. The planar lighting device of claim 3, wherein a polarization separator film for selectively transmitting a given polarized component of light and reflecting other polarized components of the light is formed integrally with said light guide plate on said light exit plane of said light guide plate.

5. The planar lighting device of claim 3,
 wherein said light guide plate is provided with diffusion reflectors on at least one plane of said light guide plate excluding said first light entrance plane and said second light entrance plane, and
 wherein said diffusion reflectors are provided on said first inclined plane and said second inclined plane.

6. The planar lighting device of claim 3, further comprising reflection material members provided on said light exit plane close to said first light entrance plane, said first inclined plane close to said first light entrance plane, said light exit plane close to said second light entrance plane, and said second inclined plane close to said second light entrance plane of said light guide plate.

7. The planar lighting device of claim 2, wherein said light exit plane of said light guide plate is formed of a first inclined plane and a second inclined plane inclined in such a manner as to be symmetrical to each other with respect to a bisector of said light exit plane parallel to said one side of said light exit plane, and wherein a plane located on an opposite side from said light exit plane is formed of a third inclined plane and a fourth inclined plane inclined in such a manner as to be symmetrical to each other with respect to said bisector of said light exit plane parallel to said one side of said light exit plane.

8. The planar lighting device of claim 2, wherein said light exit plane of said light guide plate is formed of a first inclined plane and a second inclined plane inclined in such a manner as to be symmetrical to each other with respect to a bisector of said light exit plane parallel to said one side of said light exit plane, and wherein a plane located on an opposite side from the light exit plane is formed to have a flat shape.

9. The planar lighting device of claim 1, wherein both said first light source and said second light source are each formed of one or more LED arrays, each having RGB-LEDs provided with red light emitting diodes, green light emitting diodes, and blue light emitting diodes arranged in a row, and of lenses disposed respectively on a light emitting side of said red light emitting diodes, said green light emitting diodes, and said blue light emitting diodes.

10. The planar lighting device of claim 9, wherein said lenses are transparent ball lenses each having a spherical shape.

11. The planar lighting device of claim 9,
wherein said first light source and said second light source each comprise two or more of said LED arrays, and
wherein said first and second light sources each have a configuration such that said LED arrays are stacked by using at least one of a mechanical joining method and a chemical bonding method in such a way that LED chips of one of said LED arrays and LED chips of another of said LED arrays are spaced a given distance apart from each other.

12. The planar lighting device of claim 1,
wherein both said first light source and said second light source are LED arrays each comprising LED chips and a support member carrying said LED chips arranged in a row, and
wherein a relationship p>b>a holds where "a" denotes a length of each of said LED chips perpendicular to said light exit plane of said light guide plate, "b" denotes a length of said LED chips in a direction in which said LED chips are arranged, and "p" denotes a distance by which said LED chips are spaced apart from one another.

13. The planar lighting device of claim 1,
wherein said planar lighting device comprises a plurality of light guide plates, each being said light guide plate, and
wherein said plurality of the light guide plates are arranged such that the light exit planes of the individual light guide plates lie in the same plane and that the light entrance planes thereof lie in the same plane.

14. The planar lighting device of claim 1, wherein said light guide plate is provided with diffusion reflectors on at least one plane of said light guide plate excluding said first light entrance plane and said second light entrance plane.

15. The planar lighting device of claim 14, wherein said diffusion reflectors are provided in an increasing density with an increasing distance from said first light entrance plane and said second light entrance plane.

16. The planar lighting device of claim 1,
wherein a part of said light guide plate in a side of said first light entrance plane and a part of said light guide plate in a side of said second light entrance plane are formed of a different material than other part of said light guide plate such that a relationship Nm>Ni holds where Ni denotes a refractive index of a material of said part in said side of said first light entrance plane and said part in said side of said second light entrance plane and Nm denotes a refractive index of a material of said other part.

17. The planar lighting device of claim 1,
wherein said scattering particles are particles of one or more selected from the group consisting of TOSPEARL™, silicone, silica, zirconia and a derivative polymer.

18. The planar lighting device of claim 1,
wherein said joint is formed into a rounded shape.

19. The planar lighting device of claim 18,
wherein a relationship between a radius of curvature $R_1$ of said joint, and a length L of the distance of the light guide plate between said first entrance plane and said second entrance plane satisfies $3L \leq R_1 \leq 500L$.

20. The planar lighting device of claim 19,
wherein a relationship between a radius of curvature $R_1$ of said joint, a length $L_R$ of a rounded portion of the joint from one end thereof to the other in the direction in which light is admitted, and an angle θ formed by a plane parallel to a light exit plane and the first inclined plane or the second inclined plane satisfies $2R_1 \cdot \sin(\theta) \leq L_R$.

21. The planar lighting device of claim 1,
wherein said scattering particles are particles of one or more selected from the group consisting of silicone, silica, zirconia and a derivative polymer.

\* \* \* \* \*